United States Patent
Weiss et al.

(10) Patent No.: US 9,727,884 B2
(45) Date of Patent: Aug. 8, 2017

(54) TRACKING BRAND STRENGTH USING CONSUMER LOCATION DATA AND CONSUMER SURVEY RESPONSES

(71) Applicant: Cadio, Inc., Boston, MA (US)

(72) Inventors: Eric H. Weiss, Acton, MA (US); Andrew Fromm, Mission Hills, KS (US); Dennis A. Ehrich, Jr., Mission Hills, KS (US); Joe Cardador, Leawood, KS (US)

(73) Assignee: Service Management Group, Inc., Kansas City, MO (US)

( * ) Notice: Subject to any disclaimer, the term of this patent is extended or adjusted under 35 U.S.C. 154(b) by 368 days.

(21) Appl. No.: 14/043,811

(22) Filed: Oct. 1, 2013

(65) Prior Publication Data

US 2014/0095260 A1 Apr. 3, 2014

Related U.S. Application Data

(60) Provisional application No. 61/708,305, filed on Oct. 1, 2012.

(51) Int. Cl.
*G06Q 30/02* (2012.01)

(52) U.S. Cl.
CPC ..... *G06Q 30/0203* (2013.01); *G06Q 30/0207* (2013.01); *G06Q 30/0211* (2013.01); *G06Q 30/0225* (2013.01)

(58) Field of Classification Search
CPC ........... G06Q 30/0203; G06Q 30/0211; G06Q 30/0225; G06Q 30/0207
See application file for complete search history.

(56) References Cited

U.S. PATENT DOCUMENTS

| 5,557,524 A | 9/1996 | Maki |
| 5,740,035 A | 4/1998 | Cohen et al. |

(Continued)

FOREIGN PATENT DOCUMENTS

| EP | 1361764 A1 | 11/2003 |
| JP | 2003-076911 A | 3/2003 |

(Continued)

OTHER PUBLICATIONS

U.S. Appl. No. 12/910,280, filed Oct. 22, 2010, Weiss et al.

(Continued)

*Primary Examiner* — Matthew Gart
*Assistant Examiner* — Stephen S Swartz
(74) *Attorney, Agent, or Firm* — Wolf, Greenfield & Sacks, P.C.

(57) ABSTRACT

Techniques that may be used by a consumer analytics system to track consumers' knowledge of brands and interactions with brands based in part on location data for consumers and responses to surveys that are distributed to consumers based at least in part on location data for the consumers. Such location data may be received, for example, from mobile devices operated by the consumers. A brand strength may represent any suitable measurement of a fraction or share of a market category. In some embodiments, a consumer analytics system may determine brand strength for a business using factors that each represent a "share" of a market category held by a business. The system may additionally track changes in these factors over time. Examples of factors that may be tracked include brand awareness for a business, brand accessibility for the business, brand consideration, brand usage, and brand favorites.

30 Claims, 22 Drawing Sheets

(56) References Cited

U.S. PATENT DOCUMENTS

| | | | |
|---|---|---|---|
| 6,098,048 A | 8/2000 | Dashefsky et al. | |
| 6,509,830 B1 | 1/2003 | Elliott | |
| 6,609,064 B1 | 8/2003 | Dean | |
| 6,647,269 B2 | 11/2003 | Hendrey et al. | |
| 6,662,192 B1* | 12/2003 | Rebane | G06Q 30/02 |
| 6,839,681 B1* | 1/2005 | Hotz | G06Q 30/02 |
| | | | 705/14.41 |
| 6,912,507 B1 | 6/2005 | Phillips et al. | |
| 6,970,131 B2 | 11/2005 | Percy et al. | |
| 6,975,941 B1 | 12/2005 | Lau et al. | |
| 6,999,987 B1 | 2/2006 | Billingsley et al. | |
| 7,010,501 B1 | 3/2006 | Roslak et al. | |
| 7,176,834 B2 | 2/2007 | Percy et al. | |
| 7,215,280 B1 | 5/2007 | Percy et al. | |
| 7,240,834 B2 | 7/2007 | Kato et al. | |
| 7,305,245 B2 | 12/2007 | Alizadeh-Shabdiz et al. | |
| 7,408,502 B2 | 8/2008 | Percy et al. | |
| 7,515,578 B2 | 4/2009 | Alizadeh-Shabdiz et al. | |
| 7,586,439 B2 | 9/2009 | Percy et al. | |
| 7,589,628 B1 | 9/2009 | Brady, Jr. | |
| 7,769,633 B2 | 8/2010 | Jokinen et al. | |
| 7,930,204 B1 | 4/2011 | Sharma et al. | |
| 7,933,798 B1* | 4/2011 | Yan | G06Q 30/02 |
| | | | 705/14.42 |
| 8,073,460 B1 | 12/2011 | Scofield et al. | |
| 8,150,967 B2 | 4/2012 | King et al. | |
| 8,271,322 B2 | 9/2012 | Ariyibi | |
| 9,043,302 B1* | 5/2015 | Shimshoni | G06F 17/30864 |
| | | | 707/706 |
| 2002/0052774 A1 | 5/2002 | Parker et al. | |
| 2002/0082921 A1 | 6/2002 | Rankin | |
| 2002/0111154 A1 | 8/2002 | Eldering et al. | |
| 2002/0111172 A1 | 8/2002 | DeWolf et al. | |
| 2002/0119793 A1 | 8/2002 | Hronek et al. | |
| 2002/0167408 A1 | 11/2002 | Trajkovic et al. | |
| 2003/0033195 A1 | 2/2003 | Bruce et al. | |
| 2003/0146871 A1 | 8/2003 | Karr et al. | |
| 2003/0195800 A1 | 10/2003 | Peters | |
| 2004/0034570 A1 | 2/2004 | Davis | |
| 2004/0093265 A1 | 5/2004 | Ramchandani et al. | |
| 2004/0093268 A1 | 5/2004 | Ramchandani et al. | |
| 2005/0059412 A1 | 3/2005 | Hosokawa | |
| 2005/0177449 A1 | 8/2005 | Temares et al. | |
| 2005/0222829 A1 | 10/2005 | Dumas | |
| 2005/0243784 A1 | 11/2005 | Fitzgerald et al. | |
| 2006/0085255 A1* | 4/2006 | Hastings | G06Q 30/02 |
| | | | 705/14.4 |
| 2006/0111961 A1 | 5/2006 | McQuivey | |
| 2006/0111962 A1 | 5/2006 | Holsinger | |
| 2006/0174329 A1 | 8/2006 | Dublish | |
| 2007/0010266 A1 | 1/2007 | Chaudhuri | |
| 2007/0185768 A1 | 8/2007 | Vengroff et al. | |
| 2007/0186007 A1 | 8/2007 | Field et al. | |
| 2008/0042836 A1 | 2/2008 | Christopher | |
| 2008/0070588 A1 | 3/2008 | Morin | |
| 2008/0125959 A1 | 5/2008 | Doherty et al. | |
| 2008/0158053 A1 | 7/2008 | Watanabe | |
| 2008/0246657 A1 | 10/2008 | Percy et al. | |
| 2008/0248815 A1 | 10/2008 | Busch | |
| 2008/0262901 A1* | 10/2008 | Banga | G06Q 10/06375 |
| | | | 705/14.53 |
| 2008/0288331 A1* | 11/2008 | Magids | G06Q 30/02 |
| | | | 705/7.32 |
| 2008/0319829 A1 | 12/2008 | Hunt et al. | |
| 2009/0064014 A1 | 3/2009 | Nelson et al. | |
| 2009/0064173 A1 | 3/2009 | Goldspink et al. | |
| 2009/0076888 A1 | 3/2009 | Oster et al. | |
| 2009/0083128 A1 | 3/2009 | Siegel | |
| 2009/0106085 A1 | 4/2009 | Raimbeault | |
| 2009/0112683 A1 | 4/2009 | Hamilton et al. | |
| 2009/0125396 A1 | 5/2009 | Otto et al. | |
| 2009/0132469 A1 | 5/2009 | White et al. | |
| 2009/0160703 A1 | 6/2009 | Duffett-Smith et al. | |
| 2009/0171939 A1 | 7/2009 | Athsani et al. | |
| 2009/0199107 A1 | 8/2009 | Lewis et al. | |
| 2009/0248288 A1 | 10/2009 | Bell et al. | |
| 2009/0276235 A1 | 11/2009 | Benezra et al. | |
| 2009/0298480 A1 | 12/2009 | Khambete et al. | |
| 2009/0298514 A1 | 12/2009 | Ullah | |
| 2009/0327025 A1 | 12/2009 | Kirch et al. | |
| 2010/0004997 A1 | 1/2010 | Mehta et al. | |
| 2010/0023401 A1 | 1/2010 | Ariyibi | |
| 2010/0076820 A1 | 3/2010 | Davis | |
| 2010/0106582 A1 | 4/2010 | Etheredge et al. | |
| 2010/0131443 A1 | 5/2010 | Agarwal et al. | |
| 2010/0191746 A1 | 7/2010 | Wang et al. | |
| 2010/0262449 A1 | 10/2010 | Monteforte et al. | |
| 2010/0262462 A1 | 10/2010 | Tryfon | |
| 2010/0324989 A1* | 12/2010 | Etchegoyen | G06Q 30/0246 |
| | | | 705/14.45 |
| 2010/0332315 A1 | 12/2010 | Kamar et al. | |
| 2011/0004504 A1* | 1/2011 | Ives | G06Q 30/02 |
| | | | 705/7.29 |
| 2011/0022424 A1 | 1/2011 | VonDerheide | |
| 2011/0029370 A1 | 2/2011 | Roeding et al. | |
| 2011/0093349 A1 | 4/2011 | Drescher et al. | |
| 2011/0099041 A1 | 4/2011 | Weiss et al. | |
| 2011/0099046 A1* | 4/2011 | Weiss | G06Q 10/00 |
| | | | 705/7.31 |
| 2011/0099047 A1 | 4/2011 | Weiss et al. | |
| 2011/0099048 A1 | 4/2011 | Weiss et al. | |
| 2011/0106721 A1 | 5/2011 | Nickerson et al. | |
| 2011/0191140 A1 | 8/2011 | Newman et al. | |
| 2011/0231483 A1 | 9/2011 | Derraugh et al. | |
| 2011/0270618 A1* | 11/2011 | Banerjee | G06Q 40/02 |
| | | | 705/1.1 |
| 2012/0005023 A1* | 1/2012 | Graff | G06Q 30/0201 |
| | | | 705/14.58 |
| 2012/0054016 A1 | 3/2012 | Todd et al. | |
| 2012/0066026 A1 | 3/2012 | Dusig et al. | |
| 2012/0072263 A1 | 3/2012 | Dusig et al. | |
| 2012/0072288 A1 | 3/2012 | Dusig et al. | |
| 2012/0173305 A1 | 7/2012 | Bhaskaran | |
| 2012/0226522 A1 | 9/2012 | Weiss et al. | |
| 2012/0226523 A1 | 9/2012 | Weiss et al. | |
| 2012/0232953 A1 | 9/2012 | Custer | |
| 2012/0239479 A1 | 9/2012 | Amaro et al. | |
| 2012/0330716 A1 | 12/2012 | Volpe et al. | |
| 2012/0330721 A1 | 12/2012 | Volpe et al. | |
| 2012/0330722 A1 | 12/2012 | Volpe et al. | |
| 2013/0018701 A1 | 1/2013 | Dusig | |
| 2013/0036015 A1* | 2/2013 | Bender | G06Q 30/02 |
| | | | 705/14.66 |
| 2013/0166372 A1* | 6/2013 | Abraham | G06Q 30/0269 |
| | | | 705/14.42 |
| 2013/0290106 A1* | 10/2013 | Bradley | G06Q 90/20 |
| | | | 705/14.64 |

FOREIGN PATENT DOCUMENTS

| | | |
|---|---|---|
| JP | 2003-196456 A | 7/2003 |
| JP | 2005-275786 A | 10/2005 |
| KR | 20020016120 A | 3/2002 |
| KR | 2004-0068743 A | 8/2004 |
| KR | 10-2011-0069943 A | 6/2011 |
| KR | 2012-0087759 A | 8/2012 |
| WO | WO 0244829 A2 | 6/2002 |
| WO | WO 2008-107880 A2 | 9/2008 |

OTHER PUBLICATIONS

U.S. Appl. No. 12/910,311, filed Oct. 22, 2010, Weiss et al.
U.S. Appl. No. 12/910,372, filed Oct. 22, 2010, Weiss et al.
U.S. Appl. No. 13/472,294, filed May 15, 2012, Weiss et al.
U.S. Appl. No. 13/472,320, filed May 15, 2012, Weiss et al.
U.S. Appl. No. 13/535,108, filed Jun. 27, 2012, Volpe et al.
U.S. Appl. No. 13/535,130, filed Jun. 27, 2012, Volpe et al.
U.S. Appl. No. 13/535,150, filed Jun. 27, 2012, Volpe et al.
U.S. Appl. No. 14/043,717, filed Oct. 1, 2013, Weiss et al.
U.S. Appl. No. 14/043,816, filed Oct. 1, 2013, Weiss et al.

(56) References Cited

OTHER PUBLICATIONS

International Search Report and Written Opinion for PCT/US2013/062934, mailed Jan. 28, 2014.
Non-Final Office Action from U.S. Appl. No. 12/910,311 dated May 24, 2013.
International Search Report and Written Opinion for International Application No. PCT/US2012/044410 mailed Mar. 4, 2013, 13 pages.
Business Wire press release. "uSamp Adding Mobile Surveying to Its Next-Generation Platform, Delivering Access to Millions of Smartphone Users on the Go," http://www.businesswire.com/news/home/20100825005047/en , 3 pages, Aug. 25, 2010.
Unni et al., "Location-Based Services: Models for Strategy Development in M-Commerce" (2003).
Final Office Action from U.S. Appl. No. 13/472,294 dated Mar. 15, 2013.
Final Office Action from U.S. Appl. No. 13/472,320 dated Mar. 29, 2013.
Johnson, T., "Make Extra Money: Become a Mystery Shopper," p. 1-3, Jul. 2, 2008.
"Field Agent," available at: www.fieldagent.net, retrieved Aug. 22, 2012.
"Gigwalk, Instantly mobilize people to do work anywhere," available at: www.gigwalk.com, retrieved Aug. 22, 2012.
"Shadow Cities—Magical location MMORPG for iPhone, iPod," available at: www.shadowcities.com, retrieved Aug. 22, 2012.
"SCVNGR—Wikipedia, the free encyclopedia," available at: http://en.wikipedia.org/wiki/SCVNGR, retrieved Aug. 22, 2012.
"Foursquare—Wikipedia, the free encyclopedia," available at: http://en.wikipedia.org/wiki/Foursquare, retrieved Aug. 22, 2012.
Kelly, "Gigwalk Adds Microsoft to Its List of Brands, Offers 110K Paying 'gigs' (Infographic)," available at: http://www.nytimes.com/external/venturebeat/2011/07/19/19venturebeat-gigwalk-adds-microsoft-to-its-list-of-brands-12055.html?partner=rss&emc=rss, The New York Times, Published Jul. 19, 2011, retrieved Aug. 22, 2012.
Finney, "iPhone app helps users make some extra cash," available at: http://abclocal.go.com/kgo/story?section=news/7_on_your_side&id=8441998, Published Nov. 22, 2011, retrieved Aug. 22, 2012.

* cited by examiner

TRACKING BRAND STRENGTH USING CONSUMER LOCATION DATA AND CONSUMER SURVEY RESPONSES

CROSS-REFERENCE TO RELATED APPLICATIONS

This application claims priority under 35 U.S.C. §119(e) to U.S. Provisional Application Ser. No. 61/708,305, titled "Consumer analytics system that determines, offers, and monitors use of rewards incentivizing consumers to perform tasks" and filed on Oct. 1, 2012, the entirety of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

Some embodiments of the invention relate to systems for electronically gathering and analyzing information on and/or from consumers. More specifically, some embodiments of the invention collect relevant and timely data from and about consumers to make inferences and predictions about the consumers, including by collecting electronically-captured location data for the consumers, and provide incentives and/or rewards to the consumers for performing tasks to provide information to the system.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

ILLUSTRATIVE CONTEXT

Figure 1:
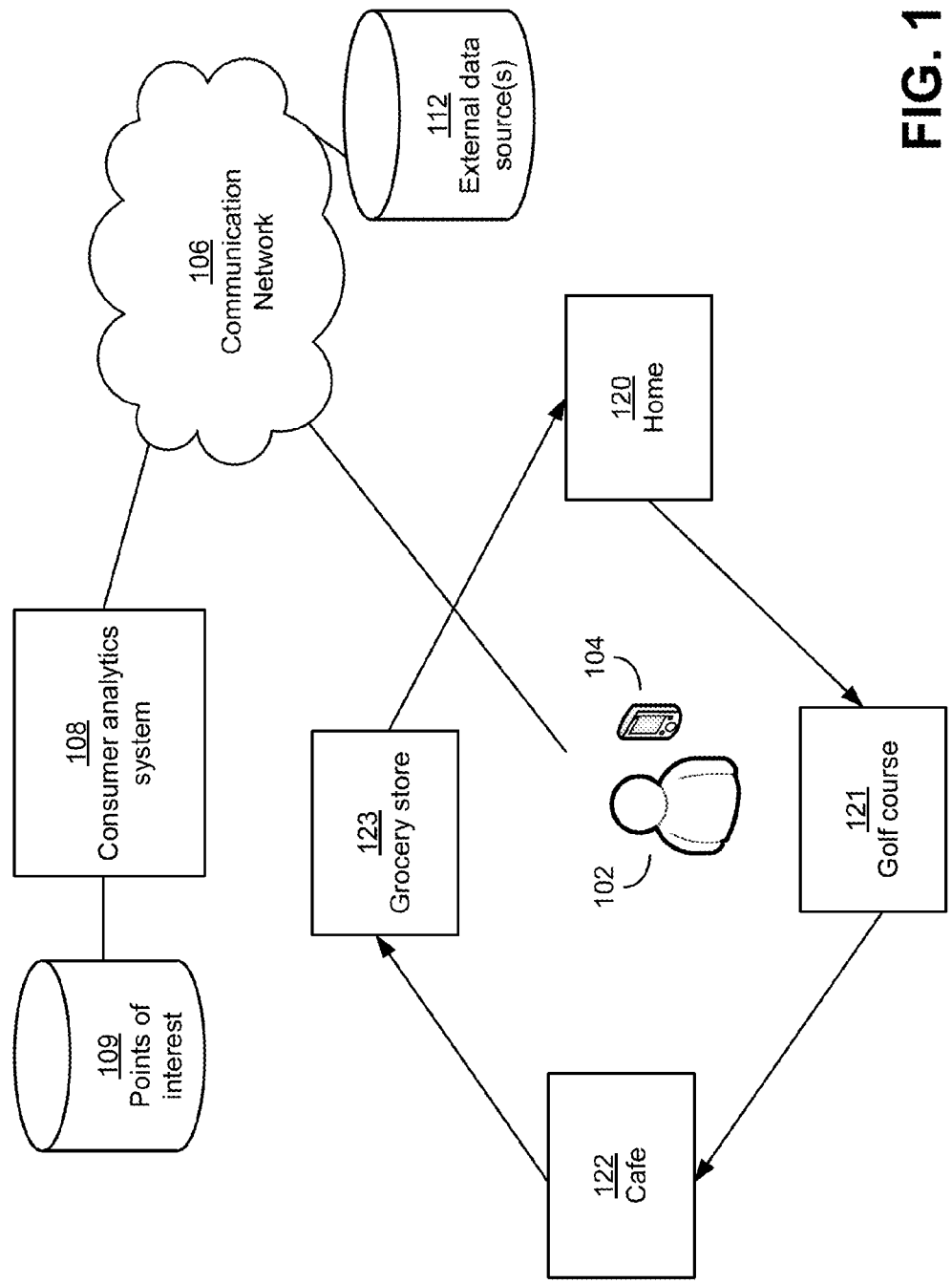
FIG. 1 illustrates one exemplary environment in which embodiments may operate.

FIG. 1 illustrates an exemplary environment in which some embodiments may operate to detect location data for one or more consumers and, by analyzing that location data, determine characteristics of those consumers. The example of FIG. 1 is described in connection with one consumer, but embodiments may operate with any number of consumers.

In the environment of FIG. 1, a consumer 102 changes location while going to work, going home, going to school, running errands, or moving from any other place to place. In the specific example of FIG. 1, the consumer 102 visits a golf course 121, cafe 122, and grocery store 123 during a day. The consumer analytics system 108 monitors movements of the consumer 102 and, by detecting and analyzing locations the consumer 102 visits, produces inferences and predictions regarding characteristics of the consumer, which may include inferences and/or predictions of behavior characteristics relating to behaviors of the consumer.

Embodiments may monitor movements of the consumer 102 in any suitable manner. In some embodiments, location data for a consumer may be collected for the consumer using techniques described in U.S. patent application Ser. No. 12/910,280, filed on Oct. 22, 2010, and titled "Electronically capturing consumer location data for analyzing consumer behavior" ("the '280 application"). The '280 application is incorporated herein by reference in its entirety for all purposes and at least for its disclosure of collecting and analyzing location data for consumers to predict and/or infer characteristics of the consumers. As discussed in detail below, in some embodiments, the consumer analytics system 108 may prompt a consumer 102 to perform one or more tasks (e.g., answer survey questions, or obtain media such as a photograph) in response to determining one or more characteristics of the consumer based on location data. For example, the consumer analytics system 108 may prompt a consumer 102 to perform a task when the consumer analytics system 108 identifies, from the location data for the consumer 102, a behavior in which the consumer 102 is inferred to be engaging, is inferred to have been engaging, or is predicted to engage. In some embodiments the system 108 may be configured to take an action, including prompting a consumer to perform a task, using techniques described in U.S. patent application Ser. No. 13/535,108, filed on Jun. 27, 2012, and titled "Triggering collection of consumer input based on location data" ("the '108 application"). The '108 application is incorporated herein by reference in its entirety for all purposes and at least for its disclosure of a system taking actions such as collecting information from and/or about consumers in response to predicting and/or inferring characteristics of the consumers.

In some embodiments, the consumer 102 is associated with a device 104 that can be used to obtain location information for the consumer 102 as the consumer 102 moves. The consumer 102 may move with the device 104, as the consumer 102 may carry the device 104 or the device 104 may be embedded in a car, piece of clothing, or baggage carried by the consumer 102. In some cases, the device 104 may be useful only in determining a location of the consumer 102, while in other cases the device 104 may have additional functionality. For example, the device 104 may be a mobile telephone with location-identifying capabilities, such as a cellular telephone with a built-in Global Positioning System (GPS) or Assisted GPS (AGPS) receiver that the cellular telephone can use to determine its current location. The device 104 may be able to communicate with a network 106, which may be any suitable communication network, including a wireless wide-area network (WWAN). In cases where the device 104 is a cellular telephone, the network 106 may be or include a cellular network.

The consumer analytics system 108 may obtain location data for a consumer 102 from the device 104. In some cases, the consumer analytics system 108 may request the location information from the network 106 and, in turn, the network 106 may obtain location data from the device 104. In some embodiments, the consumer analytics system 108 may request the location data at varying intervals based on various factors, including the current location of the consumer 102.

The consumer analytics system 108 may analyze the location data to identify settings visited by the consumer, including settings of the set of settings 109, and predict and/or infer characteristics of the consumer 102. Inferring and/or predicting characteristics of the consumer 102 may include inferring and/or predicting behaviors in which the consumer 102 is engaging, was engaging, or will engage.

A behavior may indicate a context of a consumer's presence at a point of interest. Examples of information indicating a context of a presence may include information indicating a purpose or goal of the consumer in visiting the point of interest, other points of interest visited by the consumer during a trip that includes the point of interest, other points of interest bypassed by the consumer in traveling to or from the point of interest, routes traveled by the consumer to reach the point of interest, an ultimate destination of a consumer in a trip that includes the point of interest, or any other information describing the circumstances of the consumer's presence at the point of interest. In some embodiments, when the system 108 infers and/or predicts one or more characteristics of one or more consumers (including the consumer 102), the characteristic(s) of the consumer(s) trigger the system 108 to take one or more actions.

The system 108 may take any suitable action, as embodiments are not limited to taking any particular action. In some embodiments, the action taken by the system 108 may include collecting information regarding commercial activity, including commercial activity of consumers. Commercial activity of a consumer may include information regarding visiting a commercial entity, purchasing a product or a service, and/or preferences of the consumer regarding commercial entities, products, and/or services. Commercial entities, products, or services about which information is obtained may be commercial entities, products, or services to which an inferred or predicted characteristic of the consumer 102 relates. For example, an inferred characteristic may relate to interactions of the consumer 102 with a commercial entity, such as behaviors or preferences of the consumer 102 with respect to the commercial entity. In such a case, the product or service about which information is obtained may be a product or service of the commercial entity. In other cases, the commercial entity, product, or service may not be related to an inferred or predicted characteristic, but may be a product or service for which market research is being conducted. Market research may be conducted to determine characteristics of consumers related to the commercial entity, product, or service, and the market research may include collecting information from or about consumers for which a characteristic has been inferred. When the characteristic is inferred for the consumer 102, then, the system 108 takes the action to obtain information about the product or service.

Embodiments are not limited to taking any particular action in response to inferring or predicting any particular characteristic. As an example of an action that the system 108 may take, in some embodiments, in response to inferring and/or predicting behavior of the consumer 102, the system 108 may solicit information from the consumer regarding commercial activity. To solicit the information, the system 108 may send the consumer 102 an alert or message on the device 104. The message sent to the device 104 may include a request for the consumer 102 to complete a task. The task may include providing information to the system 108, which may include information regarding commercial activity. In some cases, the task included in the message may include answering survey questions provided to the consumer 102. The consumer 102 may, in some embodiments, respond to survey questions using the device 104. Examples of other messages and tasks that may be provided to a consumer 102 by the system 108 are described in greater detail below.

As another example of actions that may be taken by the system 108 in response to inferring or predicting one or more characteristics of one or more consumers, the system 108 may acquire information from at least one data source external to the system 108. The information acquired from the at least one data source may be any suitable information, as embodiments are not limited in this respect. In some cases, the information may include information regarding the consumer 102, regarding an inferred characteristic, and/or regarding a commercial entity or a product or service offered by a commercial entity. For example, in response to inferring a characteristic of the consumer 102, the system 108 may obtain social networking data provided by a consumer to a social networking service or that relates to the consumer 102. The social networking data may be evaluated to determine whether the social networking data indicates information relating to the characteristic and/or to a product or service. For example, the social networking data may include a review of a product or service indicating opinions of the consumer 102 regarding the product or service. Examples of other types of external data sources from which information may be obtained are described in greater detail below.

In some embodiments, as described in detail below, the consumer analytics system 108 may incentivize the consumer 102 to perform a task in response to the action taken by the system 108, such as responding to a survey distributed by the system 108 or obtaining media (e.g., a photograph) requested by the system 108. As another example of an action the system 108 may take in response to inferring or predicting one or more characteristics of one or more consumers 102, the system 108 may determine one or more rewards to offer consumer 102 in exchange for performing a designated task.

Determining the one or more rewards may include determining one or more parameters of the reward. Determining parameters of the reward may include selecting whether the consumer is to be offered one reward or a list of multiple rewards from which the consumer may pick a reward. Determining parameters of a reward may additionally or alternatively include selecting an organization (e.g., a commercial entity) with which an offered reward is to be associated, selecting a type of reward, selecting a value of the reward, and/or selecting one or more conditions that are to be imposed on the availability of the reward to the consumer for redemption by the consumer. For example, where multiple different organizations offer rewards via the system 108, the system 108 may select an organization for which a reward is likely to incent the consumer 102 to perform a desired task. The organization may be an organization that the system 108 infers or predicts the consumer 102 favors and/or may be an organization related to the desired task. An organization that the consumer 102 favors may be a commercial entity of which the consumer 102 is a known, inferred, or predicted to be customer or that provides a product or service that the system knows, infers, or predicts is of interest to the consumer.

An organization related to the desired task may be a commercial entity about which the consumer 102 is to be asked questions in a survey. The type of reward and value of the reward may define what the consumer is to be provided by the organization with which the reward is redeemable. Examples of types of rewards include a discount on goods and services or a gift card. Examples of value include how much of a discount to offer on the goods/services and what value of gift card to offer. Conditions under which the reward may be redeemed may include any suitable conditions, including conditions on actions a consumer must take for the value of the reward to be made available or conditions on times or places at which the value of the reward is available.

The system 108 may determine a reward, including by determining any of the parameters mentioned above or other parameters of a reward, based on any suitable information. In some embodiments, the system 108 may determine a reward based on characteristics of the consumer 102 to which the reward is to be offered. For example, characteristics of the consumer 102 that the system 108 has inferred and/or predicted based on location data for the consumer may be used. Such characteristics may include behavior characteristics, preference characteristics, and/or identity characteristics that the consumer is inferred to have now or inferred to have previously had, or is predicted to have. For example, if a consumer 102 is detected by the system 108 to be a customer of one business, the system 108 may determine to offer a reward to the consumer that is a discount for goods and/or services available from the business. As another example, if a consumer 102 is detected by the system 108 to be a dedicated customer of one business, the system 108 may determine to offer a reward to the consumer that is a high-value gift card for a competitor of the business. By offering the consumer 102 a high-value reward for the competitor, the system may be able to determine whether the consumer 102 can be influenced to visit the competitor rather than the business typically visited by the consumer 102. In some embodiments, the system 108 may determine the type or value of a reward for the purpose of influencing a consumer 102 from being a customer of one business to being a customer of another, or so as to otherwise change the behaviors or preferences of the consumer 102. In some such cases, the system 108 may select different types/values of rewards to offer different consumers for the purpose of determining what type and value of reward will change the behaviors/preferences of customers of one business to be customers of another business. The different rewards may be similar in some parameters, such as by being of the same type but having different value, or by having the same type/value but different conditions, or similar in any other way.

In addition to or as an alternative to characteristics of the consumer, the system 108 may determine the reward to offer the consumer 102 based on one or more metrics regarding the consumer's performance of one or more tasks requested by the system 108. Such metrics may relate to a quality of the consumer's performance of the task for which the reward is offered or tasks previously performed. Examples of such metrics include a timeliness of the performance or a usefulness of information provided to the system 108 by the consumer 102 as a part of performing the task. For example, a usefulness of responses to open-response survey questions provided by the consumer 102 may be judged and used to determine a reward to provide to the consumer 102 for providing those responses or to provide at a future time to incent performance of another task. Though, the quantity (such as length in words) of an open-response may alternatively or additionally be used as an indication of quality.

Further, in addition to or as an alternative to performance metrics, in some embodiments the system 108 may determine the reward to offer the consumer 102 based on a value of the consumer 102 or information that may be provided by the consumer 102 to the system 108. For example, if the characteristics that are predicted/inferred for the consumer 102 by the system 108 indicate that the consumer 102 does not have any particularly-desirable characteristics or is not capable of providing any particularly-desirable information, the system 108 may select a lower-value reward for the consumer 102. However, if the characteristics for the consumer 102 indicate that the consumer 102 is valuable in some way, such as by having uncommon characteristics including by engaging in uncommon behaviors that are potentially indicative of some relevant information, the system 108 may select a higher-value reward for the consumer 102. Lastly, in some embodiments, the system 108 may determine the reward to offer the consumer 102 based at least in part on attributes of a task that the consumer 102 is to be requested to perform, for example, the system 108 may select the reward based on a difficulty of a task, or select a reward to include a parameter related to an attribute of the task. As an example of a related parameter, the system 108 may select a reward redeemable at a business to which questions the consumer is to be asked in a survey relate.

As another example of an action that may be taken by the system 108 in response to inferring or predicting a characteristic of the consumer 102, the system 108 may determine whether to inform the consumer 102 of the specific nature of the reward(s) that are to be offered to the consumer 102 to incent performance of a task. The system 108 may then provide information to the consumer 102 about the reward in accordance with that determination. For example, the system 108 may, when it is determined that the specific nature is not to be revealed, inform the consumer 102 that some reward will be made available. As another example, the system 108 may, when it is determined that the specific nature is to be revealed, inform the consumer 102 of the particular reward(s) that will be offered to the consumer 102. The system 108 may provide the consumer with information about the reward(s) at any suitable time. For example, the system 108 may provide the information about the reward(s) before the consumer 102 performs the task, when the consumer 102 is to be incentivized to perform the task, or after the consumer 102 performs the task.

As another example of an action that may be taken by the system 108 in response to inferring or predicting a characteristic of the consumer 102, the system 108 may determine whether a reward is available for redemption by the consumer 102 and/or whether to notify the consumer 102 that a reward may be redeemed at a location that the consumer 102 is or is predicted to soon be near. In embodiments in which the system 108 provides rewards to consumers to incent the consumers to perform tasks, some of the rewards may be redeemable by the consumer only after one or more conditions are met. As mentioned above, such conditions may relate to limitations on a time at which the reward may be redeemed or a place the consumer must visit to redeem the reward, or may relate to behaviors in which the consumer 102 must engage before the reward may be redeemed. Accordingly, in some embodiments, when the system 108 processes location data for the consumer 102 to determine one or more characteristics of the consumer 102, the system 108 may determine whether one or more conditions for a reward have been met. If the system 108 determines that conditions for one or more rewards have been met, the system 108 may notify the consumer 102 that the reward/rewards is/are available for redemption.

As another example of an action that may be taken by the system 108 in response to inferring or predicting a characteristic of the consumer 102, the system 108 may compare characteristics of the consumer 102 predicted/inferred following the offering by the system 108 of and/or redemption by the consumer 102 of a reward to characteristics of the consumer 102 predicted/inferred beforehand. Conducting such a comparison may enable the system 108 to determine an impact of the reward on characteristics of the consumer 102. For example, the system 108 may determine whether, when the consumer 102 was offered a reward redeemable at a business, the consumer 102 became a more frequent customer of that business. This may enable the system 108 to determine whether the business is receiving a good return on the business's investment, in the case that the business pays a fee to the system 108 for the reward to be offered to consumers. Though, investment may alternatively or additionally be computed in other ways, such as based on the cost to the business of supplying rewards redeemed by consumers.

Comparing consumer behavior before and after being offered a reward may also enable the system 108 to determine whether rewards are skewing characteristics of consumers. While it may be desirable for a reward to influence behaviors of consumers to a degree, if the behavior of the consumers is swayed too much as a result of rewards, the influenced behaviors of the consumers may be too different from the consumers' normal behaviors for a study of the behavior to provide valuable information. Thus, in some embodiments, the consumer analytics system 108 may compare previously-determined characteristics and newly-determined characteristics for a consumer 102 in response to predicting or inferring one or more characteristics of the consumer 102. This comparison may be made for a consumer individually or for a group of consumers that are similarly situated. In some such embodiments, if the system 108 detects a difference in characteristics that may be indicative of skewing, the system 108 may notify an administrator or take other suitable action. The notification may identify the consumers believed to have been skewed and, if known, the rewards believed to have caused the skewing. In the case that skewing is detected, in some embodiments, rewards may be changed to rectify the skewing. For example, the system 108 may be configured to select a different reward for a skewed consumer, of the reward that caused skewing may be discontinued.

In some embodiments in which the system 108 offers a consumer 102 a reward for performing a task, the system 108 may include functionality to be informed when the consumer 102 redeems a reward. The system 108 may be able to receive information from the consumer 102, an organization with which the reward was redeemed, or any other party (e.g., a source of credit card information for a credit card the consumer 102 may have used in a transaction in which the reward was redeemed) regarding the redemption. The system 108 may be configured to take any suitable action in response to the reward being redeemed.

For example, the system 108 may be configured to determine, when information from an organization indicates a time and place at which the reward was redeemed, whether the consumer 102 was at that place at that time. By determining whether the consumer 102 was at the place of reported redemption at the time of reported redemption, the system 108 can determine whether the report of the redemption is accurate or is a potential sign of fraud. Fraud can arise, for example, when employees of a business falsely report a reward redemption. The system 108 can analyze other indicators of potential fraud, discussed in detail below, in response to receiving information informing the system 108 that a reward was redeemed.

As another example of an action the system 108 can take in response to receiving information indicating redemption of a reward, the system 108 may distribute information regarding the redemption to one or more other data stores, such as by distributing information to services outside of the consumer analytics system 108. For example, the consumer analytics system 108 may publish information regarding the redemption of the reward on one or more social media services. In some embodiments, the system 108 may be configurable with account information for one or more social media services that are used by a consumer 102. When the system 108 is so configured, the system 108 may publish to a consumer's account on a social media service that the consumer 102 has redeemed a reward. As another example of an action the system 108 can take in response to receiving information indicating redemption of a reward, the system 108 may determine attributes of the manner in which the reward was redeemed. For example, a time attribute for the redemption of the reward, such as a length of time between earning and redeeming the reward, may be determined for the consumer 102 and/or for a set of consumers who have redeemed the reward. As another example, a behavior attribute, indicating a behavior of the consumer at a time the reward was redeemed, may be determined for the consumer 102 and/or for a set of consumers who have redeemed the award. As another example, by comparing information regarding redemption of rewards by multiple consumers, differences in how different types or values of rewards may be identified or how consumers with different characteristics redeem the same rewards in different ways may be identified. When the system 108 determines information regarding a redemption of a reward, the system 108 may record this information in storage, present the information to an administrator of the system 108, a customer of the system 108 (e.g., an organization at which a reward may be redeemed), a consumer 102, or any other suitable party.

While in the examples given above the system 108 is described as taking the actions in response to predicting or inferring characteristics, it should be appreciated that the system 108 may be triggered to take the action(s) at any suitable time. In some embodiments, the system 108 may take the action contemporaneous with making the prediction/inference, such that the consumer 102 is prompted to perform a task and incented with a reward while the consumer 102 is at the location from which the characteristic was predicted/inferred. In other embodiments, however, the system 108 may prompt a consumer to perform a task and/or determine a reward at any time following the prediction/inference as embodiments are not limited in this respect. Examples of ways in which a consumer analytics system may process location data for multiple consumers, determine characteristics of consumers, and take actions based on determined characteristics are described in greater detail below. It should be appreciated that some of the examples below may not be described in connection with the illustrative environment described above in connection with FIG. 1. Embodiments are not limited to operating in any particular environment, including the environment of FIG. 1. Further, it should be appreciated that embodiments are not limited to acting in accordance with any of the examples below. In some of the examples below, tasks that a consumer may be requested to perform are answering survey questions and obtaining media (e.g., a photograph or video), but embodiments are not limited to requesting that a consumer perform any particular task. Additionally, in some examples below, an organization to which a task relates or with which a reward may be redeemed is referred to as a business or, specifically, an independent or chain retail chain/restaurant. It should be appreciated, however, that embodiments are not limited to operating with any particular type of organization, and that these are merely examples of commercial entities that may be organizations in some embodiments. Embodiments may operate in any suitable manner to process location data for consumers related to movements of the consumers in any suitable environment.

Illustrative Techniques

Figure 2:
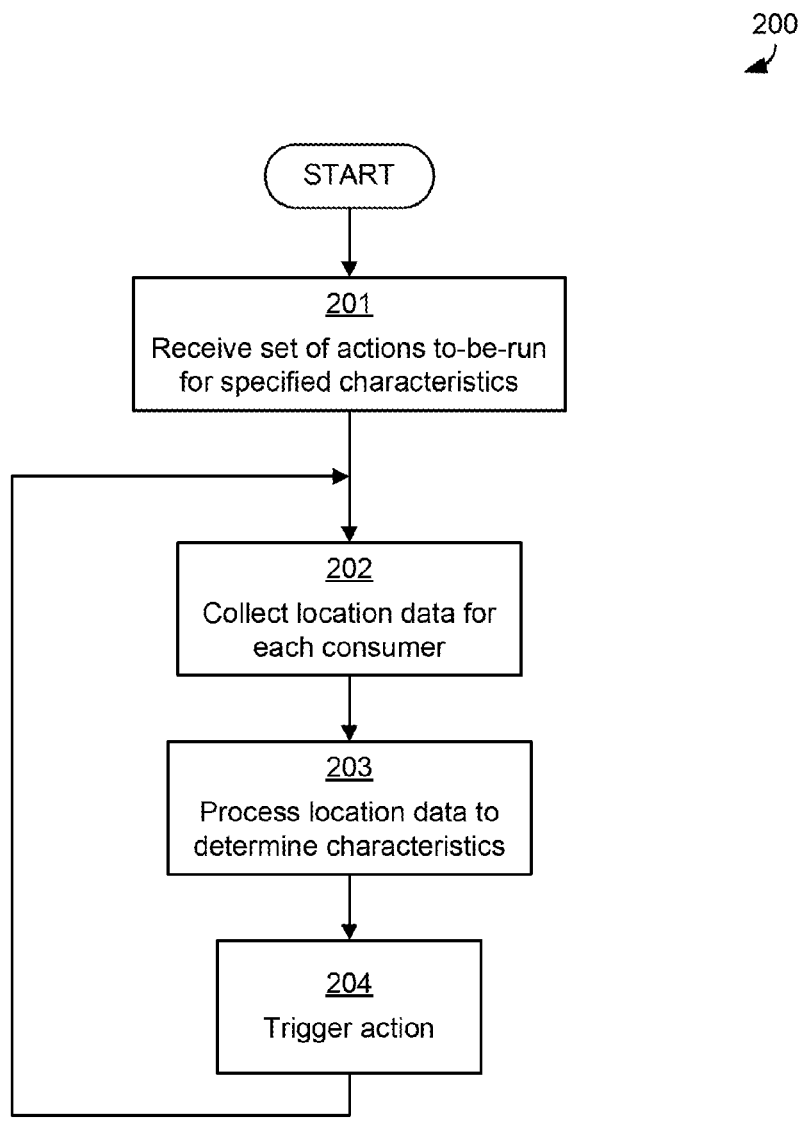
FIG. 2 is a flowchart of one exemplary process for triggering actions that gather information from and/or on consumers.

FIG. 2 illustrates one example of an overall process for collecting relevant and timely data from and about consumers to make inferences and predictions by using electronically-captured location data. The process of FIG. 2 begins in block 201, in which a set of actions to-be-triggered are input. The actions may be specified by any suitable one or more parties, as embodiments are not limited in this respect. In some embodiments, the actions may be specified by an administrator of a consumer analytics system. In other embodiments, the actions may additionally or alternatively be specified by one or more market researchers as part of defining a market research study. In embodiments in which the actions are specified as part of defining a study, the actions specified in block 201 may include actions to be taken by the consumer analytics system to collect information to be analyzed as part of the study. Actions to collect information may include actions to solicit information from one or more consumers and/or acquire information from one or more external data sources. Any suitable party may act as a market researcher in these embodiments, including professional market researchers or laymen doing market research. Additionally, the study may relate to any suitable topic. For example, a market research study may be carried out to determine characteristics of consumers that relate to a setting, of the set of setting 109 of the environment of FIG. 1, based on information about consumers of interest. The setting of the set 109 may be a commercial entity, such as a retail business.

Any suitable information regarding actions to be taken may be specified in block 201. In some embodiments, information describing the action to be taken may be specified. For example, where the action includes requesting that a consumer perform a task, the task may be described. Any suitable task to be performed by a consumer may be included in an action, as embodiments are not limited in this respect. In some cases, a task may include prompting a consumer to answer survey questions, in which case the survey questions and, optionally, acceptable answers to the questions may be specified in block 201. In embodiments that operate with surveys, any suitable surveys asking any suitable questions may be provided as input to a system and distributed to consumers, as embodiments are not limited in this respect. In some embodiments, a survey may ask consumers about the consumer's impressions of a setting visited by the consumer, the consumer's experiences at a setting, or the consumer's intentions in visiting a setting, or otherwise ask for subjective information held by the consumer that may relate to the consumer's opinions. A survey may additionally or alternatively ask a consumer about actions taken by the consumer at a setting, such as about the consumer's commercial interactions at a setting. For example, a survey may ask a consumer about purchases made at a setting, such as goods or services purchased or amounts spent. In other cases, a task may include prompting a consumer to obtain media or scan a Universal Product Code (UPC) barcode or Near Field Communication (NFC) tag, in which case the subject of the desired media or the object desired to be scanned may be specified in block 201. In still other cases, a task may include requesting that a consumer visit a setting and provide information or opinions about the setting, such as providing opinions regarding an arrangement of items in a setting, and the setting and topic of the desired opinion may be specified in block 201.

Additionally, specifying the action in block 201 may include specifying one or more conditions that, when satisfied, will result in the consumer analytics system taking the action. Any suitable conditions may be specified, including conditions related to one or more characteristics of one or more consumers determined from location data. For example, a condition may be satisfied when the consumer analytics system determines, from location data for a consumer, a characteristic of a consumer. A characteristic of a consumer may be a behavior characteristic of a consumer relating to a behavior in which the consumer was engaging when the location data was derived. Such a characteristic may be, for example, that the consumer is a customer of a commercial entity. As another example of a condition, a condition may be satisfied when the consumer analytics system determines a characteristic of a group of consumers. A characteristic of a group of consumers may be a characteristic of the group and not of individual consumers of the group (e.g., an average characteristic for the group) or a characteristic shared by consumers of the group. As another example of a condition, a condition may be satisfied based on an evaluation of a characteristic that describes a behavior. For example, a behavior characteristic may relate to a frequency with which a consumer performs a behavior, such as a frequency with which the consumer visits a retail business. An example of a condition that may be associated with an action is a condition that a behavior characteristic indicates that a frequency of a consumer's visits to a retail business is greater than two visits per month.

In one illustrative example of an action and a condition, an action includes requesting that a consumer respond to survey questions regarding a commercial entity for which market research is being conducted, and a condition for the action is that an analysis of location data for a consumer produces an inference that the consumer is a customer of the commercial entity. This action and condition may be specified in block 201. Subsequently (as discussed below), when location data for a consumer is analyzed and a characteristic indicating that a consumer is a customer of the commercial entity is inferred, the consumer analytics system may prompt that consumer to provide responses to the survey questions. The action taken by the consumer analytics system to prompt the consumer may be taken by the system contemporaneously with the consumer's presence at a location from which the characteristics satisfying the conditions were inferred. As another example, a system may infer from location data that consumers of a group of consumers who frequently shop at one store (or type of store) are visiting a competitor store not frequently visited by consumers of the group. In response to drawing the inference, the system may survey individual consumers who are members of the group to determine a purpose of the consumers' visits to the competitor store. The surveying may be conducted electronically, by transmitting messages to the consumers, and may be performed contemporaneously with the consumer's visit to the competitor store.

In block 202, location data is obtained for multiple consumers. Any suitable location data may be obtained, as embodiments are not limited in this respect. Location data may, in some embodiments, include geographic location data identifying a geographic location that results from a location measurement performed by a computing device using a location identification system like the Global Positioning System (GPS). A geographic location of a consumer may be defined according to a latitude, longitude, altitude, and/or margin of error that identifies the precision of the latitude, longitude, and altitude. Location data may also include time data indicating a time at which the location data for the consumer was obtained. Illustrative examples of location data are discussed below.

The location data may be obtained in any suitable manner. Examples of location data that may be obtained and ways in which location data may be obtained are discussed in detail below and in the '280 application that is incorporated herein by reference. In some embodiments, the location data for a consumer may be obtained in part using an electronic device associated with a consumer. The electronic device may be any suitable portable device that may move along with the consumer. The device may be carried by the consumer or may be integrated into an item associated with the consumer (e.g., integrated into a car, baggage, or clothing). The electronic device may obtain location data or be used in obtaining location data. Location data obtained by the electronic device may be transmitted to a consumer analytics system at any suitable time and in any suitable manner. In some embodiments, the electronic device may continuously or occasionally transmit location data for the consumer to a consumer analytics system without receiving a request for the location data from the system. In other embodiments, the consumer analytics system may occasionally request location data from the electronic device and the electronic device may transmit the location data upon receipt of the request. In still other embodiments, the electronic device may transmit location data without request at some times and the consumer analytics system may request location data at other times.

In block 203, the location data for each consumer of the multiple consumers is processed to determine characteristics for the consumers. As described in the '280 application that is incorporated herein by reference, the characteristics for a consumer that may be determined from location data include behavior characteristics, preference characteristics, and identity characteristics. In block 203, determining the characteristics of a consumer includes predicting and/or inferring behavior characteristics of the consumer. The behaviors of a consumer that may be indicated by characteristics may include visiting a particular setting (e.g., a particular store), doing a specific activity such as playing golf, or traveling via a specific mode of transportation. The processing of location data of block 203 may be performed by the consumer analytics system contemporaneously with the consumer's movements, as the location data is obtained for the consumer, such as while the consumer is visiting a setting or moving to one or more settings on a path.

As part of the processing of location data for the consumers, the consumer analytics system may determine whether to take an action, including whether to request that the consumer perform a task. To determine whether to take an action, characteristics of consumers inferred and/or predicted during the processing of block 203 are compared to conditions for actions specified in block 201. When conditions for an action are satisfied, the consumer analytics system may take the action. Accordingly, in block 204, based on the characteristics of the consumer inferred or predicted in block 203, an action is triggered when the characteristics satisfy one or more conditions. As discussed above, any suitable actions may have been specified in block 201 and may be taken in block 204. Actions may include prompting a consumer to perform a task, such as by sending a consumer one or more survey questions to respond to. The actions may additionally or alternatively include obtaining additional data from an external data source, such as data related to the consumer. Data related to the consumer may include sales transaction data, information entered into social networking or other system, or any other information. The actions may additionally or alternatively include determining a reward to incent a consumer to perform a task, notifying a consumer about a reward, determining whether a reward is available for redemption, determining an effect of a reward on a consumer's characteristics (including behaviors), and/or monitoring attributes of a manner in which a reward is redeemed and/or monitoring for potential fraud in redemption. As another example, actions may include adjusting one or more parameters of a visit detection process. The action taken by the consumer analytics system may be taken at any suitable time, including contemporaneously with the consumer's movements.

DETAILED DESCRIPTION OF SOME EMBODIMENTS

System Overview

Some embodiments include a consumer analytics system, implemented on a computing device, with a configured set of actions. The consumer analytics system may include a facility for processing location data, a set of points of interest, and a set of actions which can be performed. The facility may be executed by the computing device.

Techniques operating according to principles described herein may be implemented in any suitable manner. For example, the methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of example, methods, program codes, program instructions and the like described herein may be implemented in one or more threads. The threads may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like. "Storage medium," as used herein, refers to tangible storage media. Tangible storage media are non-transitory and have at least one physical, structural component. In a storage medium, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. A software program may be associated with a server that may include a file server, print server, domain server, internet server, intranet server and other variants such as secondary server, host server, distributed server and the like. The server may include one or more memories, processors, storage media, ports (physical and virtual), communication devices, and/or interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more memories, processors, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, and instructions described herein may be executed by one or more of the network infrastructural elements.

The methods, program codes, and instructions described herein and elsewhere may be implemented on a cellular network having multiple cells. The cellular network may either be frequency division multiple access (FDMA) network, a time division multiple access (TDMA) network, and/or a code division multiple access (CDMA) network, or any other suitable form of network implementing any suitable communication protocol and any suitable medium access control protocol. The cellular network may include mobile devices, cell sites, base stations, repeaters, antennas, towers, and the like. The cell network may be a network carrying out a protocol for Global System for Mobile Communications (GSM), General Packet Radio Service (GPRS), any third-generation (3G) network, Evolution-Data Optimized (EVDO), ad hoc mesh, Long-Term Evolution (LTE), Worldwide Interoperability for Microwave Access (WiMAX), or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

Computer software, program codes, and/or instructions may be stored and/or accessed on machine readable storage media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; or other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the drawings and descriptions herein set forth functional aspects of the disclosed systems, no particular arrangement of software for implementing these functional aspects should be inferred from these descriptions unless explicitly stated or otherwise clear from the context. Similarly, it will be appreciated that the various steps identified and described herein may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described herein, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being stored on a machine readable medium.

Computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described herein and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described herein may include any of the hardware and/or software described herein. All such permutations and combinations are intended to fall within the scope of the present disclosure.

Figure 3:
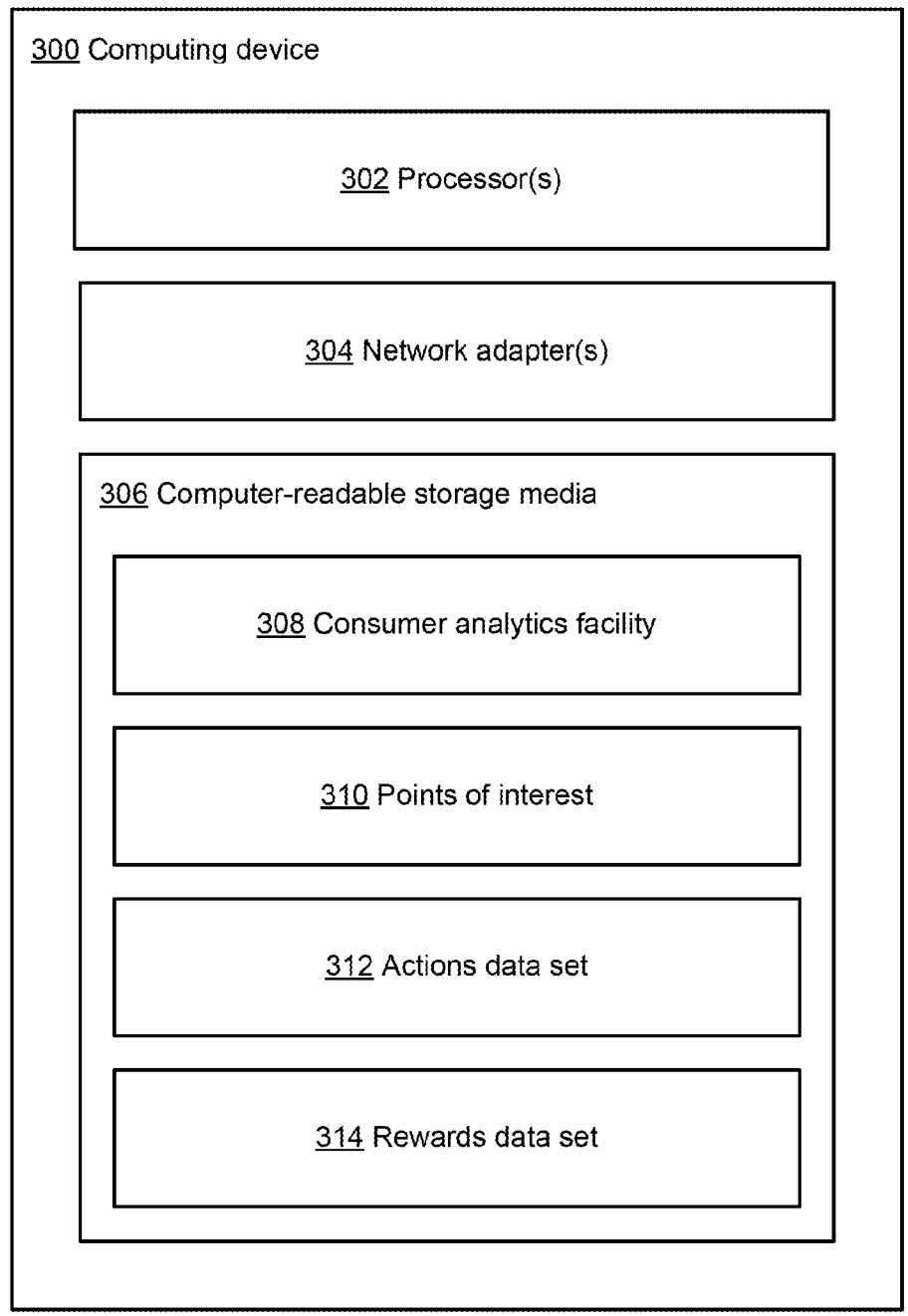
FIG. 3 is a block diagram of one exemplary computing device with which embodiments may operate.

FIG. 3 illustrates one exemplary implementation of a computing device in the form of a computing device 300 that may be used in a system implementing the techniques described herein, although others are possible. It should be appreciated that FIG. 3 is intended neither to be a depiction of necessary components for a computing device to operate in accordance with the principles described herein, nor a comprehensive depiction.

Computing device 300 may comprise at least one processor 302, a network adapter 304, and computer-readable storage media 306. Computing device 300 may be, for example, a desktop or laptop personal computer, a server, a collection of personal computers or servers that operate together, or any other suitable computing device. Network adapter 304 may be any suitable hardware and/or software to enable the computing device 300 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 306 may be adapted to store data to be processed and/or instructions to be executed by processor 302. Processor 302 enables processing of data and execution of instructions. The data and instructions may be stored on the computer-readable storage media 306 and may, for example, enable communication between components of the computing device 300.

The data and instructions stored on computer-readable storage media 306 may comprise computer-executable instructions implementing techniques that operate according to the principles described herein. In the example of FIG. 3, computer-readable storage media 306 stores computer-executable instructions implementing various facilities and storing various information as described herein. Computer-readable storage media 306 may store a consumer analytics facility 308 for obtaining location data for consumers via network adapter 304 and determining characteristics, including behaviors, of the consumers. The consumer analytics facility 308 may perform any of the exemplary techniques described herein, and may include any of the exemplary facilities described herein. In some embodiments, the consumer analytics facility 308 may include functionality relating to a survey market system, including functionality discussed below. Computer-readable storage media 306 may also include data sets to be used by the consumer analytics facility 308, including a data set 312 of actions that the facility 308 can be configured to prompt a consumer to take and their associated triggering values, a data set 310 of points of interest, which may include information about locations and types of points of interest, and a data set 314 of rewards, including information on parameters of rewards eligible to be offered to consumers.

While not illustrated in FIG. 3, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

While the invention has been disclosed in connection with the preferred embodiments shown and described in detail, various modifications and improvements thereon will become readily apparent to those skilled in the art. Accordingly, the spirit and scope of the present invention is not to be limited by the examples herein, but is to be understood in the broadest sense allowable by law.

Examples of Techniques for Obtaining Location Data

As mentioned above, embodiments are not limited to implementing any particular technique for obtaining location data. In some embodiments, techniques for obtaining location data described in the '280 application incorporated herein by reference may be implemented.

In some embodiments, a system may use one or more of many different methods for gathering consumer location data based on a personal device (such as a mobile phone, tablet, or laptop computer). Location data may include information identifying a geographic location. Information identifying a geographic location may include latitude, longitude, altitude, and an error measure. Location data may also include a timestamp. In some embodiments, an electronic device associated with and/or operated by a consumer may determine the location data alone and transmit the determined location data to a consumer analytics system. In others, one or more other devices, such as components of a network to which the electronic device is connected and/or able to communicate, may cooperate with the electronic device to determine the location data.

Techniques for obtaining location data that may be used in embodiments include techniques for measuring a physical location of a consumer. Techniques for measuring a location including cell tower identification, enhanced cell identification, Uplink-Time difference of arrival, Time of arrival, Angle of arrival, enhanced observed time difference (E-OTD), GPS, Assisted-GPS, hybrid positioning systems, Global Navigation Satellite System (GLONASS), the Galileo navigation system, location-determination services using access points for wireless local area networks (WLANs), and the like.

In some embodiments, location data comprising measurements of physical location may additionally or alternatively be obtained using paging, triangulation, and the like. A common method is to triangulate a location of the device based on nearby towers that provide wireless phone/data service. In the case of mobile phones, the phones may emit a roaming signal to contact the next nearby antenna tower. The phone's position can be figured out by multilateration based on the signal strength of nearby antennas. A similar method is to do a similar triangulation but instead of using towers used to provide wireless service, use Wi-Fi or other similar systems. This may be particularly useful in cases in which mobile tower signal is poor (in remote areas, for example) or not available on the device.

In some embodiments, in addition to or as an alternative to obtaining location data that includes measurements of physical location using satellite-based systems and/or triangulation, location data may be determined from information stored by data sources that are linked to the user and/or device. Such data may include identifications by a user of setting visited by the consumer or that the consumer is visiting. For example, if a consumer provides information to a data source indicating a location of the consumer, that information may be used in identifying a location of the consumer. Such information may include a message posted to a social networking service saying "I just arrived in Boston." From the user's statement of his or her location, a consumer analytics system with access to the information can infer that the consumer is in the vicinity of Boston. Additionally or alternatively, predictions of location may be used. Predictions may be obtained in any suitable manner. For example, by using an accelerometer built into an electronic device that is carried by a consumer (e.g., an accelerometer of a mobile phone), a speed the consumer is traveling may be estimated and used along with a last known location for the consumer to estimate a current location of the consumer. In some embodiments, multiple different kinds of data indicative of location may be analyzed together in determining locations visited by consumers, which may increase the amount and quality of location data.

In some embodiments, different data sources may also be used to increase the quality of the data collected by changing which data sources are used and how often the data sources are polled. For example, if location data indicates a consumer is moving, it may be useful to increase the rate at which data is gathered.

Location data for consumers may be obtained by a consumer analytics system in any suitable manner. In some embodiments, location data can be pulled by the system. To pull the location data, the consumer analytics system may query a communication network, such as a communication network to which an electronic device associated with a consumer is connected. The network may locate the device in response to the query and produce location data and/or request that the device provide location data. In other embodiments, the consumer analytics system may obtain location data for a consumer by having an electronic device associated with the consumer push location data to the consumer analytics system periodically. In some embodiments in which a device pushes location data periodically, it may be desirable that the device obtains location data and sends the location data to the system automatically and transparently to a consumer associated with the device, without receiving input from the user.

Examples of Processing Location Data to Build a Consumer Profile

The consumer analytics system may receive multiple different units of location data for any given consumer over time. The location data for a consumer may be in the form of a set of data points that each identifies a location through which the consumer passed.

From analyzing this location data, a consumer analytics system may generate a unique list of settings visited by each consumer. The list may be "unique" in that the list does not include multiple entries corresponding to a single visit by a consumer to a setting, or because the list does not include multiple listings for a setting. To generate the unique list, the consumer analytics system may identify "anchors" from locations that are similar in time and space. The consumer analytics system may also identify settings corresponding to the anchors and may produce information about a consumer based on the settings visited by a consumer. Additionally, by analyzing the unique list of physical locations and/or settings visited by a consumer, patterns can be identified in the settings that may be used by the consumer analytics system to determine characteristics of a consumer. For example, an identity, behaviors, and preferences of the consumer can be identified through analysis of location data. The location data that is analyzed may include an identification of locations at which the consumer was present and/or settings visited by the consumer. Additionally, personally-relevant locations for the consumer, such as the place of residence and place of employment of the consumer, can be determined through analysis.

The consumer analytics system may also examine sets of location points corresponding to movement, rather than only location points corresponding to stops the consumer made at particular locations, to determine characteristics of a consumer. Location data corresponding to movement may provide information about paths traveled by a consumer. For example, by using the distance and time between points, the consumer's speed can be computed. The consumer's speed, along with whether or not the points are over roads, rail lines, etc. may be used to determine if a consumer is traveling by car, rail, plane, etc. In addition, the distance from the consumer's home of a location visited by a consumer can be computed using information about a path.

The '280 application that is incorporated herein by reference describes in detail techniques that may be implemented in some embodiments for determining anchors, paths, and settings from location data for a consumer. The '280 application also describes in detail techniques that may be implemented in some embodiments for analyzing location data, anchors, paths, and settings to determine characteristics of consumer.

Visit Detection

In some embodiments, when a consumer analytics system receives location data for a consumer, the consumer analytics system may perform a visit detection process on the location data to identify settings visited by consumers. A setting may be a place to which a location corresponds, such as a commercial or non-commercial place (e.g., business or park). A position of a setting may correspond to a set of physical location falling within defined location boundaries of the setting, as discussed below. When a consumer is detected to have been present at a location falling within the location boundaries of a setting, through a visit detection process the consumer can be detected to have visited the setting.

A visit detection process may be performed by a consumer analytics system in any suitable manner, as embodiments are not limited to identifying settings visited by consumers in any particular way. Examples of ways in which a visit detection process may be carried out are described below and in the '280 application that is incorporated by reference herein.

A visit detection process may be carried out because, in some embodiments, one element of detecting consumer characteristics, including behavior characteristics, from location data is to determine what stores, restaurants, sports venues, and other settings a consumer visits. The process 400 of FIG. 4 is an example of a visit detection process that may be carried out in some embodiments.

Figure 4:
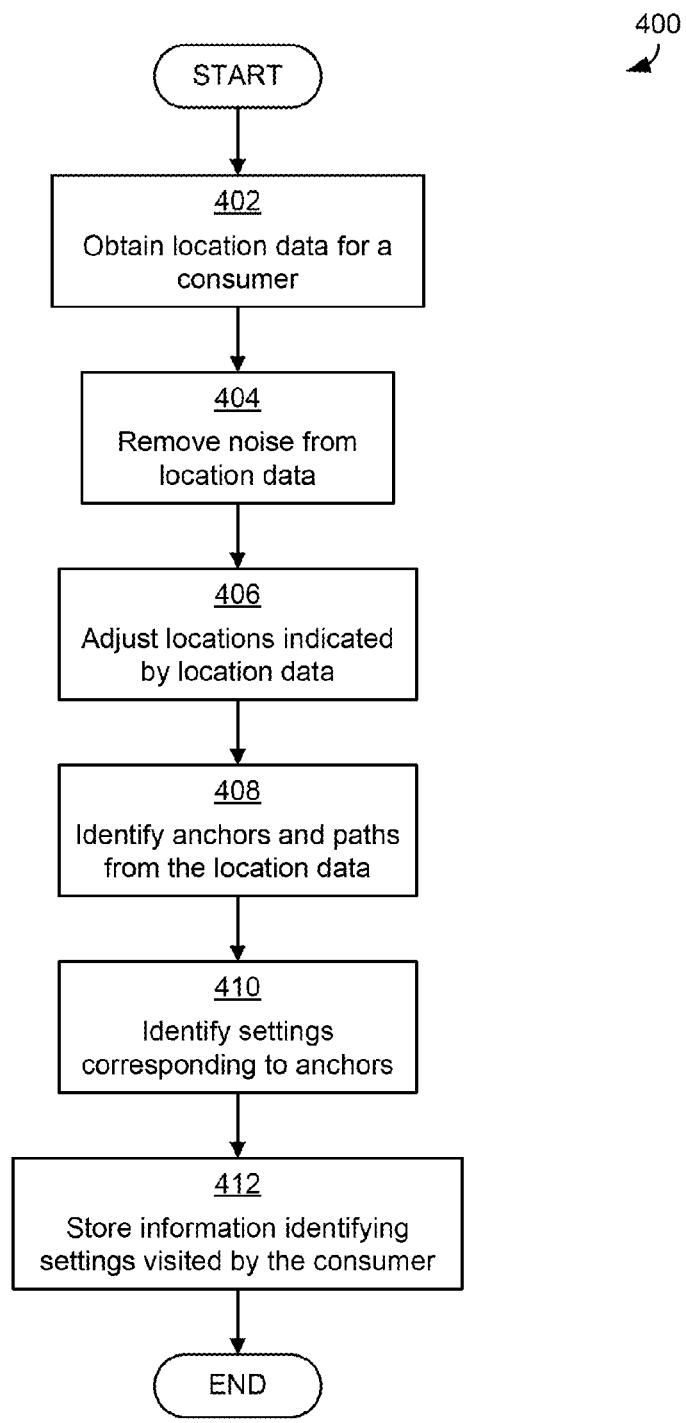
FIG. 4 is a flowchart of an example of a process for determining a setting visited by a consumer based on location data obtained for the consumer.

The process 400 of FIG. 4 begins in block 402, in which a set of location data points for a consumer is obtained. The location data points may be obtained in any suitable manner, examples of which are described above. In block 404, the location data may be analyzed to remove "noise" from the location data points. Noise in the location data points may include location data points that are not valid. Invalid location data points may include points indicating locations that are not physically possible or very unlikely. Impossible or unlikely location data points may include data points such as:

Points that indicate the consumer is traveling faster than the speed of sound; and A trail of connected points roughly following a line with one outlier that is clearly disconnected.

In order to remove the noise in block 404, the consumer analytics system can traverse the location data points for a consumer one-by-one and discard any location data points that do not meet one or more criteria for not being noise or satisfy one or more criteria for being noise. Criteria for being noise may include detecting that a location data point is either physically impossible or very unlikely, or any other suitable criteria.

Once noise is removed in block 404, as part of the processing of location data, in block 406 the consumer analytics system may enhance the data by adjusting locations indicated by location data. For example, location data points may be pushed from unlikely places to likely places. As an example, if the time and distance between points and altitude indicate the consumer is likely traveling in a car, the points obtained during this time could be cross-referenced with the known location of roads. The points could be moved to correspond to a road, which is most likely where the point is given that the car would likely be driving on roads. Adjusting the location data points in this way may compensate for errors in the locations identified by location data points, such as errors that may result from imprecise processes for obtaining location data.

Once a good set of location data points for a consumer have been obtained through processing of blocks 402-406, the location data points can be analyzed to identify travel paths ("paths") and stationary locations ("anchors"). Paths and anchors may be identified by the consumer analytics system in block 408 by looking at the time and distance between points and by applying a clustering algorithm. For example, such a clustering of the sequential location points may be carried out using Euclidian distance clustering. In one example of a Euclidian distance clustering, locations within 200 meters of one another may be identified as being related to a same potential anchor. In some embodiments, each location identified by location data processed by the consumer analytics system may include an uncertainty radius. The uncertainty radius around each location may be used to more accurately cluster nearby location points using statistical methods. When a location indicated by a location data point is similar to a location indicated by another location data point and is within the uncertainty radius of the other location data point, the consumer analytics system may conclude that the location data points both relate to one location visited by a consumer. An anchor may be identified at least in part as a cluster of locations corresponding to multiple different location data points. Additionally, by comparing time differences between location points related to the same potential anchor, a duration of time spent by consumer at the potential anchor can be determined. Each cluster of locations associated with a duration above a threshold, such as duration of greater than five minutes, may be identified by the consumer analytics system as an anchor. In some embodiments, the calculated location for an anchor may be a geometric mean of the individual location data points associated with the anchor.

In block 410, the consumer analytics system may use the anchors to identify settings visited by a consumer. The consumer analytics system may utilize a data set of settings, including Points of Interest (POIs), to identify settings, including identifying locations corresponding to POIs defined in the data set. The data set may include a collection of places of one or more kinds (e.g., stores, restaurants, sports venues, transportation terminals, office buildings, etc.) that a consumer may visit. Each setting in the data set may be defined at least in part as a polygon that defines a location of the point of interest. Examples of ways in which the polygon may be defined are described in detail below. Additionally, in some embodiments, information regarding a setting may include a set of operational information (e.g., the hours of operation, the operational type, e.g., a terminal for plane/boat/rail travel, etc.) and a set of categorical information about the setting (e.g., a retail location, restaurant, or stadium).

The consumer analytics system may identify the settings visited by the consumer by examining each anchor and determining a likelihood that the consumer visited the given POI. A consumer analytics system may determine the likelihood in any suitable manner, as embodiments are not limited in this respect. In some embodiments, the likelihood may be calculated by the consumer analytics system based on a number of factors, including:

the likelihood that a cluster of location points representing the anchor corresponds to a location within the bounds of the POI;

whether the time range of the anchor falls within the operational hours of the POI;

whether the anchor duration falls with the expected visit duration to the given POI (e.g., consumers typically spend 1.5-3 hours at movie theatre; a visit of 30 minutes is unlikely);

whether the already-computed behavior of the consumer indicates that she is likely to visit the POI or visit the POI at the time-of-day, day-of-week, time-of-year, etc. at which location data for the anchor was collected;

and any other suitable factors.

When a likelihood of an anchor matching a setting is calculated by the consumer analytics system, the likelihood may be compared to a threshold. If the likelihood exceeds the threshold, the anchor may be determined to correspond to the setting and the consumer may be determined to have visited the setting. Any suitable threshold having any suitable value may be used, as embodiments are not limited in this respect. Additionally, the threshold may be used for any suitable number of settings. In some embodiments, the same threshold may be used by the consumer analytics system for all settings, such that each time the consumer analytics system calculates a likelihood of an anchor corresponding to a setting, the likelihood may be compared to the threshold. In other embodiments, different thresholds may be used for different settings. In some embodiments that use multiple different thresholds, each setting in the set of settings that can be identified through the visit detection process may be associated with an individual threshold corresponding to that setting. When a likelihood of a consumer visiting the setting is calculated, the likelihood may be compared to the threshold for that setting. In other embodiments that use multiple different thresholds, a group of multiple settings may share a threshold. Any suitable group of settings may be defined, as embodiments are not limited in this respect. Settings having a similar location or being of a similar type may be grouped in some embodiments.

In block 412, once the consumer analytics system has matched location data for consumers to settings visited by the consumers in block 410, the consumer analytics system may store information resulting from the determination of block 410. The stored information may include information identifying that a consumer has visited a setting, when an anchor for a consumer was determined to match a setting. The stored information may also include information identifying that an anchor of a consumer was not matched to any settings, if the consumer analytics system could not match an anchor to settings. Once the information is stored in block 412, the process 400 ends.

Following the process 400, the information stored by the consumer analytics system may be used in any suitable manner. For example, as discussed herein and in the '280 application incorporated herein by reference, settings visited by consumers may be analyzed to determine characteristics of consumers and/or to conduct market research. Characteristics of consumers determined from the settings may also be compared to conditions for actions, and a consumer analytics system may take an action in response to determining that one or more characteristics of one or more consumers satisfy conditions for an action. As another example, information identifying that an anchor for a consumer does not match any settings for which the consumer analytics system has information may prompt adjustments to the visit detection process, including adjustments to definitions of settings. As discussed in detail below, in some cases in which the consumer analytics system cannot match an anchor for a consumer to a setting, the consumer and/or an administrator of the consumer analytics system may be prompted to provide information about the location visited by the consumer and this information may be used to define a setting. Once the setting is defined, the consumer analytics system may be able to match anchors to that setting.

The exemplary visit detection process described above in connection with FIG. 4 was described as being carried out by a consumer analytics system in response to receiving location data from a source of location data, such as a device associated with a consumer. It should be appreciated, however, that embodiments are not limited to implementing the visit detection process on a server or any other computing device that receives location data from another device. In some embodiments, a device that measures a physical location of a consumer may perform a visit detection process. In such cases, the device may measure the physical location of the consumer over time and apply a visit detection process as above by comparing locations of the consumer to definitions of settings. The set of settings may be stored on the device that measures the location and performs the visit detection process or may be stored elsewhere accessible to the device, such as on a server that the device may communicate with over a network (e.g., a local network or a wide-area network such as the Internet).

Triggering Data Collection Actions Based on Determined Consumer Characteristics

In some embodiments, location data, as well as settings visited by a consumer and/or paths or trips taken by consumers, may be analyzed by the consumer analytics system to infer and/or predict characteristics of consumers or groups of consumers. The characteristics of consumers may be used to build profile about consumers, and these profiles may be used to perform market research. In addition, in some embodiments, location data can be used to discover when a consumer exhibits characteristics of interest, including performing a behavior of interest.

A characteristic of interest, including a behavior of interest, may be any suitable characteristic (including a behavior characteristic) of a consumer that may be determined from location data and in which a market researcher may be interested. Characteristics of interest, as mentioned above, may be related to conditions of an action that may be taken by a consumer analytics system. The characteristics may relate to commercial activities of consumers. For example, a market researcher may be interested in better understanding how consumers choose which kind of peanut butter to buy. By processing consumers' location data and identifying, using a visit detection process, stores visited by consumers, the consumer analytics system may be able to detect when a consumer has arrived at or was present at a store that sells peanut butter. In response to inferring a behavior characteristic for a consumer indicating that the consumer has visited the store, the consumer analytics system may take an action that includes sending the consumer a message prompting the consumer to answer survey questions. The survey questions may ask whether the consumer bought peanut butter, which, if any, kinds of peanut butter the consumer bought, and why, and/or kinds of peanut butter the consumer did not buy and why not. The consumer's responses to these survey questions may aid the market researcher in understanding the mindset that went into the consumer's decision to purchase peanut butter.

As mentioned above, characteristics of a consumer that may be determined from location data include behavior characteristics of consumers that relate to behaviors of the consumers. Behaviors of consumers may include behaviors that extend for a period of time. For example, a consumer's visit to a setting or a consumer's shopping trip that includes visiting one setting and driving past another setting may be behaviors that extend for a period of time (e.g., the period of time the consumer was at a setting). When a behavior extends for a period of time, in some embodiments a consumer analytics system may obtain location data for the consumer, determine characteristics for the consumer, and carry out an action while the behavior is ongoing. In some such embodiments, the consumer analytics system may determine characteristics of consumers and take action contemporaneously with a consumer's behavior by determining the characteristics and taking action when the consumer is predicted to be about to engage in a behavior, when the consumer is determined to be engaging in the behavior, when the consumer is determined to have recently ended a behavior, and/or when the consumer is detected to be about to end a behavior. A consumer analytics system may take an action contemporaneously with a consumer's behavior when the consumer has not yet engaged in another behavior or moved in a manner from which the consumer analytics system has determined another behavior of the consumer.

As discussed above in connection with FIG. 2, a consumer analytics system may receive input defining any suitable action to be taken in response to any suitable condition(s). The condition(s) may relate to any suitable one or more characteristics of one or more consumers determined by a consumer analytics system from location data for one or more consumers. The characteristic(s) that may be determined by the consumer analytics system and that may satisfy conditions for an action may include one or more characteristics of a single consumer inferred or predicted by the consumer analytics system. Additionally or alternatively, the characteristics may include one or more characteristics that are shared by consumers of a group of consumers and that are inferred or predicted by the consumer analytics system, or one or more characteristics of a group that are not associated with any particular consumer (e.g., an average characteristic for a group). The characteristics that may be determined for one or more consumers may be characteristics that relate to commercial activity of one or more consumers.

As mentioned above and as described in detail in the '280 application incorporated herein by reference, characteristics for one or more consumers that may be inferred or predicted by a consumer analytics system may include behavior characteristics, identity characteristics, or preference characteristics.

Behavior characteristics may include any suitable information regarding behaviors of a consumer. Characteristics of behaviors may include information about activities in which a consumer does or does not participate or a manner in which the consumer participates in an activity. Information on a manner in which the consumer participates in an activity may include information on a frequency or periodicity of the consumer's participation in the activity. Additionally, predictions of whether a consumer is likely to participate in an activity may be inferred or predicted as behavior characteristics. Behaviors of a consumer may include retail-relevant behaviors and lifestyle-relevant behaviors. Retail-relevant behaviors may include behaviors relating to commercial activities engaged in by a consumer. Commercial activities may include activities in which a monetary transaction takes place or could take place, including visits to any location at which consumers could purchase products or services. Lifestyle-relevant behaviors may include information about consumers' work life, home life, and regular routine, including their recreational behaviors. Lifestyle activities include visits to and time spent at a consumer's residence and place of employment; travel patterns and habits, including commuting patterns and air travel; and visits to outdoor recreation destinations, nightlife locations, sports and entertainment venues, museums, amusement parks, tourist destinations, or other recreational destinations.

Identity characteristics may include demographic and socioeconomic attributes of a consumer. Demographic and socioeconomic attributes of a consumer may include where a consumer lives, information about a consumer's family, where a consumer works, and what a consumer does for work.

Preference characteristics may include information on preferences of a consumer regarding commercial activities and/or lifestyle-relevant activities in which the consumer engages or desires to engage. Preference characteristics regarding commercial activities of a consumer may include preferences of the consumer for particular types of products or services or particular products or services. Brand loyalties of a consumer may be included in preference characteristics for the consumer.

For characteristics that a consumer analytics system is configured to infer or predict based on location data, the consumer analytics system may also infer or predict a strength of the characteristic or a likelihood that the characteristic has been correctly inferred/predicted.

Any characteristic of a consumer or group of consumers that is inferred/predicted by the consumer analytics system for the individual consumer or for a group of consumers in which the consumer is included may be a condition of an action or may be evaluated to determine whether one or more conditions have been satisfied. In examples described below, characteristics of a consumer that may trigger a consumer analytics system to take an action include behavior characteristics that relate to commercial activity, including that relate to a commercial activity in which the consumer is engaging at the time the behavior characteristics are identified. In some embodiments, identity and/or preference characteristics may additionally or alternatively satisfy conditions that, when met, trigger the system to take an action. Further, while examples of behavior characteristics that may trigger an action are described herein, it should be appreciated that characteristics of a consumer related to any suitable behaviors may be used as conditions of an action or evaluated to determine whether one or more conditions have been met. Examples of behaviors that, in embodiments, could trigger a consumer analytics system to take actions when the system infers/predicts characteristics of a consumer related to the behavior include (but are not limited to):

Outdoor recreational (hiking, biking, swimming, sailing, beach, etc.);
 Viewing or playing sports (baseball, football, golf . . . );
 Watching a movie in a movie theatre;
 Visiting a known location (like one's place-of-work or home);
 Going inside a retail store, restaurant, convention center, or other point of interest;
 Driving past a retail, store, restaurant, convention center, or other point of interest;
 Traveling on a path that includes visits to particular stores, such as a first store or store of a first type (e.g., a grocery store) and a second store or store of a second type (e.g., a department store that includes a grocery department);
 Deviating from a behavioral pattern, such as by visiting a setting or type of setting the consumer does not typically visit;
 Traveling toward a setting;
 Making a purchase at a setting;
 Moving in a trip that includes a visit to one setting or type of setting and does not a visit to another setting or another type of setting;
 Driving past a billboard or other "Out of Home" (OOH) advertisement;
 Taking a trip by air, rail, car, bus, or boat; and
 Any combination of the foregoing.

As consumer characteristics are predicted and/or inferred by a consumer analytics system of a consumer analytics system, the consumer analytics system may take one or more actions when conditions for taking the actions are satisfied by the characteristics. Any suitable action may be taken. In some embodiments, information collection actions may be triggered by consumer characteristics meeting conditions for the actions. In some embodiments, information storage actions may be triggered by consumer characteristics meeting conditions for the actions.

An information collection action that may be taken by a consumer analytics system may include collecting any suitable information from any suitable source. In some cases, a consumer analytics system may collect information from a consumer by soliciting information from the consumers. Information may be solicited in any way, including by sending messages to a consumer requesting that the consumer perform a task. In other cases, a consumer analytics system may collect information from a data source external to the consumer analytics system. information that may be collected by a consumer analytics system may include any suitable information, including information related to one or more commercial entities, products, and/or services. In some embodiments, a consumer analytics system may collect information relating to commercial activity. Information regarding commercial activity may relate to commercial activity of a consumer and/or of a commercial entity. Information regarding a commercial activity may relate to a consumer, a commercial entity, and/or interactions between a consumer and a commercial entity. The information that is collected may be information that the consumer analytics system may evaluate to determine characteristics of a consumer and/or characteristics of a group of consumers related to commercial activity, such as behavior, identity, or preference characteristics of a consumer or behavior, identity, or preference characteristics shared by consumers of a group of consumers.

Rewards Types & Granting of Rewards

Figure 5:
FIG. 5 is an exemplary image of an interface for a consumer to see which surveys have been triggered and available for her to complete.
Figure 6:
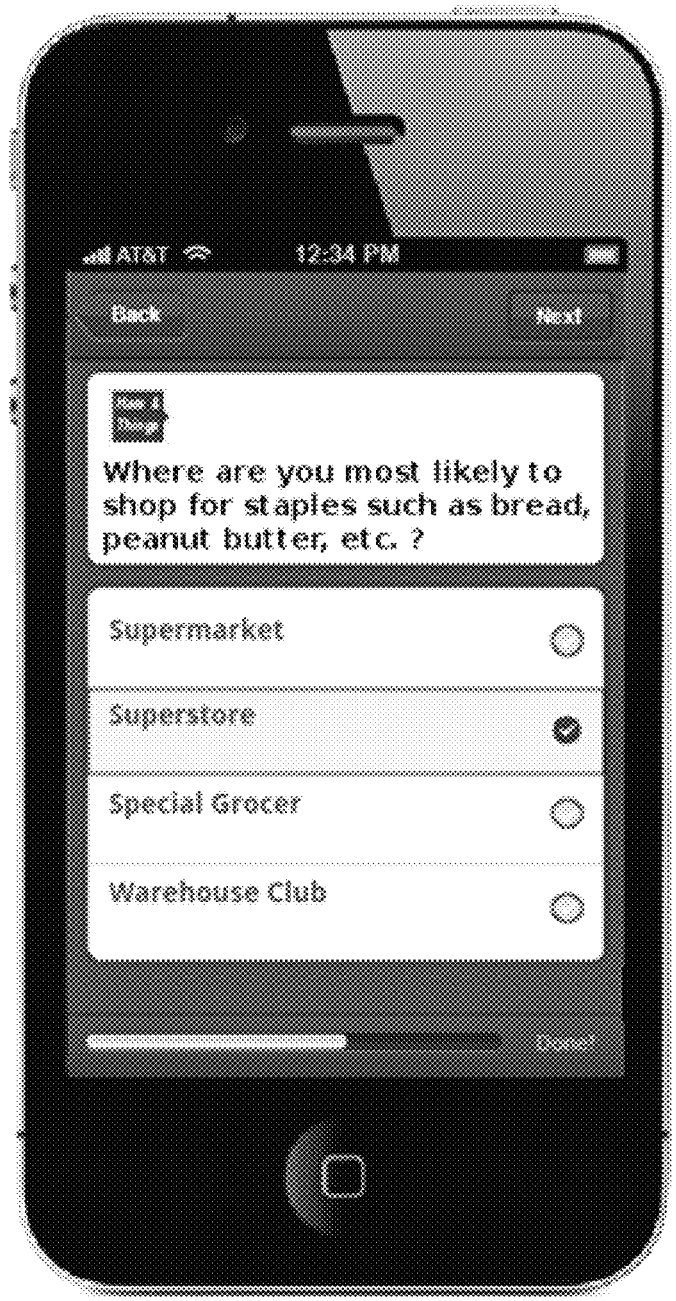
FIG. 6 is an exemplary image of one screen of an interface for a consumer to complete a survey.

In some embodiments, the consumer analytics system may incent consumers to opt-in to sharing electronically-captured location data with the consumer analytics system and/or to perform a task (e.g., provide information as part of a task, such as by completing a survey) requested by such a system as a result of location-triggered actions, in return for rewards. Such rewards may include, but are not limited to, food or beverage coupons or vouchers, merchandise discounts, discounts on their purchases (e.g., 15% off), entries into prize drawings, material goods, or cash. As illustrated in FIG. 5, for example, the consumer analytics system may render an interface, which may be displayed to a consumer via a mobile device, by which a consumer may view tasks the system 108 desires the consumer to perform (e.g., answering survey questions) and rewards that are offered to the consumer for performing the tasks. FIG. 6 illustrates an example of another interface that may be displayed to a consumer via a mobile device by which a consumer may perform a task that includes answering survey questions.

In some embodiments, consumers may be incentivized to complete a location-triggered task by being offered a reward that they will receive upon completion of a task. In some embodiments, the consumer analytics system may inform consumers in advance of performing the task of a specific reward the consumers will receive. In other embodiments, consumers will not be informed of their reward until after they have completed the task. In still other embodiments, the system may determine dynamically whether or not to inform a consumer of the reward in advance, and this element of variability may be used, in part, to maintain an element of surprise so as to increase consumer engagement.

In some embodiments, consumers may earn rewards through the accrual of reward points that are granted for performance of tasks. Such rewards points may be redeemable for discounts on purchases at business, gift cards, cash, any good or service, or any other suitable incentive. Such rewards points may, in some embodiments, be redeemable for incentives with the consumer analytics system or with a business, different from the consumer analytics system, that the consumer may visit. Accordingly, in some embodiments, the consumer analytics system may maintain accounts or other information relating to consumers in which information about rewards is stored and updated. In some such embodiments, the consumer analytics system may grant rewards points based on any suitable factors, such as in proportion to the number of days of location data-sharing by the consumer, the number of location-triggered tasks completed by the consumer, and/or any other metric by which a consumer's performance of tasks may be measured. Some other metrics that may be used may relate to the manner in which consumers perform tasks. For example, the brevity of the turnaround time with which a consumer fills out a location-triggered survey, obtains media (e.g., a photograph), or otherwise completes a task, or the quality of their open-response survey response text, the quality of their media, or the quality of any other response requested by a task, or any other standard by which the quality of a survey response or response requested by a task, may be used by the system to determine a reward (including a type of reward and/or a value of a reward) to offer.

In some embodiments in which reward points are offered by the consumer analytics system, the system may also offer rewards that may be redeemed at organizations visited by consumers, Such organizations visited by consumers may be organizations that are related to a condition for a survey to be distributed to a consumer. For example, when a survey is distributed in response to a consumer's characteristics relating to a business (e.g., a manner in which the consumer visits or does not visit the business), the consumer analytics system may offer one or more rewards that are redeemable with the business. The consumer analytics system may offer rewards redeemable at a business to consumers that received surveys based on the characteristics of the consumer's interactions with the business. In some such embodiments, the consumer analytics system may determine either to provide consumers with rewards that are redeemable at organizations or with reward points. The system may determine which to provide based on commercial relationships the consumer analytics system has (or an operator of such a system has) with organizations, such as contracts the system has with businesses. For example, if characteristics of a consumer's interactions with a business triggered distribution of a survey, the system may select whether to provide the consumer with a reward redeemable at the business or reward points based on an identity of that business. The system may evaluate the identity of the business to determine whether the business is one with which the system has a commercial relationship, such as whether the business purchases consumer analytics data or survey opportunities from the consumer analytics system. If the business has a commercial relationship with the system, the system may offer consumers a reward that is redeemable at the business, which may encourage consumers to later return to the business and patronize the business again. If, however, the business does not have a commercial relationship with the system, the system may offer consumers reward points.

In some embodiments, the reward that the consumer analytics system may offer to a consumer may be an instant reward or may be a conditional reward.

An instant reward may be one that provides a value to the consumer when the consumer is offered the reward. An instant reward may not have a condition attached to the reward and/or may not require that the consumer perform any other task or take any other action (e.g., engage in any other behavior) to earn the value of the reward. Instant rewards may be granted following completion of specific location-triggered tasks by the consumer, or may be granted randomly or pseudo-randomly following the completion of such tasks. In some embodiments, at least some instant rewards may be of high value, which may increase consumer engagement by encouraging customers to desire rewards. In some such embodiments, high-value rewards may be given out with a lower frequency than lower value rewards. This may provide consumers with a game or lottery element for the rewards, where the consumers have a chance of obtaining a high-value reward, but where there may be a low probability of any particular consumer receiving the high-value reward in response to the consumer performing any particular task.

A conditional reward may be a reward for which a consumer may only redeem the value once the consumer has met one or more conditions, such as by performing some other task or engaging in some behavior. In some embodiments, the identity of a conditional reward may be hidden from the consumers until the one or more conditions are met, while in other embodiments the consumer may be notified of the reward and the conditions that are to be fulfilled for the value of the reward to be made available to the consumer. Any suitable set of conditions may be associated with a reward, as embodiments are not limited in this respect. A condition may be based on information that may be detected from a consumer's location, such as based on characteristics of a consumer (including behaviors of the consumer) that may be determined from the consumer's location. For example, the value of a food coupon to a particular restaurant may only be made available to the consumer if the consumer is within X miles of the restaurant at a particular time of day and/or day of week.

The system may also be programmed to select the rewards that may be offered to a consumer for completion of a task based upon any suitable factors, including any number of consumer location characteristics. For example:

- A reward may be granted following the Nth visit to a particular retail/restaurant location or chain, or the Nth survey response for surveys that relate to a particular retail/restaurant location or chain
- A reward may be granted after the consumer drives by a competitor before filling out a location-triggered survey at a specific retailer
- A reward may be granted after a consumer fills out a location-triggered survey at a location which they do not typically visit as part of their normal routine In some embodiments, the system may additionally or alternatively customize a size of a reward's value to a particular consumer or for a particular task to provide larger incentives for the consumer or consumers to complete a specific task of interest. In some cases, a task that a consumer may be prompted to perform may be uncommon, and in these cases the value of collecting consumer information when these tasks are performed is great, so rewards for these tasks may have a higher value than other rewards. Consumers may thus be incentivized with larger rewards to maximize the rate of information collection from these tasks. As another example, a behavior of interest that may trigger the system to request a consumer to perform a task (e.g., complete a survey) may be rare, and the value of information that may be provided by a consumer engaging in the behavior may therefore be great. For example, a consumer may first visit Retailer 1 and subsequently drive directly to Retailer 2, a competitor. Because that consumer may be able to provide valuable information regarding consumers who are customers of both retailers, or about something lacking about Retailer 1 or something offered by Retailer 2 that led the consumer to visit both retailers, the consumer may be requested to complete a location-triggered survey and may be incentivized, with a larger reward, to do so.

Reward Selection

Rewards may be offered to consumers in any suitable manner. In some embodiments, by completing tasks, the consumer may earn reward points that the consumer may redeem for rewards. Such redemption of reward points may be with the consumer analytics system or with a business or other organization. The business/organization may be one that has a commercial relationship with the system or that the consumer has been previously detected to visit, or any other suitable business/organization, as embodiments are not limited in this respect. In other embodiments, a particular reward that may be redeemable at a business or organization the consumer may visit may be offered to a consumer in exchange for completing a task. In other embodiments, a consumer may be presented with a list of one, two, or more rewards from which the consumer may select the reward with which the consumer will be presented. In some embodiments in which consumers earn reward points, the consumer may be presented with such a list that includes point values assigned to each reward, and the consumer may be able to select any reward that points has a worth in rewards of equal or lesser point value than a total rewards points accrued by the consumer and/or offered to incent performance of the specific task.

In some embodiments, the consumer analytics system may customize a particular reward offered to a consumer, a list of particular rewards and/or a point value of each reward, and/or a number of reward points provided to a consumer for the consumer based on the specific location behaviors of the consumer or other information known about the consumer. For example, in some embodiments, consumer location/visit history may be used by the system to determine a set of retailers and restaurants that have been visited by the consumer, and the system may limit the list of rewards to offer the consumer to rewards redeemable at these retailers and restaurants. As another example, a list of available rewards may be limited to include those redeemable at establishments on known travel routes for a consumer, such as a specific café on the consumer's known commute route or another travel path. As another example, the system may select a reward or list of reward options to offer that includes only rewards that are redeemable within a threshold distance of a personally-relevant location for the consumer. For example, the system may only offer a reward to a consumer if the reward is redeemable at a location within 50 miles of the consumer's home. As another example, the system may select rewards that are redeemable within a threshold distance of a current location of the consumer at a time the consumer completes a survey or other task, or at a time the rewards are selected by the system. A further example of tailoring reward selection based on the consumer is that the system may detect a workplace for the consumer and refrain from presenting the consumer rewards or reward options that are redeemable at the consumer's workplace. Refraining from offering rewards redeemable at a consumer's workplace may be advantageous first because the reward may be more enticing for a consumer when it is redeemable at somewhere other than the consumer's workplace. Refraining from offering rewards redeemable at a consumer's workplace may be further advantageous because it may aid in fraud detection or prevention, as the system can identify that any attempt at reward redemption by an employee of a location at which the reward is being redeemed is illegitimate. Additionally or alternatively, in some embodiments the system may select rewards or values of rewards based on information provided by a consumer in response to a survey. For example, if a consumer responds to a survey question in a way that indicates that the consumer had a dissatisfactory experience at a business, the system may offer the consumer a reward redeemable at the business or increase a value of a reward, redeemable at the business, that is offered to the consumer. The system may recognize an expression of dissatisfaction by a consumer in any suitable manner, as embodiments are not limited in this respect. For example, the system may determine whether the consumer answered "no" to a question regarding satisfaction or similarly expressed dissatisfaction in a binary "yes/no" manner. As another example, the system may determine whether the consumer indicated a degree of satisfaction/dissatisfaction that suggests the consumer was dissatisfied, such as by providing a low rating on a scale relating to satisfaction. As a further example, the system may determine whether the consumer provided input suggestive of dissatisfaction, such as by providing text in a response that a semantic interpretation engine determines has a high likelihood of indicating dissatisfaction. Embodiments are not limited to determining dissatisfaction of a consumer in any particular manner.

In some embodiments, the system may determine reward types based at least in part on specific information received from a consumer when the consumer performs a task (e.g., specific responses within a survey) or on other information collected from or about the consumer. For example, a consumer might be given a reward that best reflects the consumer's self-reported preferences. Such preference information may be received from a consumer in any suitable form. For example, the information may be collected from a consumer by the system in response to a question by the system regarding the consumer's preferences for rewards. As another example, the system may determine the preference from information provided by a consumer as part of performing a task, such as where a consumer expresses in a survey response a preference for healthful food options. As an example of such reward-tailoring, in the case of a consumer who prefers healthful food options, the system may identify that the consumer is to be presented with a reward that is a coupon for carrot sticks rather than a coupon for a soda at a quick service restaurant. As another example, a consumer might express a preference for salads rather than sandwiches at a particular restaurant chain, and might receive therefore receive tailored rewards for salads at that particular restaurant chain.

In some embodiments in which a list of reward options is presented to a consumer following performance of a task, for the consumer to select one of the options, the consumer analytics system may select the rewards to include as options in the list such that rewards of different types may be offered. Offering different types of rewards may be advantageous because it gives the consumer selecting between the options a wider array of choices and may make it easier for the consumer to differentiate between the options and make a selection. When different types of rewards are offered, the rewards may be differentiated into types in any suitable manner. For example, in some embodiments the type of a reward may relate to a business at which the reward is redeemable, and rewards that are redeemable at different businesses may be considered to be of different types. In other embodiments, a type of a reward may relate to a market category of a business at which the reward is redeemable and rewards that are redeemable at businesses of different market categories may be considered to be of different types. In this context, a market category may relate to the products or services offered by the business. Businesses that offer different products or services, or products/services of different quality or price, may be considered to be businesses in different market categories.

Additionally, in some embodiments in which a list of reward options is presented to a consumer, the consumer analytics system may track reward options that are selected or not selected by the consumer from the list and use that information in selecting reward options to offer in future lists. The system may do so to avoid presenting reward options that a consumer consistently declines to select and/or to present reward options that the consumer has previously selected or are similar to reward options the consumer previously selected and therefore may be enticing to that consumer. In some such embodiments, the consumer analytics system may maintain information regarding specific rewards or types of rewards that were offered by the system to each consumer and, for each consumer, information regarding which rewards or types were selected or not selected by the consumer. Using that information, the system may identify a specific reward or type of reward that was offered to a consumer multiple times and was not selected by the consumer multiple times, and refrain from offering that reward to the consumer again.

In some embodiments, rewards and/or types of rewards offered to a consumer (including particular rewards or rewards included in a list of options) may additionally or alternatively be customized by the system for a consumer based on known consumer demographic information.

Consumer demographic information that may be used by the system may potentially include, but is not limited to, age, gender, number and age of children, household income, and/or whether the consumer has pets at home.

In some embodiments, the system may additionally or alternatively select rewards, types of rewards, values of rewards and/or other parameters of rewards to fulfill a goal of influencing a consumer to visit a particular business, business chain, or individual location of a business chain. For example, when the consumer analytics system requests that a consumer complete a survey in response to detecting that the consumer has visited a STARBUCKS® or is a regular customer of STARBUCKS®, the system may present a reward to determine whether the consumer can be encouraged to visit a DUNKIN DONUTS®. For example, the reward may be a coupon for a free coffee at DUNKIN DONUTS®, regardless of whether the consumer has previously visited a DUNKIN DONUTS®, or the reward may be a coupon redeemable at a specific DUNKIN DONUTS® location known to be on the consumer's commute route.

The system may additionally or alternatively select a value or other parameters of the reward to test the strength of customer affinity to a business or willingness to visit a new business. For example, rewards of different values may be presented to different consumers to determine a value that will influence consumers to visit a business the consumer does not routinely visit or has not previously visited. For example, consumers who the system detects to be dedicated customers of STARBUCKS® may be offered rewards for DUNKIN DONUTS® of differing value (e.g., coupons with varying discounts, or coupons offering free items for different lengths of time) to determine how much of a reward will drive a regular STARBUCKS® customer to visit a DUNKIN DONUTS®. The reward value may additionally or alternatively be selected based on a detected strength of characteristics of a consumer. For example, a consumer who visits a STARBUCKS® often may be offered a DUNKIN DONUTS® coupon of a greater value than a consumer who visits a STARBUCKS® only occasionally.

Figure 6A:
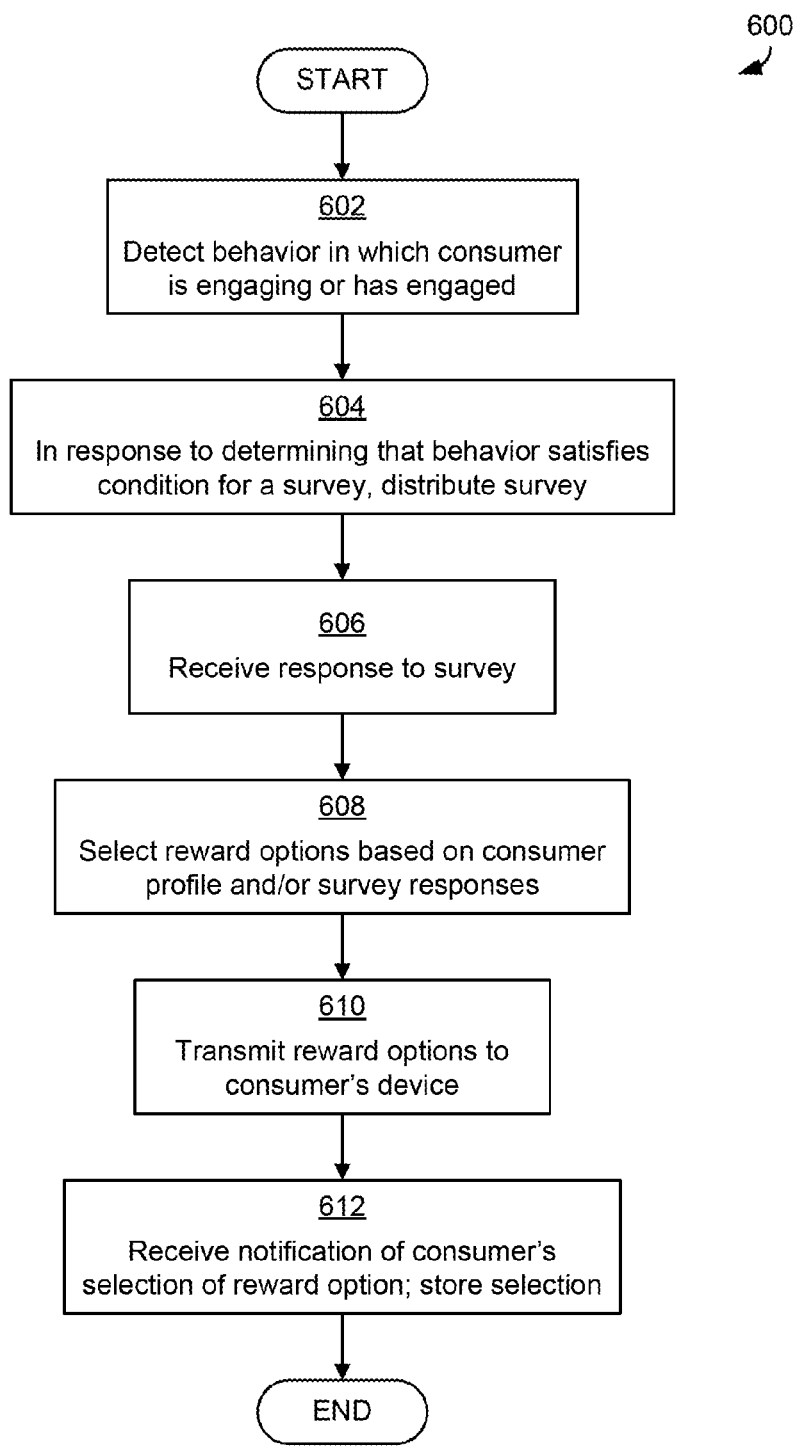
FIG. 6A is a flowchart of a process that may be implemented in some embodiments for selecting rewards to offer a consumer as an incentive for performing an action.

FIG. 6A illustrates an example of a process that a consumer analytics system may implement in some embodiments to carry out some of the techniques described in this section. It should be appreciated, however, that embodiments are not limited to implementing the illustrative technique of FIG. 6A nor any other particular technique.

Prior to the start of the process 600 of FIG. 6A, a consumer analytics system may register multiple consumers and be configured with one or more surveys or other tasks that may be distributed to the consumers when characteristics of the consumers satisfy conditions associated with the surveys or other tasks. The consumer analytics system may register consumers and be configured with tasks in any suitable manner, including according to techniques discussed above in connection with FIGS. 1-2. The process 600 may be carried out by the consumer analytics system to distribute a survey to a particular consumer in response to inferring behaviors in which the consumer is engaged and offering a reward to the consumer in exchange for providing a response to the survey.

The process 600 begins in block 602, in which the consumer analytics system analyzes location data for the consumer to detect a behavior in which the consumer is currently engaging or has engaged. The behavior may be inferred from the consumer's location data in any suitable manner, including according to techniques discussed above. The behavior that is detected may be any suitable behavior, including any of the illustrative behaviors discussed above, as embodiments are not limited in this respect.

After determining a behavior in which the consumer is or was engaged, the consumer analytics system compares the behavior to the conditions associated with each of the surveys (or other tasks) that may be distributed to consumers by the system to determine whether the behavior satisfies any of the conditions. In block 604, in response to determining that a behavior satisfies a condition for a survey, the system distributes the survey to the consumer. The system may distribute the survey to the consumer in any suitable manner. In some embodiments, the system may transmit at least one message to a mobile device operated by the consumer, soliciting the consumer to provide a response to the survey. In such a case, the message may include any suitable content regarding the survey, including questions included in the survey or a link to a location at which the mobile device may retrieve the questions of the survey.

In block 606, the system receives at least one message from a computing device (e.g., a mobile device) operated by the consumer that includes a response to the survey and, in block 608, selects two or more rewards to present as options to a consumer, such that the consumer may select one of the reward options to receive as compensation for providing the response to the survey. The rewards may be selected in any suitable manner, including according to techniques discussed above. For example, in some embodiments, rewards may be selected based on a consumer profile or based on the survey responses received in block 606. The information in the consumer profile may include information about the consumer, including information regarding locations previously visited by the consumer, information inferred from location data like consumer behaviors or preferences, or previous survey responses. The profile information may include information on an identity (e.g., demographics) of the consumer or preferences of a consumer. Profile information may additionally or alternatively include information on behaviors of a consumer, such as businesses the consumer has visited or has visited often, or personally-relevant locations for the consumer.

Once the system selects the reward options in block 608, in block 610 the system transmits the options to a device (e.g., a mobile device) operated by the consumer, such as by transmitting at least one message that includes information on the reward options. In block 612, the system receives a notification from the device that the consumer has selected one of the options, and the system stores an identification of which reward option the consumer selected. After the system stores the selection, the process 600 ends.

As a result of the process 600, the consumer analytics system stores information regarding a reward that may be redeemed by the consumer and the consumer is aware of the reward that was provided to the consumer. Information regarding the reward may be stored in one or more non-volatile memories of a mobile device of the consumer (e.g., smartphone) and/or in one or more non-volatile memories of a server of the consumer analytics system. The consumer may be able to view rewards that are available to the consumer by requesting that the mobile device display the rewards, after which the mobile device may compile information on rewards from the non-volatile memory/memories of the mobile device and/or of the server and display the rewards to the consumer on a display of the mobile device. Additionally, following the process 600, the consumer may redeem the reward or other rewards earned by the consumer. For example, the consumer may visit a business at which the reward may be redeemed and communicate to the business and to the consumer analytics system that the consumer would like to redeem the reward. The consumer may communicate about the redemption to the consumer analytics system in any suitable manner, including by operating a user interface of the mobile device to transmit a message to a server of the system that the consumer wants to redeem a reward.

Figure 6B:
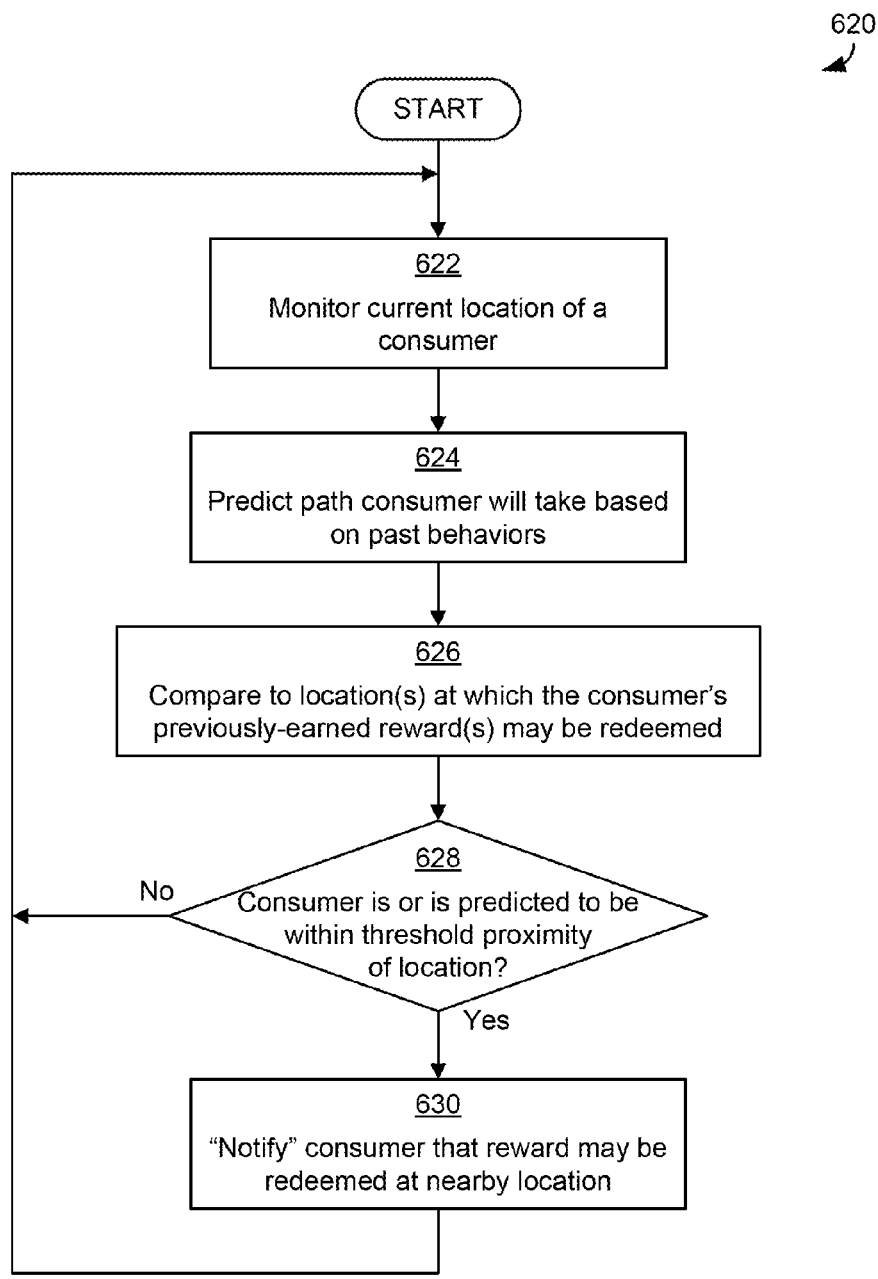
FIG. 6B is a flowchart of a process that may be implemented in some embodiments for determining whether a consumer is or will be near a location at which a reward may be redeemed and notifying the consumer of such.

In some embodiments, a consumer analytics system may assist a consumer with redeeming rewards, including by notifying a consumer of a previously-earned reward that the consumer has an opportunity to redeem. For example, when the consumer analytics system determines that a consumer is or is predicted to soon be within a threshold distance of a location at which the reward may be redeemed, the consumer analytics system may provide a notification to the consumer, such as via a mobile device operated by the consumer, that the consumer has an opportunity to redeem a reward. The consumer analytics system may do this in any suitable manner. FIG. 6B illustrates a process 620 that may be implemented in some embodiments by a consumer analytics system to provide a notification of a reward to a consumer. The process 620 may be carried out by a mobile device and/or a server of the consumer analytics system, or by a combination of a mobile device and a server. For example, in some embodiments, the process 620 may be carried out by a mobile device, such that the mobile device carries out each of the acts illustrated in FIG. 6B, including the monitoring, comparing, and notifying. In embodiments in which the mobile phone performs the process 620, the mobile phone may have stored locally, in a memory of the mobile phone, information on a consumer, such as a profile of the consumer. The information may include any suitable information regarding a consumer, such as characteristics determined by a consumer analytics system for the consumer. Such characteristics may include, for example, behavior characteristics determined by the consumer analytics system using techniques described herein. In some such embodiments, the information for the consumer may be determined by a server of the consumer analytics system and transmitted to the mobile device. It should be appreciated, though, that embodiments are not limited to implementing the process of FIG. 6B on a mobile device. In other embodiments, for example, a server may carry out the monitoring and comparing and may instruct the mobile device (such as by transmitting one or more messages to the mobile device) to perform the notifying. Embodiments are not limited to any particular The process 620 begins in block 602, in which the consumer analytics system monitors a current location of a consumer over time by receiving multiple units of location data for the consumer, each identifying a geographic location at which the consumer was present when the location data was generated. In block 624, the consumer analytics system evaluates the location data to infer a path that the consumer is taking and predict locations at which the consumer will be within a threshold amount of time. This may be done, for example, by evaluating the current location and a profile maintained by the consumer by the consumer analytics system. The consumer profile may identify behaviors in which a consumer has previously engaged, habits of the consumer, paths previously traveled by the consumer, and other information regarding prior movements of the consumer. In block 626, the consumer analytics system compares the consumer's current location and the locations at which the consumer is predicted to be to the location(s) at which each of the rewards that the consumer has earned and may redeem.

Thus, in block 628, the consumer analytics system determines whether the consumer is within a threshold distance of a location at which a reward may be redeemed or is on a path that the system predicts will take the consumer within a threshold distance of the location. If so, then in block 630 the system presents a notification to the consumer that the reward may be redeemed at a nearby location.

The system may present the notification in any suitable manner. In embodiments in which the process 620 is implemented by one or more servers of a consumer analytics system, the server may transmit one or more messages to a mobile device operated by the consumer requesting that the mobile device display a notification to the consumer that the reward may be redeemed at a nearby location. The mobile device may then present the notifications on the display screen and/or produce an alert sound, or take any other action to present a message to a consumer via any suitable audio, visual, or tactile user interface. Once the notification is presented or if the system determines in block 626 that the consumer is not and/or will not be within a threshold distance of a location at which a reward may be redeemed, the process 620 returns to block 622 in which the system monitors location data for the consumer.

In some embodiments, the consumer analytics system may limit a number of times that notifications of nearby reward redemption opportunities are presented to a consumer, so as to avoid overwhelming a consumer with the number of notifications presented. Accordingly, in some such embodiments, the consumer analytics system may in some cases refrain from presenting some notifications even when the consumer is within a threshold distance of a location at which a reward may be redeemed. The consumer analytics system may determine whether to present a notification in any suitable manner based on an evaluation of any suitable factors, as embodiments are not limited in this respect. In some embodiments, the consumer analytics system may determine whether to distribute a notification based at least in part on a process for determining a number of notifications that may cause a consumer to change a behavior. For example, as discussed in greater detail below in connection with FIGS. 13-14, the consumer analytics system may determine a number of notifications to present to a consumer that may prevent the consumer from becoming a lapsed customer of a business or that may entice a consumer to switch from being a customer of one business to another.

While an embodiment has been described in which distance is used to determine whether to notify a consumer of an opportunity to redeem a previously-earned reward, embodiments are not limited to making such a determination based only on distance. Any suitable criterion may be evaluated to determine whether to notify a consumer regarding a reward that may be redeemed. For example, in some embodiments, a current time of day and times of past visits to a setting by the consumer and/or other consumers may additionally or alternatively be considered in determining whether to present a notification for a reward. For example, if a reward is redeemable for a meal at a restaurant and the system detects that most visits to the restaurant are in the evening, the system may refrain from presenting a notification of the reward to the consumer in the early morning. The system may refrain from presenting the notification of the reward in this case even if the consumer is at a location within a threshold distance of a location at which the reward may be redeemed. Though, it should be appreciated that embodiments are not limited to considering distance in determining whether to present a notification, and that distance may not be considered in some embodiments or in all cases.

Reward Availability and Redemption

Figure 7:
FIG. 7 is an exemplary image of an interface for allowing a consumer to view which rewards she has earned from her participation.

In some embodiments, a consumer analytics system that offers rewards may maintain information about consumers, which may implement a "rewards wallet" that includes a list of the rewards that the system has offered to the consumer but that the consumers have not yet redeemed. FIG. 7 illustrates an example of an interface, which may be displayed to a consumer via a mobile device, by which the system may display a rewards wallet to a consumer. The rewards in the rewards wallet may include any suitable type of reward, including instant rewards that the consumers have earned the value of, conditional rewards that the consumers have earned the value of, and/or conditional rewards that the consumer has not yet earned the value of. Thus, at any specific moment, any of the rewards in a consumer's rewards wallet may be immediately available for redemption or may be unavailable, based on a variety of conditions, including rules, and/or qualifiers such as those outlined below. In some embodiments, rewards not available for immediate redemption (due, for example, to unfulfilled conditions) may be identified as such in the rewards wallet. The unavailable rewards may be identified through being displayed differently, such as by being grayed out and/or being displayed together with a message explaining why the reward is not currently available. A message explaining why the reward is not available may, for example, list unfulfilled conditions for the reward. Such a display may be generated based on data about the consumer and/or terms of rewards that may be stored in any suitable way.

As mentioned above, a reward may be associated with any suitable conditions that govern the availability of the reward for redemption by a consumer, after the consumer has been offered the reward in response to the consumer taking a task. In some cases, the availability of a reward for redemption may be determined by location behaviors of a consumer and/or any other suitable inputs. Reward availability may be tied, for example, to:

The current time of day, or a specific time of day/day of week. For example, a sandwich coupon may be available only during the weekday lunch period.

The area around the consumer's current location, or other defined region, for example their home or work locations.

A combination of these or other location-gated and time-gated metrics

In some embodiments that operate with conditional rewards, the system may provide a notification, for example via a message displayed in a user interface of the consumer analytics system, a text message (such as a message in SMS format), email, or other form of communication, to a consumer regarding the upcoming availability of a reward. For example, the consumer analytics system may provide a consumer with a message that "tomorrow at noon a lunch food reward will be available" or "a food reward is now available for a restaurant within one mile of your current location." Such a message may be presented to a consumer in cases in which the system has not yet revealed the nature of the reward to the consumer and cases in which the system has revealed the nature of the reward. In some embodiments, the system may conceal the nature of such a reward from a consumer, including in cases in which the reward is included in the consumer's rewards wallet. For example, a consumer may not be informed of a reward's value until the reward is available. As another example, in some embodiments, the system may not inform a consumer of the identity of the redemption location for a reward until the consumer is within very close proximity of the location. The system, based on analyzing the consumer's location, may in some such embodiments lead the consumer to the location at which the reward may be redeemed by presenting the consumer with directions on a map, with a specific compass direction or with a set of instructions. In other embodiments, however, the system may provide a consumer with a message that identifies the reward as well as the circumstances under which the reward will be available soon.

In some embodiments, the system may display a list of redemption locations for available rewards graphically on a map, so that the consumer can easily identify the nearby locations at which available rewards may be used.

Rewards Redemption Verification and Fraud Prevention

In some embodiments, each time a consumer redeems a reward, the consumer analytics system may record into storage the details of the redemption. The record of the redemption may include any suitable information, as embodiments are not limited in this respect. For example, the record may include information such as:

Where—latitude, longitude as well as the name and/or other identifier of the store When—a timestamp of when the reward was redeemed Device details—If a consumer's device is used to redeem the reward (e.g., via a rewards application and/or consumer analytics application executing on a smart phone), the type of phone running the application, as well as which operating system version, etc.

Point-of-Sale information—Any suitable details from the point of sale system, such as the items purchased, the ID of the employee servicing the consumer, etc.

In some embodiments, when this data is recorded, the data may be compared with the store's computing systems to verify that the store's systems show that a similar transaction has taken place. This verification can be done either at the time of the transaction or at a later date/time. The latter case may be easier for stores whose systems make real time access difficult.

In some embodiments, the consumer analytics system may periodically or occasionally process records of rewards redemption to identify any potential fraud, such as by searching for patterns that indicate fraud. Potential fraud may be identified based on data indicating unlikely events, such as:

A consumer redeeming rewards far away from where location data for the consumer indicates the consumer was at the time.

A consumer redeeming a significant and/or large number of rewards within a small time period.

Potential fraud may also be identified based on probabilistic indications of fraud, such as by identifying:

One employee who has significantly higher rates of rewards redemption than other employees at a given store.

One store location that has significantly higher rates of rewards redemption than comparable stores.

One specific make, model, and OS version of phone that has significantly higher numbers of rewards than its market share would predict it should.

Any combination of similar metrics

When potential fraud is identified, the system may issue an alert to the business at which the reward is redeemable (e.g., by issuing an alert to a central office for a chain or to a particular location of a chain) to notify the business of the potential fraud and enable investigation. The alert may include any suitable information, as embodiments are not limited in this respect. For example, a report of the suspicious activity and related information (store locations involved, log of redemptions, etc.) may be generated automatically by the consumer analytics system and sent to the store as part of the alert.

Figure 9:
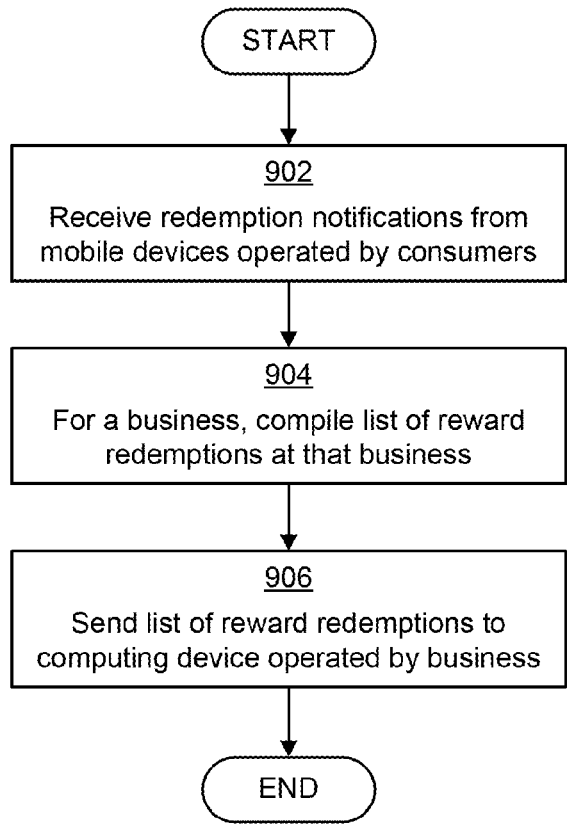
FIG. 9 is a flowchart of a process that may be implemented in some embodiments for compiling a list of reward redemptions at a business for use in identifying fraudulent redemptions.
Figure 10:
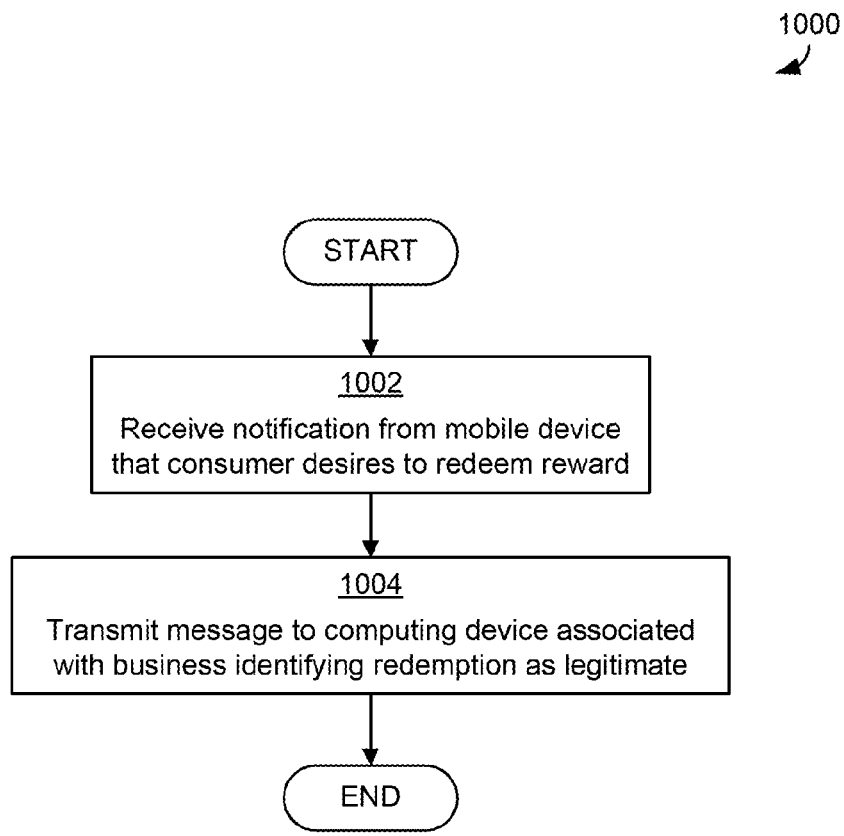
FIG. 10 is a flowchart of a process that may be implemented in some embodiments for, during a purchase in which a reward is to be redeemed, determining whether the redemption is legitimate or fraudulent and notifying a business of such.
Figure 11:
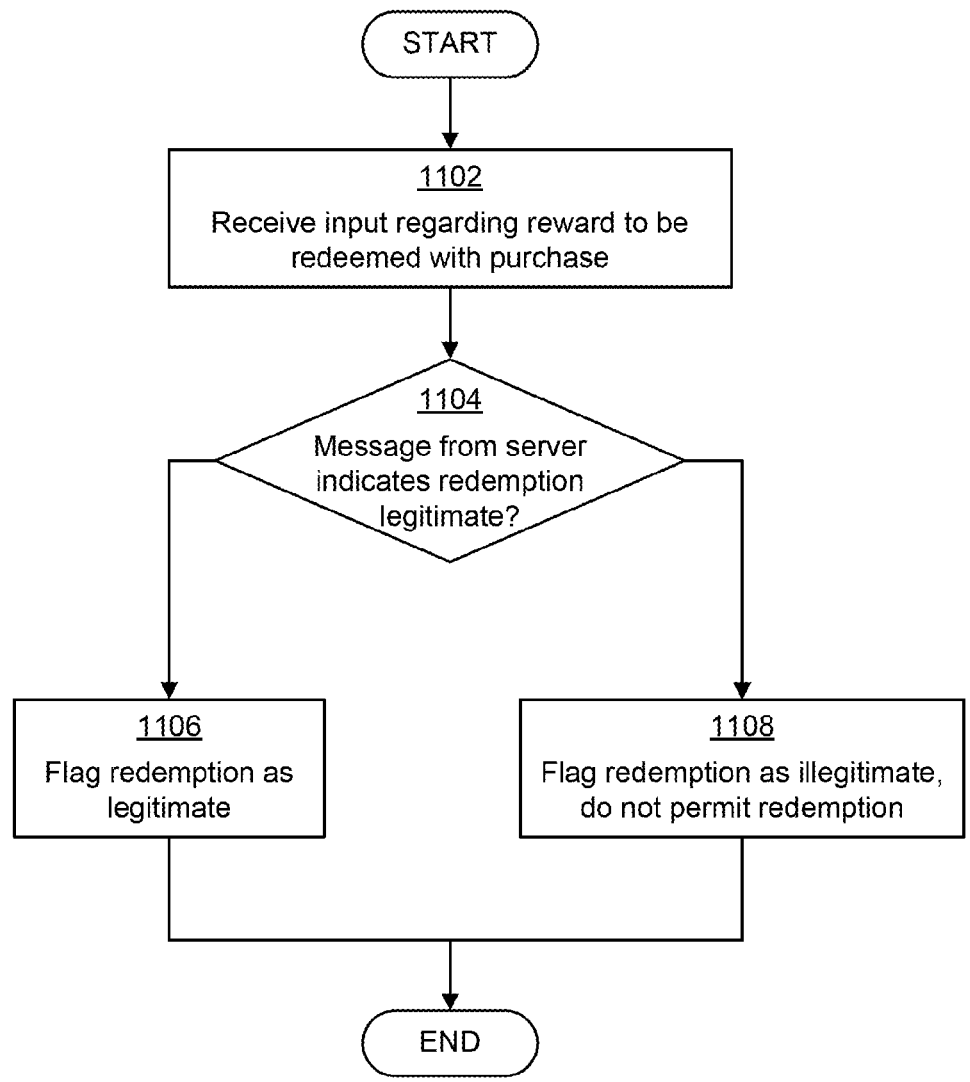
FIG. 11 is a flowchart of a process that may be implemented in some embodiments for, during a purchase in which a reward is to be redeemed, determining whether to permit the redemption based on whether a notification received from a consumer analytics system indicates that the redemption is legitimate.

In embodiments that implement techniques for identifying fraud or determining whether a redemption of a reward is legitimate, any of the techniques discussed above or any combination of techniques may be implemented, as embodiments are not limited to implementing any particular process for detecting fraud or redemption legitimacy. FIGS. 9-11 illustrate examples of three techniques that may be used in some embodiments for determining whether a reward redemption is fraudulent/illegitimate or is legitimate.

FIG. 9 illustrates a process that may be used by a consumer analytics system for evaluating legitimacy of rewards in a non-real-time manner. Prior to the start of the process 900, the consumer analytics system may be configured with conditions, tasks, and rewards, and has presented rewards to consumers in exchange for consumers completing a task (e.g., providing a response to a survey). Such configuration may be carried out as discussed above or in any other suitable manner. For example, the consumer analytics system may be provided with and subsequently store information specifying multiple tasks and, for each, one or more conditions that trigger a request to a consumer to perform the task and reward(s) that may be granted for performance of the task. Once provided with and storing such information, the consumer analytics system may process the information and transmit and receive electronic messages in accordance with the information.

The process 900 begins in block 902, in which the consumer analytics system receives notifications of reward redemptions from mobile devices operated by consumers. The mobile device operated by the consumer may have an interface that displays previously-earned rewards to consumers and enables consumers to notify the system that the consumer is redeeming the reward. The notification may include any suitable information, including a unique identifier for the reward being redeemed and/or a location at which the reward is being redeemed. The unique identifier may be, for example, a serial number or bar code number for the reward that identifies the specific reward to the consumer analytics system and to the business(es) at which the reward may be redeemed. In some embodiments, as discussed above, the notification from the mobile device may additionally include location data indicating a current location of the mobile device at a time that the reward was redeemed. The notification may additionally or alternatively include any other suitable information regarding the redemption, including responses from the consumer to questions such as an amount spent at the business on the visit during which the reward was redeemed, what items or services were purchased, the consumer's subjective impressions of the business on that visit, or any other suitable information.

After receiving the notifications from the mobile devices, the consumer analytics system may aggregate redemptions for each business at which rewards are redeemed. The redemptions that are aggregated may be all redemptions for which notifications were received in block 902 or, in some embodiments, redemptions that the consumer analytics system has determined to be legitimate. In embodiments in which the system determines whether a reward redemption is legitimate, the system may determine whether a redemption is legitimate in any suitable manner, including using any of the illustrative techniques discussed above. In some embodiments, for example, in response to receiving a notification from a mobile device that a consumer is redeeming a reward, the consumer analytics system may review a list of rewards that were previously provided to that mobile device and remove a reward from the list.

In block 904, the consumer analytics system compiles a list of reward redemptions at a business. The list may include any suitable information about a reward redemption, including the unique identifier for a reward, a location of redemption, a time of redemption, and/or another information that was included in a notification about the redemption. In block 906, after the list is compiled, the consumer analytics system sends the list to a computing device associated with the business for which the list was compiled. The consumer analytics system may send the list in any suitable manner, including by transmitting one or more messages including the list. After the list is sent, the process 900 ends.

As a result of the process 900, the computing device associated with the business has a list of reward redemptions that may be considered legitimate and may compare the list to information regarding rewards that were previously redeemed at the business to determine whether any of the previous redemptions were or appear to be fraudulent. The businesses may determine redemptions that appear to be fraudulent in any suitable manner. For example, the system may review the list to determine whether there is evidence of suspicious patterns in the list, such as a higher number of redemptions at one branch than others or a higher number of redemptions at some times than others. If the business identifies fraudulent redemptions, the business may then take any suitable action to attempt to undo or mitigate the fraud.

In some cases, an option a business has for later undoing or mitigating fraudulent reward redemptions may be limited. It may therefore be advantageous in some embodiments to determine during a transaction in which a reward is to be redeemed whether the redemption is legitimate or fraudulent. FIGS. 10-11 illustrate a technique that may be used in some embodiments for a real-time process for determining whether a reward redemption is legitimate.

FIG. 10 illustrates a process that may be carried out in some embodiments by a server of a consumer analytics system to determine, in real time during a transaction in which a reward is presented for redemption, whether the redemption is legitimate. Prior to the start of the process 1000, the consumer analytics system may be configured with conditions, tasks, and rewards, and may have presented rewards to consumers in exchange for consumers completing a task (e.g., providing a response to a survey).

The process 1000 begins in block 1002, in which the server of the consumer analytics system receives a notification from a mobile device operated by a consumer that the consumer would like to redeem a reward. The notification received in block 1002 may include any suitable information, including exemplary types of information discussed above in connection with FIG. 9. In block 1004, after receiving the notification from the consumer (and, in some embodiments, after confirming legitimacy of the redemption in any suitable manner) such as using techniques described above, the server of the consumer analytics system transmits a message to a computing device associated with the business at which the consumer is redeeming the reward. The message may include any suitable information about the reward being redeemed. For example, the message may include a unique identifier for the reward. Once the message is transmitted in block 1004, the process 1000 ends.

FIG. 11 illustrates a process that may be carried out in some embodiments by a point-of-sale (POS) terminal or other computing device associated with a business at which a consumer desires to redeem a reward. The process 1100 of FIG. 11 may be used by the POS terminal to determine, in real time during a transaction in which a reward is presented for redemption, whether the redemption is legitimate. The process 1100 begins in block 1102, in which the computing device receives input regarding a reward that a consumer would like to redeem as part of a purchase or other transaction with the business. The input that is received in block 1102 may include any suitable information about the reward including, for example, a unique identifier for the reward like a serial number or bar code. After the POS terminal receives the input regarding the reward in block 1102, the POS terminal waits for a confirmation message from the consumer analytics system that indicates that the reward redemption is legitimate. This message may be transmitted by the system in response to the consumer notifying the system that the consumer is redeeming a reward, such as following the process 1000 of FIG. 10. Accordingly, in block 1104, the POS terminal determines whether it has received a message from a server of the consumer analytics system that identifies the reward redemption as legitimate. The notification may, as discussed above, include a unique identifier for the reward, which the POS terminal may compare to the information received in block 1102 to determine if there is a match and, thereby, determine whether the reward is legitimate. In block 1106, if the message from the server indicates that the reward is legitimate, the redemption is flagged as legitimate and the POS terminal allows the purchase and the reward redemption to continue. If, however, no message is received from the server or the message from the server indicates that the redemption may be illegitimate, then the POS terminal flags the redemption as illegitimate and does not permit the redemption.

After the redemption is flagged as either legitimate or illegitimate in blocks 1106, 1108, the process 1100 ends.

While the example of FIGS. 10-11 is described as including a "push" notification from a server regarding a legitimate redemption, in some embodiments the system may operate with a POS terminal (or other computing device for a business) "pulling" redemption verifications from the consumer analytics system. In such a "pull" embodiment, when the POS terminal receives input regarding a reward redemption, the POS terminal may query the consumer analytics system for information on whether the redemption is legitimate.

Rewards Redemption Analytics

In some embodiments, each time a reward is redeemed by a consumer, in addition to or as an alternative to the information described above for verification and fraud detection, the system may record into storage details of the redemption that may be useful for consumer analytics and business intelligence. The details regarding the redemption may include any suitable information. For example, the details may include information such as:

Demographic information and/or other details regarding the consumer

Amount spent at the business on the visit in which the reward is redeemed at the business Items purchased in that visit Location analytics of that visit, including stores and other POIs driven past, at which personally-relevant location (home, work, etc.) the consumer's trip began, etc.

The consumer analytics system may compute any suitable consumer analytics based on this stored information. The consumer analytics system may then present the information to any suitable party, such as one or more businesses at which the reward was redeemable. The system may compute and present, for example, information that allows a retailer/restaurant (or any other category of POI at which a reward is redeemable) to understand how effective each reward is at encouraging consumers to visit a business. Such information may include:

Average and median times between reward earned and reward redeemed by a consumer Average and median amount of money and/or time spent at the business on visits in which the reward is redeemed Average and median different amount of money and/or time spent by a consumer at the business in the N days after the reward is earned.

Additionally or alternatively, the consumer analytics system may determine a baseline average amount of time and/or money spent at a business, collected via surveys or any other source, and use this baseline to compute the additional revenue earned by the business that may be attributed to the reward. The system may then provide the number identifying the additional revenue earned by the business to the business as a specific measure of the reward's success.

One method the consumer analytics system may use, in some embodiments, to compute a baseline average amount of money and/or time spent is to compare the amount of time and/or money consumers who redeemed rewards had spent at the given POI in the period before the reward was earned. The consumer analytics system may then compare the amount spent by the consumers before the reward was earned to the amount spent after the reward was earned. Another method that the consumer analytics system may use is, for the time period in which the rewards were redeemed, comparing one or more characteristics of consumers who redeemed a reward with those who earned the reward and did not redeem the reward. Any identified trends in differences in characteristics between consumers who redeemed a reward and those who did not may also be used as a measure of the additional revenue accounted for by the reward being given.

In addition, in some embodiments, the system may calculate a total gross profit on the consumers' visits. The system may, in some such embodiments, compute this total gross profit by subtracting the cost of the products purchased in each consumer's visit from the amount of money spent by consumer in each visit. The system may then use the total gross profit to compute a specific Return On Investment (ROI) for the reward, such as by comparing the cost of the reward with the total gross profit. The system may then provide the ROI to a business at which the reward was redeemable to provide the business with a measure of the effective profit the rewards program.

Figure 12:
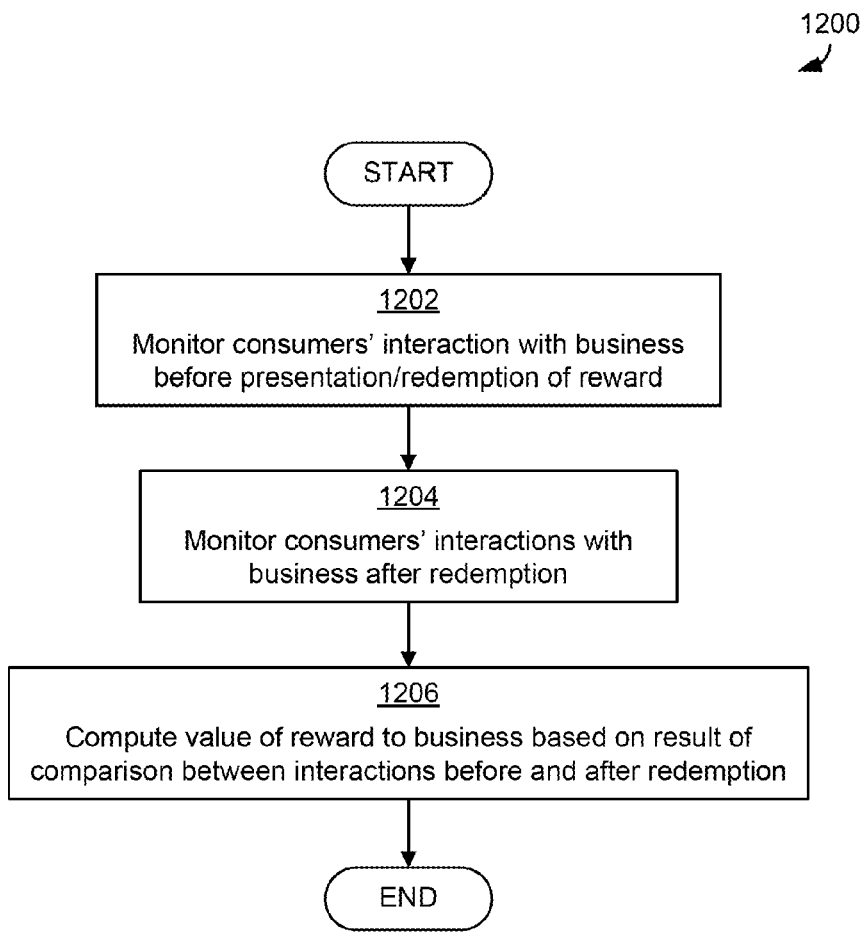
FIG. 12 is a flowchart of a process that may be implemented in some embodiments for determining a value to a business of a reward that is offered to consumers via a consumer analytics system.

FIG. 12 illustrates an example of a technique that may be used to determine a value of a reward to a business, including a return on the reward or an ROI of a reward. It should be appreciated, however, that embodiments may determine a value of a reward in any suitable manner and are not limited to implementing the techniques described in connection with FIG. 12.

A "return" on a reward may be an expression of a value that the business has received in exchange for accepting redemptions of the reward. A return may be expressed in any suitable manner, including in any suitable manner relating to consumers' interactions with the business. For example, a return may be expressed in terms of a number of consumers who are visiting the business that can be attributed to the reward, an amount spent by consumers that can be attributed to the reward, a change in frequency of visits that can be attributed to the reward, or any other suitable metric relating to consumers' interactions with a business. In some cases, a return for a reward may be expressed as a return on an investment by the business, or ROI. In this case, the ROI may be a value received by the business that accounts for an investment by the business in the reward. A business may invest in a reward in any suitable manner. For example, a business may spend money upfront to offer the reward, allocate personnel to prepare a reward to be offered or process redemptions of a reward, or receive a lower profit margin on goods as a result of discounts or other types of rewards offered. A return on an investment by a business may be calculated through accounting for an investment in any suitable manner. For example, where a business has made a monetary investment in a reward, and a return is valued in a dollar amount, the ROI for the reward may be calculated by subtracting the investment from the dollar amount of the return.

Prior to the start of the process 1200 of FIG. 12, the consumer analytics system is configured with conditions, tasks, and rewards, and has presented rewards to consumers in exchange for consumers completing a task (e.g., providing a response to a survey). The process 1200 begins in block 1202, in which the consumer analytics system monitors consumers' interactions with a business before a reward that is redeemable at the business is offered to the consumers and/or before the reward is redeemed by the consumers. The consumers' actions that are monitored in block 1202 may include any suitable characteristics relating to the consumers' patronage or lack of patronage at a business, including amounts spent at the business or behaviors like frequency of visits to the business. In block 1204, the consumer analytics system further monitors consumers' interactions with the business following redemption of the reward. The monitoring of blocks 1202, 1204 may be performed by the consumer analytics system in any suitable manner, including by evaluating location data for each of the consumers and/or survey responses provided by each of the consumers.

In block 1206, the consumer analytics system computes a value of the reward to the business based at least in part on a comparison of interactions with a business before and after redemption of the reward by each of the consumers. The comparison may be done in any suitable manner. For example, in some embodiments, the system may determine whether a particular characteristic (e.g., visit frequency) changed from one value before redemption to another after redemption. As another example, the system may determine whether a consumer has deviated from a pattern of behavior in a manner that indicates that the reward may have affected the consumer's behavior. For example, if a consumer has a pattern of visiting one coffee shop in the morning for coffee, but visits another coffee shop once or multiple times after receiving a reward for that other coffee shop, the deviation may be indicative of an effect of the reward on the consumer. In turn, this may be indicative of a value of the reward to the second coffee shop. After the value of the reward to the business is computed in block 1206, the consumer analytics system stores the value and the process 1200 ends. Following the process 1200, the system may provide the computed value of the reward to the business and the business may use this information in any suitable manner, including, for example, determining whether to continue to offer the reward or whether to change a value of a future reward that will be offered.

In addition to determining a change in consumer behavior or other characteristics following a reward, in some embodiments the consumer analytics system may determine a "stickiness" or persistence to the change in consumer behavior. A reward may, in some cases, be more valuable to a business if the reward causes a change in behavior that is long-lasting or permanent, rather than fleeting. Accordingly, in some embodiments in which a change in characteristics is determined by comparing characteristics of individual consumers or groups of consumers before and after an event or between a group that has redeemed a reward and a group that has not (a "control group"), the system may perform multiple comparisons. Each of the comparisons performed by the system may be done using characteristics determined from location data, survey responses, or other information received relating to consumers at different points in time, such as one day after a reward is redeemed, three days after, a week after, a month after, etc. By comparing these later characteristics, a change over time may be determined, which may enable the system to observe how a change immediately following redemption of a reward changes over a period of time following the reward. If, during or after the period of time, the characteristics of the consumers have values that are closer to the "before" or "control group" values than to the values immediately following the reward, a reward may be considered not to have a lasting effect on consumers. A result of a comparison may be provided to businesses to inform them of the persistence of any change created by a reward, which may include any suitable information about the persistence. For example, in some embodiments the consumer analytics system may determine an average span of time until values of an individual consumer's changed characteristics become more similar to values of the "before" or "control group" characteristics than to the values of the consumer's characteristics immediately following redemption of the reward.

Figure 13:
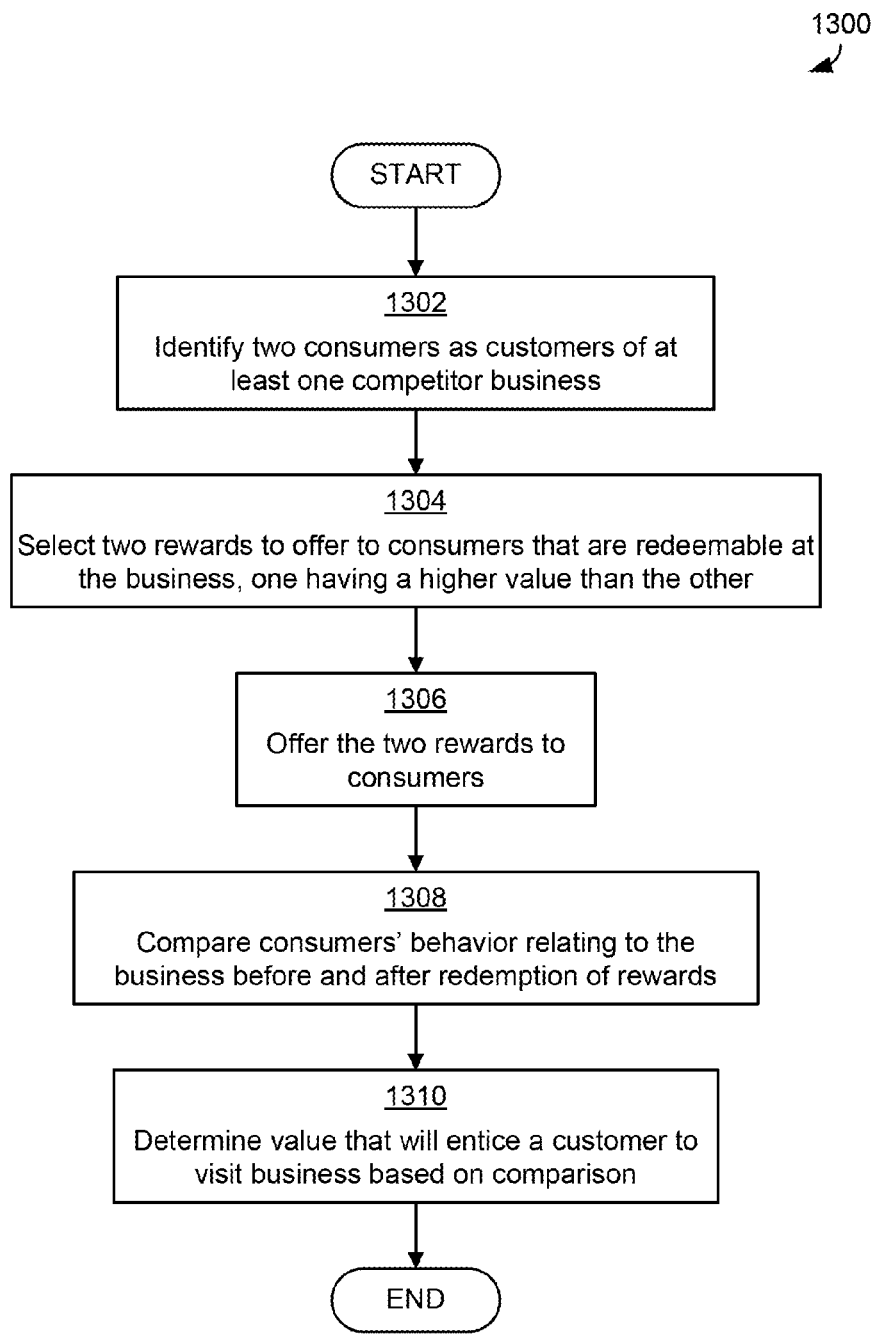
FIG. 13 is a flowchart of a process that may be implemented in some embodiments for determining a reward value that will entice a consumer to visit a business rather than a competitor.
Figure 14:
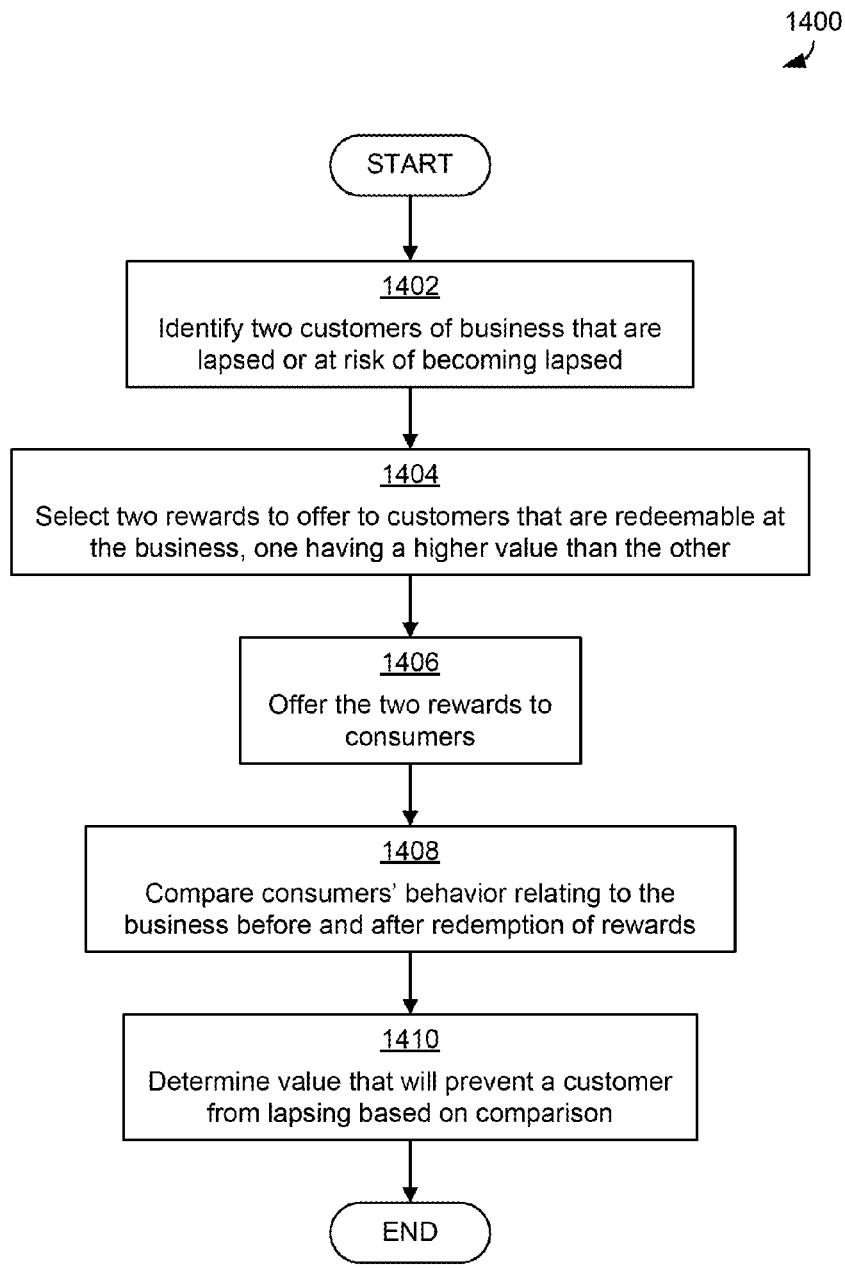
FIG. 14 is a flowchart of a process that may be implemented in some embodiments for determining a reward value that will prevent a customer from lapsing or regain a lapsed customer.

In some embodiments, such techniques for determining persistence of a change in behavior (or other characteristics) relating to a reward may additionally or alternatively be used to determine a value to offer in a reward to entice a customer of one business to become a customer of another, or to determine whether a reward was successful in regaining a lapsed customer of a business or preventing a dissatisfied customer from becoming a lapsed customer. FIGS. 13-14 illustrate examples of techniques that may be used to entice a customer away from one business or prevent a customer from lapsing.

The process 1300 of FIG. 13 may be used by a business to entice consumers that are customers of a competitor into becoming customers of the business. The consumers may be enticed to stop visiting the competitor and begin visiting the business, or may be enticed to visit the competitor less frequently and the business more frequently. Prior to the start of the process 1300, a number of consumers may register with the consumer analytics system and the system may evaluate location data for the consumers to determine one or more characteristics of the consumers. The process 1300 begins in block 1302, in which the system identifies two consumers that are customers of at least one competitor business that is a competitor of a business that desires to recruit new customers through the use of one or more rewards. The two consumers may visit the competitor business(es) in addition to visiting the business, or may visit the competitor business(es) and not visit the business. In some cases in which the consumers visit both the competitor(s) and the business, the consumers may visit the competitor(s) more frequently than the business.

In block 1304, the consumer analytics system selects two rewards that are to be offered to the consumers identified in block 1302. The rewards may be selected such that one has a higher value than another. For example, one reward may be for a $2 discount on a purchase and another for a $5 discount, or one for a fixed value discount and one for a free product/service, or any other combination of reward values. By selecting a rewards that have different values, the consumer analytics system can observe the impact of the different values on the consumers and determine whether what reward value reward will have an intended effect on consumers. By doing so, the system can determine that a lower-value reward will have an intended effect and thereby lower costs for a business that may otherwise offer a higher-value reward, or determine that a lower-value will not have an intended effect and a higher-value reward is needed, thereby preventing the business from investing in a reward that will not satisfy a goal.

In block 1306, the system offers the two rewards determined in block 1304 to the consumers and determines characteristics of consumers before and after redemption of the rewards. The characteristics of the consumers before redemption may include characteristics of the consumers before the rewards were offered. Any suitable characteristics of the two consumers may be evaluated, as embodiments are not limited in this respect. In the embodiment of FIG. 13, the characteristics that are monitored may include characteristics (e.g., behavior characteristics) that relate to the consumers' interactions with the business. Characteristics of the interactions with the business may include any suitable information about interactions, such as frequency of visits or time between visits, length of visits, amount spent during visits, patterns of past visits and deviations from patterns, or other characteristics. In block 1308, the consumers' behaviors (and/or other characteristics) relating to the business before and after redemption of the reward are compared to determine whether there was any change before and after the reward was redeemed.

In block 1310, the system determines a reward value that will entice a customer to visit the business based in part on the result of the comparison in block 1308. The system may determine the value in block 1310 based on a result of the comparing of the effect of the two rewards on the two consumers. In some embodiments, the two rewards may be offered to other consumers in addition to the two that were offered the rewards in block 1306. In these embodiments, the effect of the rewards on multiple different consumers may be evaluated. In particular, in block 1310, the system may compare effects of impacts of the two rewards on multiple other consumers that receive one or both of the rewards. The system may then aggregate the results of the comparisons for the multiple consumers to determine a reward value that will entice a customer. The reward determined in block 1310 may be a reward having a value optimized to produce a desired effect on consumers, which in the example of FIG. 13 may be to entice consumers to become consumers of a business. The value may, in some cases, be a value that has a lowest cost to the business or otherwise be the lowest value that still produces the desired effect in consumers that receive the reward. The reward determined in block 1310 may have a value that is higher, lower, or between the values of the rewards selected in block 1304. For example, if both the lower-value reward and the higher-value reward selected in block 1304 are determined to have the desired effect on the consumers, a value determined in block 1310 may have a lower value than the lower-value reward. This may be done to determine a minimum cost for rewards that would have the desired effect, which may increase an ROI of a reward to a business.

Similarly, to determine a value of the reward in block 1310, if the lower-value reward selected in block 1304 is determined not to have the desired effect on consumers while the higher-value reward selected in block 1304 has the desired effect, the value determined in block 1310 may be a value between the two rewards. And if both the lower-value reward and the higher-value reward are not determined to have the desired effect on consumers, the value determined in block 1310 may be higher than the values determined in block 1304.

In some embodiments, in block 1310, as part of determining a reward value that will entice a consumer, the consumer analytics system may determine one or more other rewards based on the comparison of block 1308 and distribute these rewards to test effects of these rewards on consumers. For example, the consumer analytics system may, in block 1310, determine third and/or fourth rewards and distribute the reward(s) to consumers. The values of the third and fourth rewards may be set based on the comparison of block 1308 and may be designed to further ascertain the optimized value. Through repeatedly identifying reward values and determining an effect of the reward values on consumers, the system may identify the "optimized" value mentioned above or otherwise determine a value that will produce a desired effect.

Once the value is determined in block 1310, the process 1300 ends. Following the process 1300, the consumer analytics system may store in a non-volatile memory of the system a value of the third reward determined in block 1310. In addition, following the process 1300, the system may provide information to the business that includes the identified reward value. In some cases, the business may then elect to offer a reward having the value. To do so, the business may request that the system be configured to provide the reward to consumers in exchange for completion of tasks by the consumers. The system may be configured in any suitable manner, including according to techniques described above. Once configured, the system may also, in some embodiments, begin offering to consumers a reward having that value, such as by offering that reward to consumers in exchange for finishing tasks.

The process 1400 of FIG. 14 is similar in some ways to the process 1300 of FIG. 13 and may be used by a business to prevent customers from lapsing by determining a value of a reward to offer consumers to prevent a lapse or recover a lapsed customer. A lapsed customer of a business may be a customer that no longer visits a business that the consumer previously visited or visits a business with a lower frequency than the consumer previously visited the business. In embodiments, a lapsed customer may be determined from evaluating location data for that customer. As in examples above, the location data may include data indicating geographic locations at which a consumer was present, which may be provided by a mobile device operated by the consumer. Thus, in some embodiments, a lapsed customer may be determined through analyzing location data provided by a mobile device operated by the lapsed customer.

The process 1400 begins in block 1402, in which the consumer analytics system identifies two consumers who are customers of a business and have lapsed or are predicted to lapse (and thereby may be considered at risk of becoming lapsed). In some embodiments, the system may determine that a consumer has lapsed or is predicted to lapse by evaluating frequency with which each consumer visits a business over time, and determine whether a consumer has stopped visiting a business or is visiting a business less frequently. For example, the consumer analytics system may determine from observing locations visited by a consumer that there is more than a threshold difference in the previous frequency of visit and the current frequency of visit to a business. The consumer analytics system may identify consumers who are at risk of becoming lapsed by evaluating locations visited by the consumer or evaluating survey responses provided by the consumer. For example, the system may identify a trend or pattern in visits by a consumer that the system projects will lead to the consumer lapsing in visits to a business. As another example, the system may evaluate satisfaction of the consumers in their interactions with the business. Information regarding satisfaction of a consumer may be provided by the consumers in any suitable manner, including in response to surveys distributed by the consumer analytics system. Consumers that the system determines are dissatisfied may be identified as consumers that are predicted to lapse.

In response to determining that two consumers that are lapsed customers, either by identifying customers that have already lapsed or are predicted to lapse, in block 1404 the system selects two rewards to offer to the consumers that are redeemable at the business, one having a higher value than the other. In block 1406 the system sends each of the consumers one of the rewards and determines characteristics of consumers before and after redemption of the rewards. The characteristics of the consumers before redemption may include characteristics of the consumers before the rewards were offered. Any suitable characteristics of the two consumers may be evaluated, as embodiments are not limited in this respect. In the embodiment of FIG. 14, the characteristics that are monitored may include characteristics (e.g., behavior characteristics) that relate to the consumers' interactions with the business.

In block 1408, the system compares characteristics of the consumers' interactions with the business. In block 1410, based at least in part on the comparison, the system determines a reward value. The reward value that is determined may be a value that will drive a customer to visit a business of which the consumer is a lapsed customer. Additionally or alternatively, the value may be one that will prevent a consumer from lapsing. In either case, the desired effect that a reward is to have on a consumer's behavior may be to increase a visit frequency of the consumer to a business. The reward may be successful when a visit frequency increases more than a threshold or threshold percent, or a visit frequency of a consumer increases to a previous visit frequency for that consumer, or according to any other suitable measure of an amount of increase in a visit frequency. The system may perform the comparison and determination of blocks 1408, 1410 in any suitable manner, including according to techniques described above in connection with blocks 1308, 1310 of FIG. 13.

The techniques of FIGS. 13-14 were discussed separately, however, in some embodiments, a combined technique may be used to determine a value of a reward that will entice a lapsed customer (which may be a customer that has already lapsed or a customer that is predicted to become a lapsed customer) of one business to visit a competitor. The combined processor may be performed in a manner that should be appreciated from the foregoing discussion.

It should further be appreciated that while, for ease of description, the examples of FIGS. 13 and 14 are described in connection with evaluating the effects of two rewards on consumers, one having a higher value than the other, embodiments are not limited to evaluating only two rewards. Embodiments may distribute any number of rewards having different values to evaluate the effect of different value rewards on consumers and determine a reward value that produces a desired effect.

While the techniques of FIGS. 13-14 were described above in connection with determining a value of a reward that will have a desired effect on consumers, it should be appreciated that the techniques may be used to determine other parameters of a reward. For example, as discussed above, in some embodiments the consumer analytics system may vary a number of notifications a consumer receives that a reward may be redeemed nearby. In some such embodiments, the system may vary a number of notifications that are provided to consumers as part of enticing a competitor's customers to visit a business or encouraging lapsed customers to visit a business. For example, the system may provide reward notifications to some consumers with one frequency and reward notifications to other consumers with a higher frequency, and determine a frequency of notifications that has the desired effect.

Comparing Rewards

In embodiments in which the system calculates an ROI of the type described above, the measure of ROI may be computed individually for each type of reward given out. The ROI on each reward may then be compared with the ROI of one or more other rewards, such as multiple rewards offered by the same business, to determine which reward provides the best ROI. Determining which reward provides the best ROI may provide an indication of which reward the system should offer more often in the future or otherwise expand on.

Figure 8:
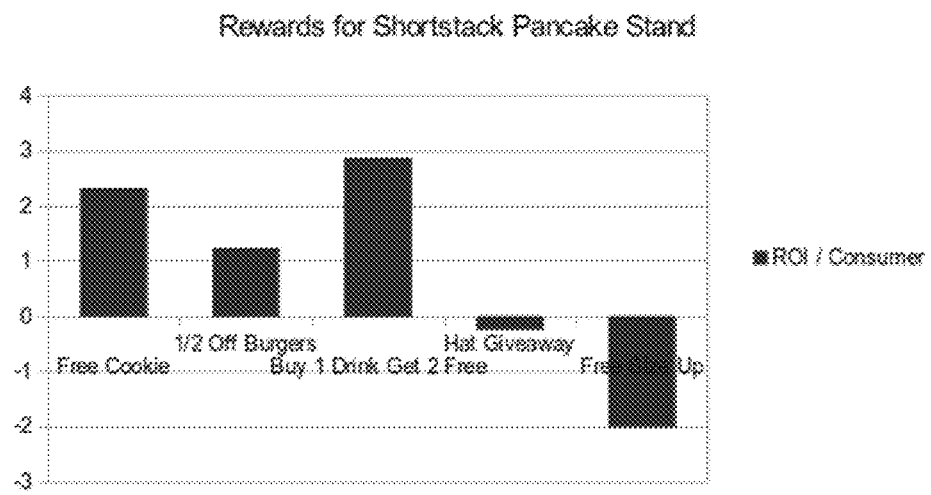
FIG. 8 is an example analytic chart of showing average Return On Investment (in dollars) for four different reward types.

In some embodiments, ROIs may also be used as a basis for the system, an administrator of the system, or a business at which the reward is redeemable to change the details of a reward. These changes may be made by manual input or, in some embodiments, may be performed automatically by the system based on criteria programmed into the system. For example, if one reward happens to have a significantly lower ROI than others, a cost of the reward may be lowered by changing the reward to offer a lower discount or to be limited to products for which the business has a higher margin. FIG. 8 is an example analytic chart of showing average Return On Investment (in dollars) for four different reward types. As shown in FIG. 8, the "Hat Giveaway" and "Free Size Up" rewards have a negative ROI and are costing the business each time these rewards are redeemed. Therefore, when the ROI for these rewards programs is evaluated, this may trigger the system and/or a person associated with the consumer analytics system and/or a business at which the reward may be redeemed to change the reward.

Avoiding Skew

In some embodiments, the consumer analytics system may also determine how much, if any, skew is being introduced into the data collected from consumers as a result of rewards influencing the behavior of the consumers. While businesses may be interested in how much a reward can or does influence consumer behavior, if a consumer's behavior is influenced too much by a particular reward or by multiple rewards offered to a consumer, information regarding the consumer's behavior may not be valuable to the business. For example, if a consumer's travel routes are influenced too much by rewards, information regarding that consumer's travel routes may not be valuable to businesses. In some embodiments in which the consumer analytics system computes or estimates skew introduced by rewards, the system may identify, for a set of consumers related in some way (e.g., consumers who are all customers of a business, or who share a demographic characteristic), characteristics (e.g., behaviors) of consumers who have been offered rewards and characteristics of consumers who have not been offered rewards. The system may then compare those characteristics to identify any differences between the consumers of the set that may be indicative of skew. Additionally or alternatively, in some embodiments that compute or estimate skew, the system may compare characteristics determined for a consumer before and after one or more rewards were offered to determine whether the characteristics differ greatly, which may be indicative of potential skew.

Linking Other Data

In some embodiments, each reward a consumer may earn may be linked by the consumer analytics system to the consumer's loyalty cards, credit or debit card transaction log data, social media data, and any other data source for the consumer.

By connecting these data sources onto the rewards, the consumer analytics system may compute additional metrics and analytics for the consumer. For example, the system may be able to obtain information about the consumer from these sources rather than others (e.g., surveys) to provide information on how much and what the consumer bought on each visit.

Published to Social Media

As part of establishing a consumer account with the consumer analytics system, the consumer analytics system may prompt a consumer to identify social media services, such as FACEBOOK®, TWITTER®, and FOURSQUARE®, that the consumer uses. If the consumer identifies social media services, and provides permission to do so, the system may publish to these services information about the rewards redeemed by the consumer. For example, the system may publish information regarding rewards to the consumer's social media feed at various stages, such as by publishing a post to a FACEBOOK® account each time the consumer earns a reward, telling the consumer's friends about the reward.

Survey Market System

The system described above may, in some embodiments, provide incentives to consumers in exchange for participating in market research. Retailers, restaurants, and other businesses or organizations that may be points of interest in the consumer analytics system can use analytics produced by the system and therefore may pay for access to the system and/or the analytics. In this way, the system may function in some embodiments as a two sided market: the consumers on one side, providing information or access to information in exchange for rewards, and the businesses on the other, acting as the customer of the system to purchase information on consumers.

One method for creating a business around this system is to charge businesses for the ability to field survey questions and for access to survey response and location analytics data. The fee could be a set amount per survey, per survey response, or per store, or in any other manner.

Another approach may be more effective in some environments because, to keep the market functioning well in these environments, the number of requests for survey responses may have to be kept in balance. If there are too few tasks and rewards, consumers who participate in the system may get frustrated and stop performing tasks in exchange for rewards. If there are too many tasks and rewards, either consumers may be feel they are being excessively bothered, or consumers may complete only some tasks such that some businesses will not receive as many responses as may be needed to make informed decisions based on information generated from the responses. Thus, in some embodiments that may be used in these environments, stores are charged a fee and the system operator will use part of the fee to cover the costs of the rewards for consumers. In other embodiments, stores will provide (or defray the cost of) rewards for their own stores. As described elsewhere, in many cases, properly targeted and optimized rewards will actually have a positive return on investment as the reward may bring the consumer back into the store. To maintain a balance in the system, in these embodiments, the businesses can be charged dynamic prices based on a few different factors including:

Which POIs are involved

How quickly responses are needed

Which kinds of consumers responses are needed from

In some embodiments, to facilitate such dynamic pricing, the system may include an interface through which electronic information may be provided by businesses to indicate what prices they are willing to pay for a request to perform a task, in a particular context, to be delivered to a consumer. This information may be provided through the interface dynamically, as the system detects opportunities to request a task of a consumer, or may be provided in terms of criteria or an algorithm that may be evaluated by the system to determine a price to request a task in a particular context. Regardless of how this information is provided, the system may be programmed to detect opportunities to request tasks and evaluate information received from one or more businesses to determine which task is requested in a particular context.

The system can balance the requests for survey responses or other tasks with the predicted number of consumers that will visit various stores and determine a price for each survey response request. As the predicted likelihood of a deficit in survey responses increases, the system may increase the price for those kinds of responses. Likewise, if the number of rewards which are being supported by stores dwindles, the system may encourage businesses to add more by reducing the price for participation by the businesses.

Additionally or alternatively, as multiple different stores use the system, there may naturally be competition for survey responses. A business interested in data on its competitors may want to gather analytics regarding its competitors. In some such cases, one of the competitors may also be a customer of the system and also want these analytics. In some embodiments, therefore, businesses may be given the ability to block competitors from obtaining information generated by consumers regarding the business. The system may enable businesses to block access by charging a fee for the business to block access by other businesses in a specified market area or by other specified businesses. In other embodiments, the system may administer an auction in which businesses are allowed to buy all of the analytics generated based on information regarding any subset of POIs, such as all businesses in a certain market area. In some such other embodiments, a business may thus be able to purchase all of the analytics generated based on information regarding its own stores and regarding its competitors, which would prevent competitors from learning about consumer behavior across the whole market area. For example, a burger restaurant may be able to purchase in such an auction exclusive access to data from all hamburger restaurants for which the system collects information from consumers and/or generates information, which would prevent all other hamburger restaurants (including the hamburger restaurant's competitors) from obtaining this information. In embodiments in which the system operates an auction, a set of information (e.g., survey responses) on which a business may bid may be segmentable in any suitable manner. For example, the system may segment, or the business may be able to segment, the information based on characteristics of the consumers, including by location behaviors exhibited by those consumers. For example, a business may be able to bid on (and receive exclusive access to) responses from consumers who had driven past a Tofu Tiles restaurant and then visited a Shortstack Pancake stand. As another example, a business may be able to bid on (and receive exclusive access to) all consumers who have a driving commute which goes past at least two hamburger restaurants.

In still other embodiments, the system may permit different businesses to purchase copies of the same survey responses or location analytics data collected and/or generated regarding the businesses. In some such embodiment, for example, two separate hamburger restaurant chains may be able to receive all of the information collected and/or generated by the system regarding any hamburger restaurants.

Figure 15:
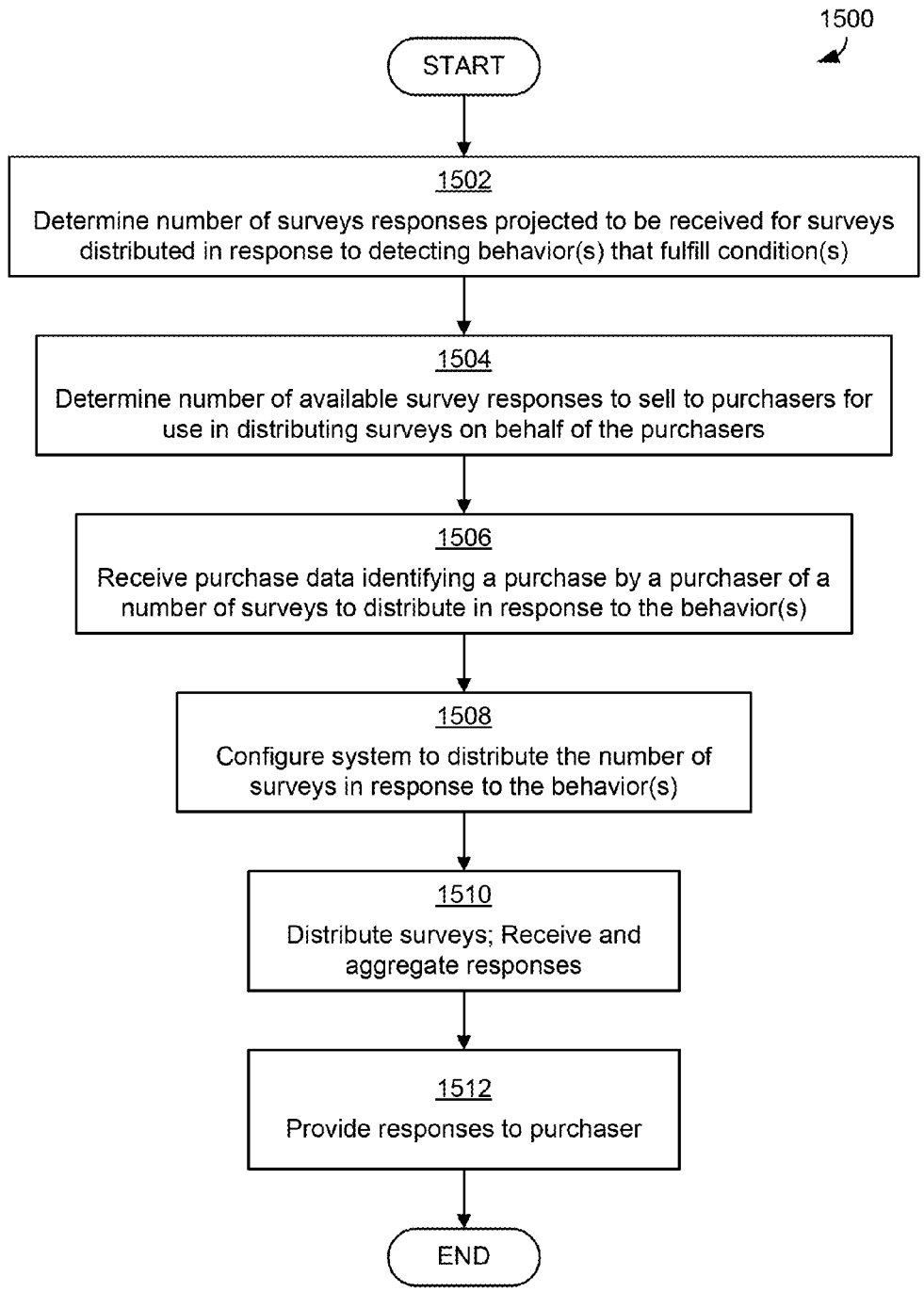
FIG. 15 is a flowchart of a process that may be implemented in some embodiments for making survey response opportunities available for purchase and distributing surveys in response to purchases of opportunities.
Figure 16:
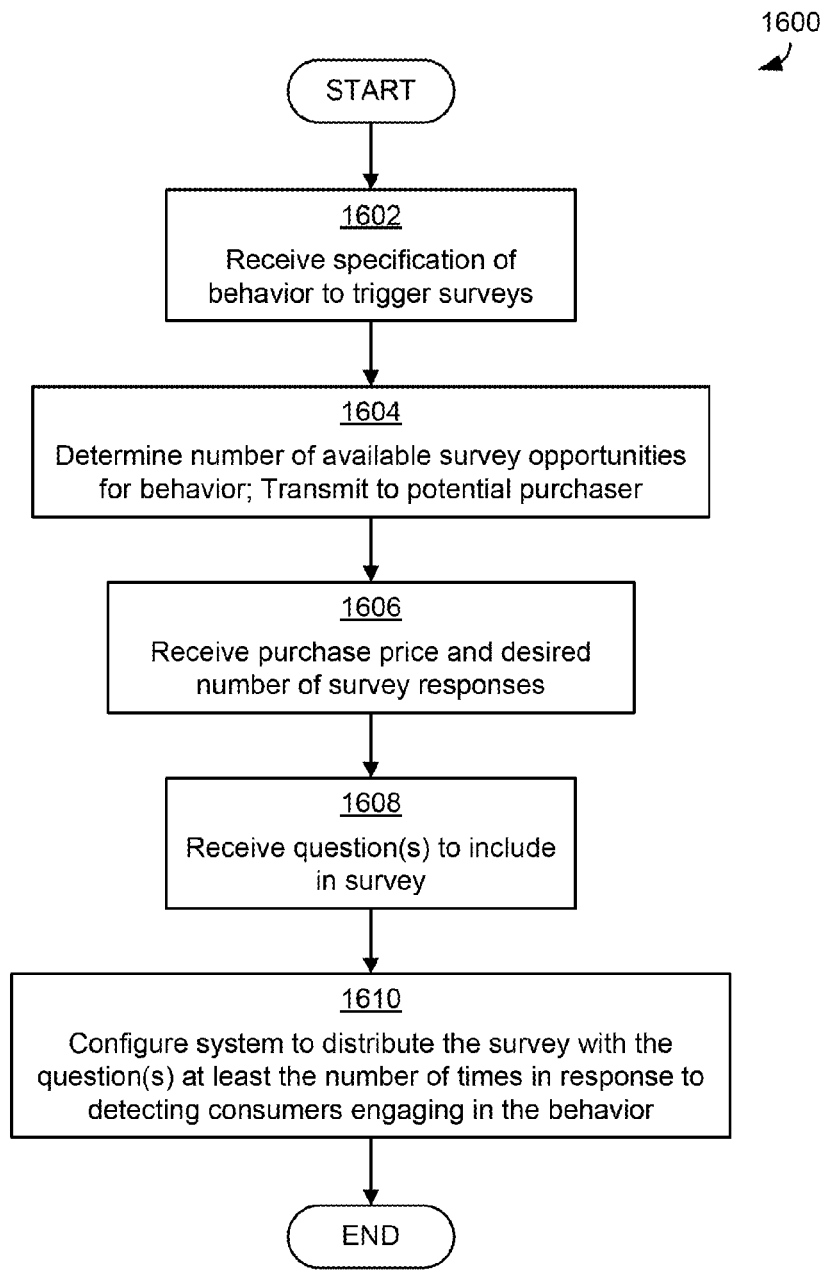
FIG. 16 is a flowchart of a process that may be implemented in some embodiments for receiving a purchase of a number of survey response opportunities and configuring a consumer analytics system to distribute a survey in response to a purchase.
Figure 17:
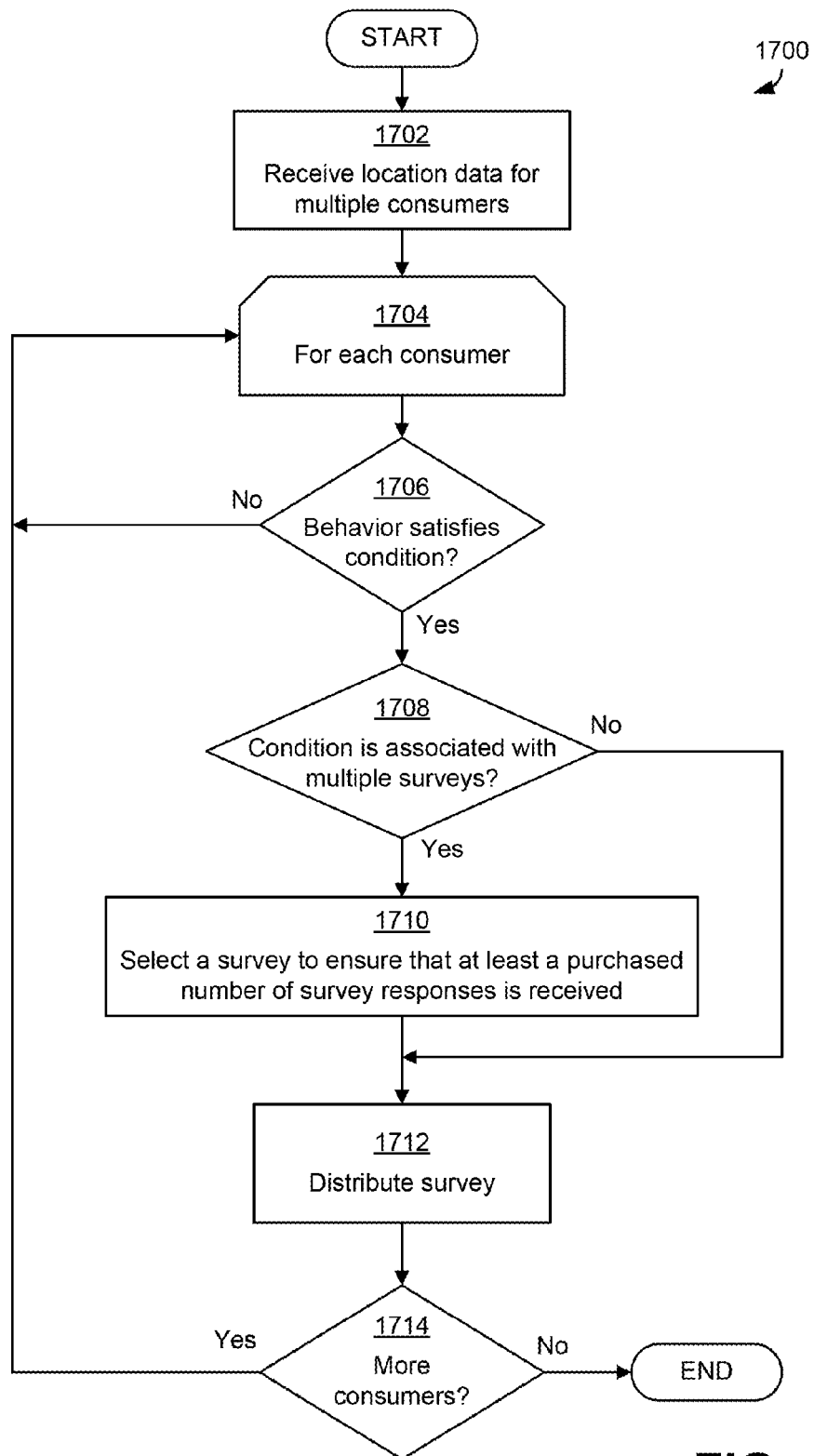
FIG. 17 is a flowchart of a process that may be implemented in some embodiments for determining a survey to distribute to a consumer in response to determining that a behavior of the consumer satisfies a condition.

FIGS. 15-17 illustrate techniques that may be implemented in some embodiments by a survey market system operating in accordance with the foregoing concepts. Such a survey market system may be a component of a consumer analytics system in some embodiments. The survey market system may be implemented on one or more servers and may electronically communicate via one or more networks (e.g., the Internet) to receive from purchasers requests to electronically distribute surveys to consumers using techniques discussed above and to electronically distribute information resulting from the surveys to the purchasers. It should be appreciated, however, that embodiments are not limited to implementing a survey market system according to any of these illustrative techniques, nor limited to implementing a survey market system in any particular form.

FIG. 15 illustrates a process 1500 that may be used in some embodiments for offering survey response opportunities for sale to one or more purchasers in a survey market system that is associated with a consumer analytics system that distributes surveys. A survey response "opportunity" may be, as discussed in greater detail below, an expectation of the system that, if a survey is distributed, a response will be received and represents a chance for a potential surveyor to request that a survey be distributed on its behalf. Such an opportunity may reflect a number of responses that the system anticipates receiving in a circumstance, rather than anything regarding a specific consumer or specific survey. Because, in some cases, a consumer may not respond to a survey distributed to that consumer, a number of responses or response opportunities may be smaller than a number of surveys distributed. A purchaser who purchases a response opportunity may, in some embodiments, purchase a corresponding number of survey distributions or any other suitable number of survey distributions. In other embodiments, a purchaser may purchase a number of responses and the system may distribute any suitable number of surveys to yield the number of responses that the purchaser requested.

A consumer analytics system that offers survey response opportunities for sale may operate in accordance with techniques discussed above, including by receiving location data identifying the locations of consumers over time, inferring characteristics (including behavior characteristics) of the consumers based on the locations, distributing a survey to a consumer in response to determining that inferred characteristics for a consumer satisfy one or more conditions for the survey to be distributed, and receiving responses to the surveys.

For ease of description, the process 1500 will be described below in terms of a single behavior that, when a consumer is detected to be engaging in the behavior, causes the consumer analytics system to distribute one of one or more surveys to the consumer. It should be appreciated, however, that a consumer analytics system as described herein may operate with any number of different behaviors that serve as conditions for different surveys to be distributed to consumers. Thus, while the process 1500 is described in connection with a single behavior that serves as the condition for a survey to be distributed, it should be appreciated that the process 1500 may operate with a set of one or more behaviors or may be repeated any number of times by a consumer analytics system for different behaviors or sets of behaviors.

It should be further appreciated that the behavior that serves as the condition in process 1500 may be any suitable behavior, as embodiments are not limited in this respect. For example, the condition for a survey may be that a consumer engage in a behavior that is visiting a particular store, such as a WAL-MART® (any WAL-MART® or a particular branch/store location). Other behaviors, such as exemplary behaviors discussed above, may additionally or alternatively serve as conditions for surveys. It should also be appreciated that, in some embodiments, other characteristics of consumers may be used as conditions for a survey in addition to or instead of behavior characteristics, including identity or preference characteristics for a consumer. Thus, while for ease of description the process 1500 of FIG. 15 (and some additional examples below) is discussed in terms of a condition that is a consumer engaging in a behavior, in some embodiments the conditions may alternatively or additionally include one or more other characteristics of a consumer.

Prior to the start of the process 1500, the consumer analytics system may collect location data for multiple consumers over time, including by monitoring consumers visiting various settings and consumers who respond to surveys. This information on consumers visiting settings and responding to surveys may be stored in one or more data stores of the consumer analytics system.

The process 1500 begins in blocks 1502 and 1504, in which a survey market system of the consumer analytics system determines, prior to offering survey response opportunities for sale, whether the system has survey response opportunities available for sale. In some cases, the survey market system may not explicitly determine whether there are opportunities available for sale, but may instead have knowledge that there are opportunities available. In other embodiments, however, the system may make an explicit determination, for a particular condition or set of conditions (e.g., behaviors) that are to trigger a survey, whether there are available survey response opportunities and/or a number of available response opportunities.

In the example of FIG. 15, in block 1502, the system determines, for the particular behavior that serves as a condition for distribution of surveys to a consumer (e.g., visiting a WAL-MART® or a particular branch of WAL-MART®, or visiting any brand of big-box store), a number of survey responses the system projects receiving in a time period. This number of survey responses the system projects receiving may be a number of responses that the system expects to receive in response to distributing one of one or more surveys to consumers when the system detects that the consumers are engaging in the behavior. The consumer analytics system may determine this number by reviewing past data collected on consumers and survey responses provided by those consumers. For example, if a time period is a number of days (e.g., a month), the consumer analytics period may review past data collected over the past number of days or a corresponding set of days from a previous year. The consumer analytics system may also evaluate past data collected in the time period across multiple previous iterations of the time period and perform an analysis to produce an average, median, or other statistical value for the multiple iterations.

In some cases, the consumer analytics system may have previously distributed surveys when the behavior was detected. In these cases, in block 1502, the consumer analytics system may review past data to determine (1) a number of times the behavior (or other characteristic) was previously detected in the time period, and (2) out of a number of surveys distributed to consumers in response to the behavior, a number of responses to those surveys received by the system.

In other cases, the system may not have previously distributed surveys in response to detecting the behavior. In some such cases, the system may have previously received location data indicating the behavior and have detected consumers engaging in the behavior, and the system may review this data to determine the number of times the behavior was previously detected in the time period. In this case, in block 1502 the system may then determine a number of responses the system projects receiving in response to distributing any surveys, which may be an average or median proportion of distributed surveys to which a response is received. The average or median proportion may be determined by the system based on any suitable responses previously received by the system. For example, the system may determine the average or median proportion based on responses received to all surveys distributed by the system or any suitable portion of surveys distributed by the system. As another example, the portion may, in some cases, include responses received from consumers who the system considers representative of the consumers to which surveys would be distributed in response to detecting the behavior. For example, if the system determines that consumers previously detected to have engaged in the behavior have some characteristic, the system may evaluate a proportion of responses received for surveys distributed to consumers having the characteristic. By evaluating responses from representative consumers, the system may try to estimate a number of responses the system can expect to receive if the system begins distributing surveys in response to detecting the behavior.

In some cases, such as where a set of consumers to be surveyed or asked to complete other tasks is limited by some characteristic(s), the system may also project responses based in part on consumers who have the characteristic(s). For example, if a survey is to be distributed to consumers who live in a geographic area, the system may evaluate a number of consumers that are registered with the system and are known to live in that geographic area, when projecting a number of responses that will be received.

In addition, in some embodiments, the consumer analytics system may evaluate a number of surveys that are to be distributed when determining a number of responses that the system projects receiving in a time period. As discussed above, in some embodiments the system may regulate a number of surveys distributed to consumers to avoid overwhelming consumers with too many surveys. It may be the case that as more purchasers purchase more survey opportunities and more surveys are available to be distributed to consumers via the consumer analytics system, the system may opt to reduce a frequency of distribution of surveys to avoid such overwhelming. For example, the system may elect to distribute surveys to individual consumers only after a delay, such as only one per day or one every few days or other suitable timeframe. Accordingly, in some embodiments, the system may consider a number of surveys that are distributed to determine a number of responses that will be received.

Once the consumer analytics system determines in block 1502 a number of survey response opportunities (i.e., a number of responses the system projects receiving), the system can determine how many response opportunities to offer for sale via the survey market system. Accordingly, in block 1504, the consumer analytics system determines a number of available survey response opportunities to offer for sale to purchasers. The number of available response opportunities may, in some cases, be equal to the number of survey responses the system expects to receive. This may be the case where the system has not been previously distributing surveys in response to detecting consumers engaging in the behavior and, thus, all surveys that are distributed in response to the behavior may be distributed on behalf of one or more new purchasers and all responses received may be provided to the purchaser(s). In other cases, however, the number of available response opportunities may be less than the number of survey response opportunities the system determined in block 1502. This may be the case where the system has previously been distributing surveys in response to the condition. For example, when the system distributes a default survey, for production of a syndicated data feed, in response to the condition, the system may need to receive a pre-established number of responses, such as a number of responses that would produce statistically-significant results, or at least meaningful or scientifically-relevant results or results otherwise having a desired level of accuracy, for the syndicated data feed. As another example, if one or more other purchasers have previously purchased a number of responses for surveys provided by the purchasers, the system may be configured to distribute surveys to consumers in a manner that will generate a desired number of survey responses for those purchasers. The desired number of survey responses may be, for example, a number of survey responses that has been purchased by a purchaser and that the consumer analytics system must receive to fulfill the purchaser's request. The desired number of survey responses may additionally or alternatively include a number of survey responses to a particular survey (e.g., a purchaser's survey or a default survey that is distributed by the system and is unrelated to a purchase from a purchaser) that will generate statistically-significant results (or meaningful or scientifically-relevant results) or results having a desired statistical margin of error for questions in the survey.

Thus, in block 1504, the consumer analytics system may determine whether the number of expected survey response opportunities determined in block 1504 is greater than a desired number of survey responses that will be used for previously-generated surveys. If the expected number is not greater than the desired number, then there are no available survey response opportunities that can be offered for sale, as all of the expected responses will be used by the system for receiving responses to the surveys already being distributed by the consumer analytics system. In this case, the process 1500 would end, as there are no responses to sell to new purchasers via the survey market system. However, if the desired number of survey responses is less than the expected survey response opportunities, then in block 1504 the system determines the difference to be a number of available response opportunities. These response opportunities may be considered to be the "excess" response opportunities beyond what the system currently needs, and represent an opportunity to distribute a new survey and receive responses to the new survey in those "excess" responses.

Following determining a number of available response opportunities in block 1504, the survey market system may make the number of available response opportunities available for purchase. The survey market system may do so in any suitable manner, as embodiments are not limited in this respect. Examples of ways in which the survey market system may make response opportunities available for purchase are discussed below in connection with FIG. 16.

As a result of making the opportunities available for sale, in block 1506 the survey market system receives a purchase from a purchaser in block 1506. The purchase information may include information identifying a minimum number of responses the purchaser would like to receive, which may be equal to or less than the number of available survey responses. The purchase information may also include questions that the purchaser would like to ask in a new survey distributed to consumers.

Following the receipt of the purchase in block 1506, in block 1508 the consumer analytics system configures itself to distribute the new purchaser's survey to consumers when the behavior is detected. The consumer analytics system may configure itself to distribute the survey a greater number of times than the minimum number of responses that the purchaser has purchased, as some consumers may not respond to the survey when the consumers receive the survey. The consumer analytics system may distribute the survey during the time period a number of times such that the system expects to receive the minimum number of responses. Once the system is configured, in block 1510 the consumer analytics system distributes the survey to consumer detected to be engaging in the behavior, receives responses to the survey, and aggregates the responses in any suitable manner. In block 1512, the responses are provided to the purchaser, and the process 1500 ends.

Following the process 1500, the consumer analytics system may continue to distribute the survey in future time periods, if the purchase by the purchaser requested that the survey be distributed across multiple time periods. As a result of the process 1500, the consumer analytics system is configured to distribute a new survey a number of times so as to receive a minimum number of survey responses, and stores responses to the survey received from consumers.

FIG. 16 illustrates an example of a process that may be carried out by a survey market system to receive a purchase of survey response opportunities from a purchaser. The process may be carried out by a survey market system executing on one or more computing devices and receiving information via the Internet. For example, in some embodiments, the survey market system may receive information from purchasers via the web, and purchasers may provide input to one or more web pages served by the survey market system.

The process 1600 begins in block 1602, in which the survey market system receives a specification of a behavior that a purchaser would like to use to trigger distribution of surveys on behalf of the purchaser. The behavior may be any suitable behavior or set of multiple behaviors, including any of the examples given above, as embodiments are not limited in this respect. The survey market system may receive the specification from the purchaser in any suitable manner. In some embodiments, the survey market system may make limited options available to purchasers and may, in some such cases, provide a multiple-choice list of behaviors (or other characteristics) that purchasers may use to specify the behavior they would like to trigger distribution of their survey. In other embodiments, the survey market system may provide an interface that allows purchasers to build a set of one or more behaviors or other consumer characteristics through specifying each of the characteristics to the system. In such embodiments, the system may provide some template options, such as a "visit" to a store or "passing by" (i.e., travelling within a threshold distance of and not visiting) another store or location, and the purchaser may select a template option and provide input regarding the option. The input regarding an option may be any suitable input, such as the name of a store in the preceding examples. Such input may be received from a purchaser via one or more web pages.

After the system receives the specification of the behavior(s) in block 1602, the system determines, in block 1604, a number of available survey response opportunities for the behavior(s). The system may determine the number in any suitable manner, including using techniques discussed above in connection with FIG. 15. Once the system determines the number of available response opportunities, the system transmits the information to the potential purchaser to inform the potential purchaser of what is available for purchase.

In block 1606, the survey market system receives from the purchaser the purchase price and a desired number of survey responses that the purchaser is purchasing for the price. Receiving the purchase price may involve receipt of funds or receipt of a commitment to provide funds in an agreed-upon amount. The amount of funds that are provided or will be provided by the purchaser may be agreed upon by the purchaser and the survey market system in any suitable manner.

In some embodiments, the survey market system may determine a price for survey response opportunities, as discussed above. In some such embodiments, the survey market system may evaluate a commonness/scarcity of the behavior(s) that the purchaser wishes to use to trigger surveys. The system may set a higher price for behaviors that are more rare or difficult to detect, and a lower price for behaviors that are more common. The system may additionally or alternatively evaluate a generality of the behavior(s) specified, which may include evaluating a breadth of a market category (or categories) covered by the specified behavior(s). The system may set a higher price for behaviors that cover a wider section of the market, and a lower price for behaviors that cover a narrower section of the market. The survey market system may additionally or alternatively evaluate a number of survey response opportunities that the purchaser would like to purchase. In these cases, the system may charge a higher price for each survey response or charge an additional fee when a purchaser would like to purchase a large number of surveys. This may be because the purchaser, by asking for a large number (which may be, for example, all available surveys), is asking for a monopoly or near monopoly on responses to surveys triggered by the behavior, and the system may charge extra for that monopoly. The survey market system may additionally consider a number of other surveys that are being offered by the system in general or in response to the behaviors specified in block 1602, and increase the price as a number of surveys that are being distributed by the system increases and decrease the price when the number of surveys decreases. As discussed above, this may be done to prevent consumers from being overloaded by surveys or to prevent consumers from losing interest in the system (and ceasing to view or respond to surveys) when the surveys are seldom distributed. In embodiments in which the system sets a price, the system may evaluate any of these or any other suitable option.

In other embodiments, an auction system may be used in which purchasers bid for available survey response opportunities. In some such embodiments, the survey market system may set a starting price for an auction on one or more blocks of a certain number of available survey response opportunities (e.g., 50 responses, 100 responses, 500 responses, etc.), and may set the starting price using any suitable technique, including those discussed in the preceding paragraph or otherwise discussed herein. After the starting price is set by the survey market system or by an opening bid from a potential purchaser, potential purchasers may bid on each block of available survey response opportunities and the system may track the bids and inform other purchasers of the bids. After a time period has elapsed, the system may declare the highest bidder on each block of available survey response opportunities and receive funds from the purchaser of each block.

In block 1608, in addition to receiving from the purchaser the purchase price and the number of desired survey responses, the survey market system receives one or more questions to be included in a survey distributed by the consumer analytics system on behalf of the purchaser. As discussed above, the questions that may be included in a survey may be any suitable questions, including multiple choice or open answer, as embodiments are not limited in this respect.

In block 1610, the consumer analytics system configures itself with the information provided by the purchaser to the survey market system. As discussed above in connection with block 1508 of FIG. 15, the consumer analytics system may configure itself to distribute the survey a greater number of times than the minimum number of responses that the purchaser has purchased, as some consumers may not respond to the survey when the consumers receive the survey. The consumer analytics system may distribute the survey during the time period a number of times such that the system expects to receive the minimum number of responses. Once the system is configured, the process 1600 ends.

As a result of the process 1600, the consumer analytics system is configured to distribute the newly-received survey to consumers in response to detecting the behavior specified in block 1602, to receive responses to the surveys, and to provide the responses to the purchaser. Accordingly, following the process 1600, the consumer analytics system stores information regarding the new survey and the behavior(s) that will trigger distribution of the survey, as well as the number of survey responses desired in a time period.

As a result of offering available survey response opportunities for sale via a survey market system, it may be the case that a number of different surveys are to be distributed to consumers in response to detecting the same behavior in consumers. For example, it may be the case that two different companies are interested in the opinions of consumers who shop at WAL-MART® and have each asked that surveys be distributed to consumers that are detected to visit a WAL-MART® and have each asked that they receive a minimum number of responses to their surveys. Thus, it may be the case that the consumer analytics system may expect to observe 5,000 consumers (who have previously registered with the system) visit a WAL-MART® in a time period and to distribute surveys to those consumers and may expect to receive 3,000 responses to those surveys, and each company has asked to receive at least 1,000 surveys. The consumer analytics system should therefore, when choosing which survey to distribute to a particular consumer who has been detected to visit a WAL-MART® in the time period, observe how many responses have been received for each survey and distribute a survey to ensure that the system receives at least 1,000 responses to each survey.

FIG. 17 illustrates an example of a process that may be implemented by a consumer analytics system to select a survey to distribute to consumers in response to observing locations visited by the consumers. The process 1700 begins in block 1702, in which the consumer analytics system receives from mobile devices operated by consumers location data that indicates a geographic location of each consumer at a time that the location data was generated. In block 1704, the consumer analytics system loops through the location data for each consumer, evaluating new location data together with previously-received location data and/or profile data for a consumer to predict or infer characteristics, including behaviors, of each consumer. In block 1706, the system determines whether the location data for the consumer currently being evaluated is indicative of a behavior that satisfies one of the conditions that are associated in the system with surveys, such that satisfaction of the condition may result in a survey being distributed to the consumer. If not, then the process 1700 returns to block 1704 and the consumer analytics system evaluates location data for a new consumer. If, however, the system determines that a condition (of the various conditions that may be associated with surveys and are evaluated by the system) is satisfied by the consumer's behavior, the system may determine that a survey is to be distributed and proceed to select a survey to distribute.

Accordingly, in block 1708 the system determines whether the condition that was satisfied in associated with multiple surveys, each of which is available to be distributed to the consumer in response to the condition being satisfied. If not, then the process 1700 continues to block 1712.

If, however, the condition is associated with multiple surveys, then in block 1710 the system selects a survey to distribute to the consumer. The selection may, in some cases, be a random selection between the available surveys. In other cases, the selection may be random, but the surveys may have unequal probabilities of being randomly selected by the system for distribution to the consumer. This may be the case where each survey has a minimum number of responses that are to be received in response to the survey in a time period, such as a minimum number for the survey results to be statistically significant or a minimum number for which a purchaser has paid. In this case, as responses are received to each survey, the system may automatically adjust the probabilities associated with each survey and the condition. The probabilities for each survey may be equal at a start of the time period, but may deviate if responses are received to each survey unequally. For example, if a survey is receiving more responses than others, then the probability associated with that survey may be lowered, such that the survey is less likely to be picked than one or more other surveys that are receiving fewer responses. By doing so, one of the other surveys is more likely to be picked by the system and sent to consumers, such that the system is more likely to receive responses to the survey and the minimum number of responses is more likely to be met. While a random, probabilistic selection may be made in some cases, in some embodiments the consumer analytics system may perform a simpler process, such as by selecting a survey that has the smallest fraction of responses received relative to the minimum number of responses needed for that survey. Embodiments are not limited to selecting a survey for distribution in any particular manner.

Once the survey is selected in block 1710, or if the condition is determined in block 1708 to be associated with only one survey, the survey is distributed to the consumer in block 1712. The survey may be distributed in any suitable manner, including according to techniques described above. For example, at least one message may be sent by the system to the mobile device that transmitted the location data for the consumer that was received in block 1702. The message that is sent to the mobile device may solicit the consumer to complete the survey and may include any suitable information about the survey. In some embodiments the information about the survey may include one or more questions included in the survey or a link to a web location (e.g., a URL) from which the mobile device can retrieve the questions of the survey for presentation to the consumer.

Once the survey is distributed in block 1712, the system determines in block 1714 whether more consumers are to be evaluated. If so, the process 1700 returns to block 1704 to evaluate location data for another consumer. If not, the process 1700 ends.

As a result of the process 1700, surveys are distributed to consumers in a manner that is designed to ensure that the minimum number of responses for each survey is received. The consumer analytics system will receive the responses to the surveys and store the responses, and may further aggregate responses received for each of the surveys and provide the responses to the party (e.g., a purchaser) on whose behalf the consumer analytics system distributed the surveys.

It should be appreciated that while the example of FIG. 17 was, for ease of description, described as operating with a single condition for the surveys (e.g., a behavior that satisfies a condition for one or more surveys to be distributed), embodiments are not limited to operating with a single condition to distribute surveys. As discussed above, any suitable combination of two or more conditions may also be used, which may relate to any suitable type of characteristic for a consumer. Accordingly, in some embodiments, a process similar to the process 1700 may be carried out in which multiple characteristics for a consumer are compared to multiple conditions to determine if the conditions are met.

Additionally, it should be appreciated that the example of FIG. 17 was, for ease of description, described in the context of multiple surveys that are all associated with the same condition. If one or more conditions are associated with each survey, two surveys may have different, but at least partially overlapping, conditions and characteristics for a consumer may satisfy both conditions. For example, one survey may have as a condition that a consumer visited a WAL-MART® and another survey may have as conditions that a consumer visited a WAL-MART® in the middle of a weekday on a path that started at the consumer's workplace. The system may detect that a consumer who leaves work at noon on a Tuesday to go to a WAL-MART® has characteristics that satisfy conditions of both surveys, even though the surveys do not have identical conditions. In that case, in some embodiments, the system may carry out a process similar to the one described above in connection with block 1710 to select one of the surveys to distribute to the consumer.

Lastly, it should be appreciated that while each of the examples of a marketing system described in connection with FIGS. 15-17 is described in the context of surveys, some embodiments may additionally or alternatively operate with other tasks that may be distributed to consumers, such as obtaining a photograph or other media.

Survey Administration

In some embodiments, the consumer analytics system provides a user interface for businesses to enter and manage the survey questions the businesses would like to ask consumers. The interface may also enable businesses to specify how much the businesses are willing to pay for the survey responses and data generated by the consumer analytics system based on consumer locations and/or the survey responses. The system may also include an interface for configuring where, when, and to whom the survey should be provided, such as locations and demographic characteristics that should be detected for a consumer to be prompted to answer the questions.

Survey Metering

As discussed previously, in some embodiments, the system may function as a two-sided market. In some such embodiments, to maintain the balance and not overly burden consumers, the system may set prices dynamically. In addition or alternatively, the system may meter requests for tasks (e.g., completion of surveys) to consumers so as not to overburden the consumers. In some such embodiments, the system may have a rules engine that allows an administrator to control how many requests of which type are sent to which kinds of consumers.

A potential problem that may arise in this system in some environments is that the surveys themselves or the rewards can introduce skew into the results. Skew, as discussed above, may be undesirable. For example, simply asking a consumer in a survey if she enjoys the french fries from a restaurant, Tofu Tiles, may raise that consumer's awareness of the Tofu Tiles brand and the french fries from there, potentially making it more likely the consumer will visit a Tofu Tiles location in the future. In addition, by providing a consumer a reward for a free product redeemable at a given POI, the consumer may be more likely the visit the given POI.

In some embodiments, to help manage this skew, the rules engine of the system may meter which surveys and rewards go to which consumers.

Brand Tracking and Advertising Awareness

In some embodiments, the consumer analytics system may be used to measure the effectiveness of advertising and other types of marketing campaigns. To do so, tasks requested by the system may relate to the marketing campaigns, such as a task involving answering survey questions. For example, as part of a survey, questions may be asked to gauge:

How aware of a store's brand was the consumer
Which brands of store did the consumer consider for the visit
Which brand(s) are the consumer's favorite By measuring the responses to these questions across multiple consumers, POIs, and times, the consumer analytics system may create measures of the overall awareness and sentiment among consumers for each brand.

For advertising campaigns involving physical signage (such as billboards, signs on buses, etc.), location analytics can be used to measure exposure by consumers to the advertising campaign. In some embodiments, for example, location analytics can be used to divide consumers into two sets: consumers who have been detected to be in the vicinity of an advertisement and can be inferred to have been exposed to the advertising and consumers who have not been detected to be in the vicinity of an advertisement and can be inferred not to have been exposed. The system, by comparing the brand awareness and number of visits to POIs for a given brand between the two groups, may measure how effective the advertisements of the campaign are at increasing brand awareness and driving foot traffic to locations. In other embodiments, locations of a group of consumers can be measured, and analytics generated, for a period of time that includes some periods in which the advertisements are active and some in which the advertisements are not active. By comparing brand awareness and visit numbers for the two periods for this set of consumers, the system may measure how effective the advertisements are at increasing brand awareness and driving foot traffic to locations.

Figure 18:
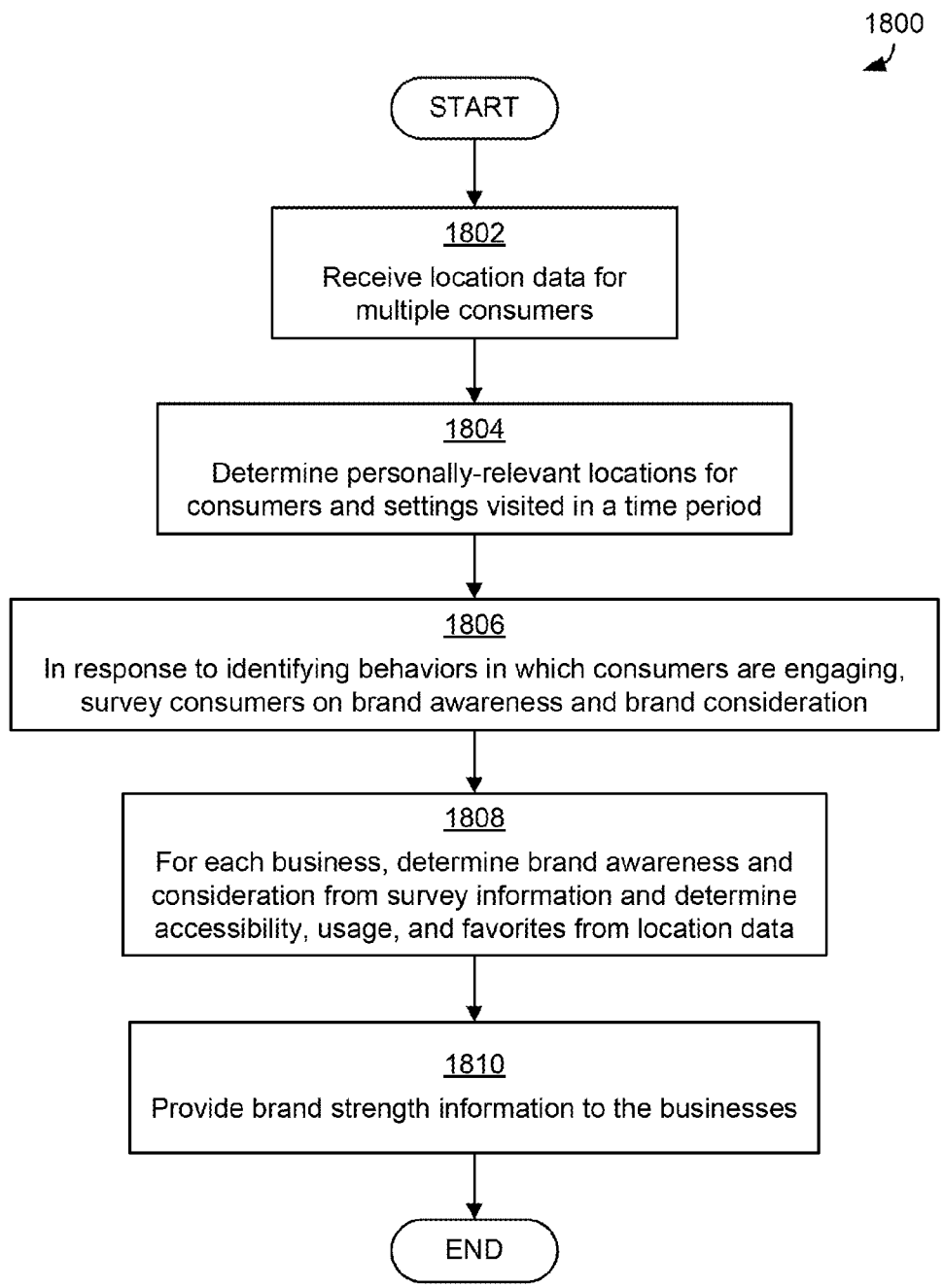
FIG. 18 is a flowchart of a process that may be implemented in some embodiments for monitoring a brand strength of one or more businesses.
Figure 19:
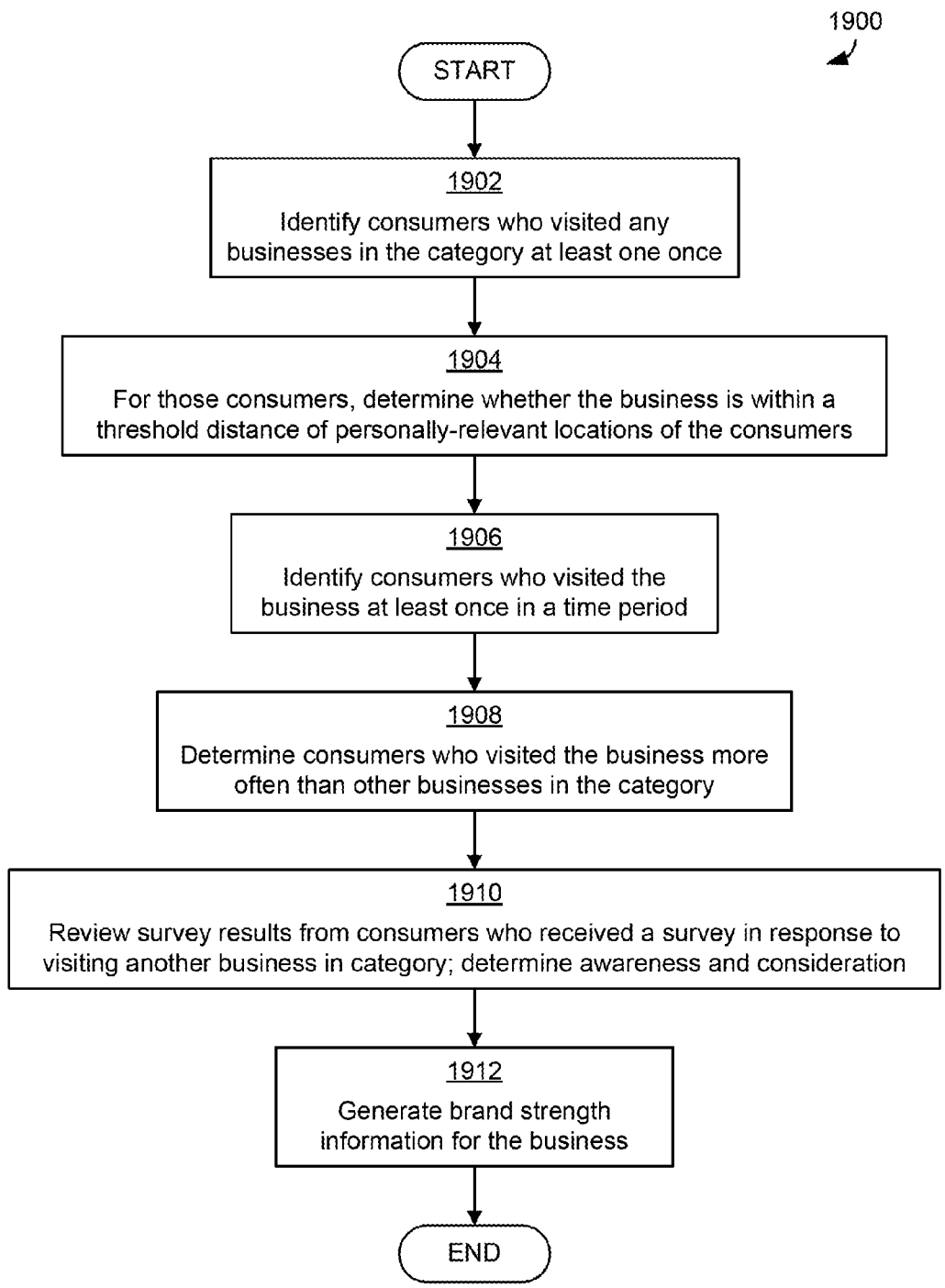
FIG. 19 is a flowchart of a process that may be implemented in some embodiments for determining factors relating to brand strength for a particular business in a market category.
Figure 20:
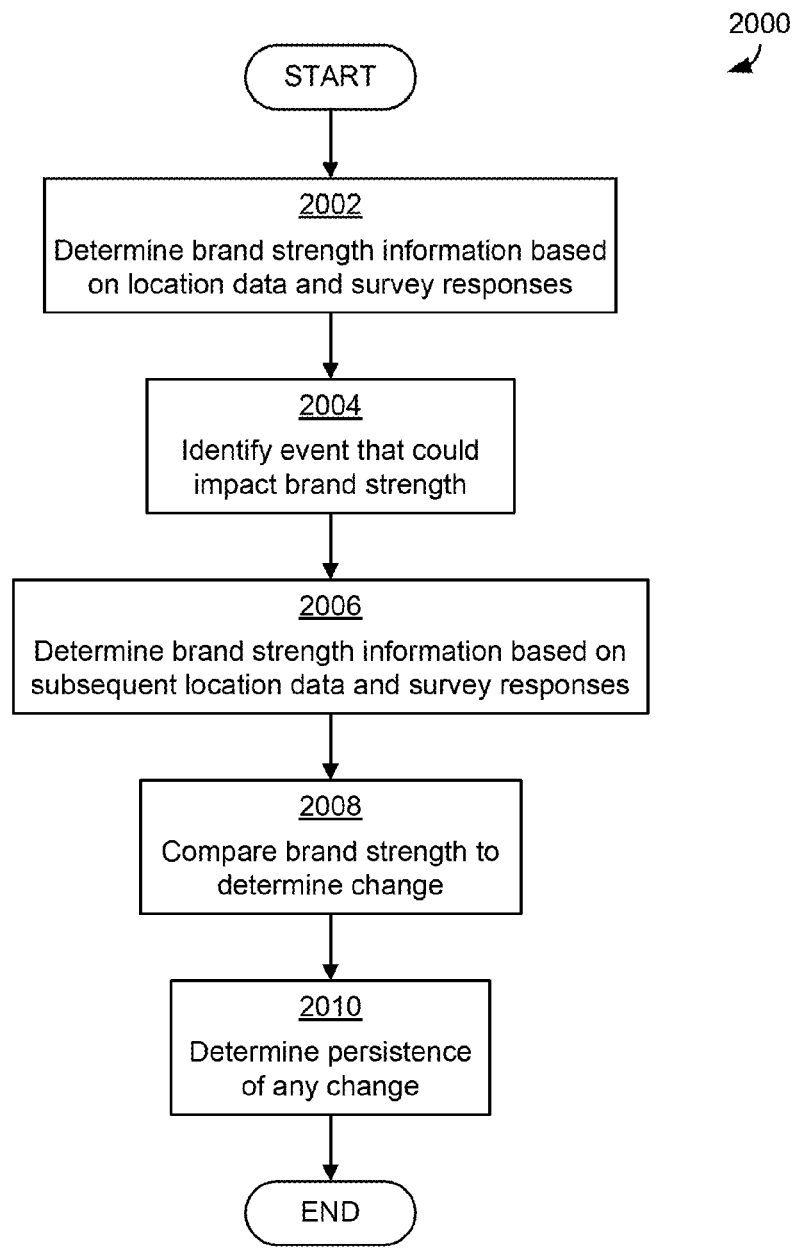
FIG. 20 is a flowchart of a process that may be implemented in some embodiments for monitoring a change in brand strength over time relative to an event that may impact brand strength.

FIGS. 18-20 illustrate examples of techniques that may be used by a consumer analytics system to track consumers' knowledge of brands and interactions with brands. A "brand" of a business is a name by which the business is known to consumers. The brand may appear on goods produced and/or sold by the business, appear in advertisements for the business, or appear on storefronts for the business. In some embodiments, a determination of brand strength may be performed for businesses with one or more stores and, as discussed below, the determination may be made in part based on visits by consumers to those stores. For example, a brand strength of a retailer or restaurant may be measured. It should be appreciated, however, that embodiments are not limited to implementing the techniques illustrated in any of FIGS. 18-20 and that other techniques may be used.

Brand strength for a business may be measured in any suitable manner. A brand strength may represent any suitable measurement of a fraction or share of a market category that is held by a business. Such a share of a market category may be measured by a share of money spent by consumers at a business relative to the market category, or a share of consumers' attention that is received by a business relative to the market category as a whole. As another example, a share of a market category may be measured relative to an amount of time consumers spend in a business' store relative to time spent in other stores in the market category.

In the embodiments of FIGS. 18-20, a consumer analytics system may determine brand strength for a business using five factors that each represent a "share" of a market category held by a business. The five factors that may be tracked by the consumer analytics system in these embodiments may be brand awareness for a business, brand accessibility for the business, brand consideration, brand usage, and brand favorites. The system may additionally track changes in these five factors over time. The five factors that may be tracked may be factors that describe the share of consumers that are customers or are potential customers of the business. The five factors may each be related to a share of consumers and may for many (but not necessarily all) businesses have the same order when ordered from largest share to smallest share.

Brand awareness may identify a share of consumers who are aware of a business or are at least aware of the name of the business. Brand accessibility represents a share of consumers who have an opportunity to visit the business, which may in some embodiments be defined by the share of consumers for whom personally-relevant locations (e.g., home locations) are within a threshold distance of the business or a branch of the business. Brand consideration may represent a share of consumers that are not only aware of the business, but actively consider visiting a business to purchase goods or services. Brand usage may represent a share of consumers that have visited the business at least once, and brand favorites may represent a share of consumers for whom the business is a "favorite" business to shop at. The consumer analytics system may determine that a business is a favorite in any suitable manner, including by determining whether a consumer visits the business more often than any other business in a market category (e.g., more often than competitors of the business) or more than a threshold number of times in a time period (e.g., more than 5 times a month). The consumer analytics system may additionally or alternatively determine that a business is a favorite by asking a consumer for his or her favorite businesses, such as in a survey. These five factors may, in many cases, represent a decreasing share of consumers for a business in this order: awareness, accessibility, consideration, usage, and favorite.

It should be appreciated that a share of consumers determined using these techniques may be a share of any suitable pool of consumers. In some embodiments, the pool of consumers may be all consumers in a geographic area, such as all Americans or all people within a state or region. In other embodiments, other pools of consumers may be used. For example, in some embodiments a brand strength for a business may be based on a pool of consumers who visit one or more businesses in a market category of that business. In other embodiments, a brand strength for a business may be determined based on a particular demographic group, such as consumers in a certain age group or income range. Any suitable consumers defined in any suitable manner may be used to determine brand strength for a business.

In embodiments, the five factors (awareness, accessibility, consideration, usage, and favorite) may be determined from analyzing location data for consumers and survey responses for consumers. In particular, in some embodiments, brand accessibility, usage, and favorite for a business may be determined based on location data for consumers and brand awareness and consideration may be determined based on survey responses.

FIG. 18 illustrates an example of a process that a consumer analytics system may implement in some embodiments for determining brand strength information for a business. Prior to the start of the process 1800 of FIG. 18, the consumer analytics system may be configured with conditions, tasks, and rewards, and has presented rewards to consumers in exchange for consumers completing a task (e.g., providing a response to a survey). The process 1800 begins in block 1802, in which the consumer analytics system receive location data for multiple consumers. In block 1804, from an analysis of the location data for each consumer, the consumer analytics system determines settings that each consumer visited and personally-relevant locations for the consumers.

In block 1806, the system analyzes the location data and distributes surveys to consumers in response to determining that the consumers' behaviors (or other characteristics) satisfy conditions for distribution of the surveys. The surveys that are distributed in block 1806 include questions on brands of which the consumers are aware as well as brands that the consumers considered visiting for the shopping trip the consumers were on at the time they received the survey. The questions on brand awareness and consideration may be formatted in any suitable manner, as embodiments are not limited in this respect. In some embodiments, the questions may be presented as multiple choice, with the choice options for the questions listing multiple brands, that ask the consumer to select all of the brands of which the consumer is aware or considered visiting. In other embodiments, the questions may be presented as free response and the consumer may be asked to provide the names of the brands in text.

In block 1808, for each of multiple businesses, the consumer analytics system determines shares of consumers who are aware of the business and who considered visiting the brand from the survey responses. In addition, the consumer analytics system determines which consumers visited the business and how often, from which the consumer analytics system can determine shares of consumers who "use" the business and from whom the business is a favorite. Lastly, the consumer analytics system reviews the personally-relevant locations for each consumer and the locations of the business to determine a share of consumers for whom the business is accessible.

In block 1810, the consumer analytics system uses the awareness, accessibility, consideration, usage, and favorites data determined for each business in block 1808 to generate brand strength information for each business and provides that brand strength information to the businesses. The brand strength information that is generated in block 1810 may be any suitable information in any suitable format, as embodiments are not limited in this respect. In some embodiments, the information may include percentages of consumers for each of the five factors discussed above and a description of the pool of consumers of which the percentages represent a part. After the brand strength information is generated and provided, the process 1800 ends.

FIG. 18 described in general an overall process for determining brand strength information from location data and survey responses. FIG. 19 shows an example of a process 1900 that may be used in some embodiments for determining brand strength information for a particular business in a market category based on location data and survey responses from consumers.

The process 1900 of FIG. 19 begins in block 1902, in which the consumer analytics system reviews location data for consumers to identify consumers who visited any business in the market category (e.g., the business for which brand strength information is to be generated and competitors of that business). The consumers that are identified may be those who the system has ever detected to have visited a business in the category, or those consumers who visited a business in the category within a time period. In embodiments in which a time period is used, the time period may be selected relative to a market category of the business being evaluated, as consumers may visit businesses in different categories with different frequencies. For example, for a grocery store, a relatively short time period (e.g., one or two weeks) may be used, while for a home renovation store, a relatively long time period (e.g., three or six months) may be used, as consumers typically visit grocery stores more often than home renovation stores.

By identifying all consumers who visited one of the businesses in the category, the consumer analytics system may thereby identify a pool of consumers who are customers of businesses in the category. The system may then generate brand strength information for a particular business that identifies a share of consumers in this pool that are customers of the business or potential customers of the business.

In block 1904, after identifying the pool of consumers in block 1902, the system identifies personally-relevant locations for each of the consumers and determines whether the particular business (or a branch of the particular business) is within a threshold distance of the personally-relevant locations for each consumer. The threshold distance may be any suitable distance, such as 10 miles or 50 miles, as embodiments are not limited in this respect. In some embodiments, the threshold distance may be different for different market categories, as consumers may be willing to travel different distances for different types of businesses. By identifying the consumers for whom the business is within a threshold distance of personally-relevant locations, the system may identify consumers for whom the particular business is "accessible." The proportion of consumers (from the pool identified in block 1902) who can access the particular business may be the "accessibility" share for the business.

In some embodiments, accessibility for each consumer may be a binary "yes/no" determination regarding proximity of the business to a personally-relevant location for the consumer. In other embodiments, however, the system may evaluate a number of branches of the business to determine a density of the business within the threshold distance of each consumer. For example, the system may determine whether the business has a number of locations above a threshold and, if so, identify that the business has "high" accessibility for a consumer, and "low" accessibility otherwise.

In block 1906, the consumer analytics system additionally determines, from the pool of consumers identified in block 1902, which consumers visited the particular business at least once. The visits that are evaluated may be visits within a time period, such as the time period used in block 1902. The visits may be identified by the consumer analytics system from location data for the consumers. The identified consumers are those who have "used" the particular business, and the proportion of consumers from the pool who have visited the particular business may be the "usage" share for the business.

In block 1908, the consumer analytics system determines a share of consumers (of the pool identified in block 1902) for whom the particular business is a "favorite" in the market category. In the example of FIG. 19, the consumer analytics system determines the "favorite" share by determining, from location data for the consumers, those consumers who visited the particular business more often than any other business in the market category. In some embodiments, the consumer analytics system may analyze the number of visits to the various businesses of the category in a time period, such as a time period that was used to identify the pool of consumers in block 1902.

In block 1910, the consumer analytics system reviews survey responses from consumers to whom the system distributed surveys in response to detecting that the consumers visited other businesses in the market category. The survey responses may be responses received to surveys that were distributed in a time period, such as the time period used in block 1902. The surveys that were distributed may include questions relating to brand awareness and consideration, such as the questions discussed above in connection with block 1806. The system may only analyze responses triggered by visits to other businesses because the system may infer that consumers that were detected to visit the particular business are both aware of the business and considered visiting the business (because they did visit the business). From reviewing the businesses identified by consumers in response to brand awareness questions and brand consideration questions, the system may identify a share of the pool of consumers who are aware of the particular business and who considered visiting the particular business. In some embodiments, the consumer analytics system may also increase the "awareness" and "consideration" shares to account for consumers who visited the business, such that the "awareness" and "consideration" shares reflect the responses to the surveys and the actual visits to the business.

In block 1912, the consumer analytics system may compile the brand strength s identified in blocks 1906-1910 and generate overall brand strength information for the particular business, then provide the brand strength information to the business. The brand strength information that is generated in block 1912 may be any suitable information in any suitable format, as embodiments are not limited in this respect. In some embodiments, the information may include percentages of consumers for each of the five factors discussed above and a description of the pool of consumers of which the percentages represent a part. After the brand strength information is generated and provided, the process 1900 ends.

In the examples of FIGS. 18 and 19 described above, for ease of description, the consumer analytics system was described as generating brand strength information once and providing the brand strength information to businesses after generation. However, in some embodiments, the consumer analytics system may continually monitor brand strength information, including by monitoring a change over time in any of the five factors mentioned above. For example, the system may monitor how consumers' "favorite" businesses change over time. The system may, for example, determine how many "favorite" businesses in a market category consumers have in a time period.

In some embodiments, the consumer analytics system may monitor a change in brand strength over time relative to particular events. For example, if a business begins a new advertising campaign, the consumer analytics system may determine whether and how the brand strength of the business (e.g., awareness, consideration, and usage for the business) changes over time, during and after the advertising campaign. As another example, if a business opens a new branch at a new location, the consumer analytics system may determine whether the new branch has an impact on the brand strength of the business, such as whether the increased accessibility increases consideration and usage. As a further example, in some embodiments, the consumer analytics system may analyze brand strength relative to rewards that a business/brand has asked the consumer analytics system to distribute. As discussed above in connection with FIGS. 13-14, in some embodiments the consumer analytics system may determine a value of a reward that will have a desired effect on characteristics of a consumer's interactions with a business, such as a desired effect on behaviors of consumers relative to a business. For example, the reward value may be one that increases a visit frequency of consumers. Increased visit frequency by consumers may, in some cases, increase a "usage" brand strength parameter for a business and may increase a "favorites" brand strength parameter for the business. Accordingly, in some embodiments, the system may track changes in brand strength of a business relative to a reward that has been offered by the business. In some such embodiments, such changes in brand strength may be used as part of determining a value of a reward to offer, such as in determining an optimal value of a reward. For example, the system may determine a lowest value of a reward that still drives a desired change in one or more brand strength parameters (e.g., change in consideration or usage).

FIG. 20 illustrates an example of a process 2000 that a consumer analytics system may use in some embodiments to track brand strength, and changes in brand strength, over time. Prior to the start of the process 2000, the consumer analytics system may register multiple consumers and receive location data for those consumers, distribute surveys to those consumers and receive responses, and identify businesses for which brand strength information is to be generated.

The process 2000 begins in blocks 2002, in which the system determines brand strength information for a business based on location data and survey responses. The system may determine the brand strength information in any suitable manner, including according to techniques described above in connection with FIGS. 18-19.

In block 2004, the consumer analytics system identifies an event that may impact brand strength. The system may identify the event in any suitable manner, including according to input by a user. Such a user may be, for example, an administrator of the system or a market researcher using the system to conduct research on brand strength.

In block 2006, the consumer analytics system determines brand strength information based on location data and survey responses collected by the system subsequent to the event identified in block 2004. As in block 2002, the system may identify the brand strength information in any suitable manner, including according to techniques described above in connection with FIGS. 18-19. After determining the brand strength information from after the event, the system may in block 2006 compare the brand strength determined in blocks 2002, 2006 to determine whether there are any changes in brand strength. Such a change may be identified by comparing percentages associated with each of the five brand strength factors discussed above. In some embodiments, the consumer analytics system may additionally segment a pool of consumers for which brand strength information was generated into one or more subpools and determine whether there is any difference in brand strength for the subpools before and after the event. The subpools may relate to any suitable segment of consumers, such as demographic segments or segments based on other characteristics. The consumer analytics system may generate brand strength information for the subpools of consumers, as in blocks 2002, 2006, and then perform a comparison of the brand strength information for the subpools to determine whether there is any change.

In block 2010, in addition to determining whether there is a change in brand strength information, the consumer analytics system may determine a persistence of any change in brand strength. As discussed above, a persistent change in brand strength may be more valuable to a business than a fleeting change and, as such, businesses may be more interested in determining whether there is a persistent change than merely whether there is a change. The system may determine a persistence of a change in block 2010 in any suitable manner, including by determining brand strength information for the business a number of additional times, in successive time periods following the event. The system may then analyze the brand strength information from the successive periods and determine how the brand strength for the business changes relative to the other periods and how the brand strength compares to the brand strength for the business before the time period.

After the system determines the persistence of brand strength change in block 2010, the process 2000 ends. Following the process 2000, the system may provide brand strength information to the business, including information on changes in brand strength following the event and persistence of any such changes.

While the brand strength analysis techniques described above in connection with FIGS. 18-20 were described relative to five factors for brand strength, it should be appreciated that other factors may be analyzed. For example, by reviewing survey responses regarding amounts spent in stores, the system may determine a "wallet" share for each business in a category. As another example, by reviewing location data for consumers, the system may track amounts of time spent in each store or a time fraction spent in each store of trips taken by consumers to determine a "time" share. As a further example, by reviewing survey responses regarding purchases by consumers, the system may track, for each business, a share of visits at which consumers did not purchase products/services at a business or did not purchase everything the consumers intended to purchase when visiting the store.

What is claimed is:

1. A method of operating a system of mobile devices, each operated by consumers, to monitor activities of and engage with the consumers so as to analyze impressions by the consumers of a business in a market category, the method comprising:

receiving, from mobile devices operated by a plurality of consumers, a plurality of units of location data, each unit of location data of the plurality having been produced by a mobile device from which the unit of location data is received and indicating a location of the mobile device at a time;

analyzing the plurality of units of location data for the plurality of consumers to determine a first number of visits made in a time period by the plurality of consumers to businesses in the market category and to determine a second number of visits, of the first number of visits, made in the time period to the business by the plurality of consumers;

in response to determining that one or more units of location data received from one or more mobile devices operated by one or more consumers indicates that a consumer visited a location associated with one of the businesses in the market category in the time period, for each mobile device of the one or more mobile devices, transmitting at least one message to the mobile device soliciting the consumer operating the mobile device to identify one or more other businesses, other than the one of the businesses visited by the consumer, that the consumer considered for fulfilling a commercial purpose for which the consumer visited the one of the businesses;

receiving, from the one or more mobile devices, a first number of responses to the soliciting that identify businesses considered for fulfilling the commercial purpose;

determining, of the first number of responses to the soliciting in the time period, a second number of responses that identify the business as a business considered for fulfilling a commercial purpose for which a visit was made to one of the businesses in the market category; and generating information on a brand strength of the business, the information on the brand strength comprising information determined based at least in part on the second number of visits that were visits to the business and the second number of responses that identify the business as a business considered by a consumer, wherein:
in the receiving the plurality of units of location data, receiving a unit of location data from a mobile device indicating a location corresponding to one business in the market category is performed contemporaneous with a visit by a consumer operating the mobile device to the one business, and in the analyzing, analyzing a unit of location data for a consumer of the plurality of consumer to determine a visit by the consumer to one business in the market category is performed contemporaneous with the visit by the consumer to the one business.

2. The method of claim 1, wherein generating information on a brand strength of the business comprises generating information on a share, of the market category, held by the business.

3. The method of claim 2, wherein generating information on the share of the market category held by the business comprises generating, based at least in part on the first number of visits and the second number of visits, a share of visits by consumers to businesses in the market category that were visits to the business.

4. The method of claim 2, wherein generating information on the share of the market category held by the business further comprises generating, based at least in part on the first number of responses to the soliciting, a share of consumers that considered the business for fulfilling commercial purposes relative to consumers that did not consider the business.

5. The method of claim 1, further comprising:
analyzing the plurality of units of location data for the plurality of consumers to determine, for each consumer of the plurality, at least one personally-relevant location for the consumer; and determining a third number of consumers of the plurality of consumers for which a location of the business is within a threshold distance of a personally-relevant location for the consumers, wherein generating information on the brand strength of the business comprises generating information on the brand strength based at least in part on the third number.

6. The method of claim 5, wherein:
the business is associated with multiple locations;
determining the third number of consumers for which a location of the business is within the threshold distance comprises identifying consumers for which more than a threshold number of locations of the business are within the threshold distance of a personally-relevant location for the consumers; and wherein generating information on the brand strength of the business comprises generating information on the brand strength based at least in part on the fourth number.

7. The method of claim 6, wherein generating information on the brand strength of the business comprises generating, based at least in part on the third number of consumers, information on a share of consumers who visit businesses in the market category and for whom a location of the business is within the threshold distance of a personally-relevant location for the consumers.

8. The method of claim 1, wherein:
soliciting the consumer further comprises soliciting the consumer to identify one or more businesses in the market category, the names of which the consumer has previously seen or heard;

the method further comprises determining, of the first number of responses to the soliciting in the time period, a third number of responses that identify that the consumer has previously seen or heard the name of the business; and generating information on the brand strength of the business comprises generating information based at least in part on the third number of responses.

9. The method of claim 8, wherein generating information on the brand strength of the business comprises generating, based at least in part on the third number of responses, information on a share of consumers who visit businesses in the market category and who have previously seen or heard the name of the business.

10. The method of claim 8, wherein soliciting the consumer to identify the one or more businesses comprises presenting the consumer with names of one or more businesses and requesting that the consumer indicate whether the consumer has previously seen or heard of each business.

11. The method of claim 8, wherein soliciting the consumer to identify the one or more businesses comprises requesting that the consumer input names of businesses in the market category that the consumer has previously seen or heard.

12. The method of claim 1, wherein soliciting the consumer to identify the one or more businesses that the consumer considered for fulfilling the commercial purpose comprises presenting the consumer with names of one or more businesses and requesting that the consumer indicate whether the consumer considered each business.

13. The method of claim 1, wherein soliciting the consumer to identify the one or more businesses comprises requesting that the consumer input names of businesses in the market category that the consumer considered for fulfilling the commercial purpose.

14. The method of claim 1, further comprising:
analyzing the plurality of units of location data for the plurality of consumers to determine a third number of consumers who visited the business more than a threshold number of times in the time period,
wherein generating information on the brand strength of the business comprises generating information based at least in part on the third number of consumers.

15. The method of claim 1, further comprising:
analyzing the plurality of units of location data for the plurality of consumers to determine a third number of consumers who, in the time period, visited the business more often than the consumers visited other businesses in the market category,
wherein generating information on the brand strength of the business comprises generating information based at least in part on the third number of consumers.

16. The method of claim 15, wherein generating information on the brand strength of the business comprises generating, based at least in part on the third number of consumers, information on a share of consumers who prefer the business over other businesses in the market category.

17. The method of claim 1, wherein:
the method further comprises analyzing the plurality of units of location data for the plurality of consumers to determine a third number of consumers who, in the time period, visited the business more often than the consumers visited other businesses in the market category,
the method further comprises analyzing the plurality of units of location data for the plurality of consumers to determine, for each consumer of the plurality, at least one personally-relevant location for the consumer;
the method further comprises determining a fourth number of consumers of the plurality of consumers for which a location of the business is within a threshold distance of a personally-relevant location for the consumers;
soliciting the consumer further comprises soliciting the consumer to identify one or more businesses in the market category, the names of which the consumer has previously seen or heard;
the method further comprises determining, of the first number of responses to the soliciting in the time period, a third number of responses that identify that the consumer has previously seen or heard the name of the business; and
generating information on the brand strength of the business comprises generating information based at least in part on the third number of responses to the soliciting that identify that consumers have previously seen or heard the name of the business, the fourth number of consumers for which a location of the business is within the threshold distance of a personally-relevant location for the consumers, the second number of responses to the soliciting that identify the business as a business that consumers considered for fulfilling commercial purposes, the second number of visits made in the time period to the business by the plurality of consumers, and the third number of consumers who, in the time period, visited the business more often than the consumers visited other businesses in the market category.

18. The method of claim 1, further comprising:
receiving the plurality of units of location data, each unit of location data indicating a geographic location of a consumer at a time the unit of location data was generated by a mobile device operated by that consumer, the plurality of units of location data being received from a plurality of mobile devices operated by the plurality of consumers.

19. The method of claim 1, further comprising:
identifying an event that may have an impact on brand strength of the business; and
generating information identifying whether there was a change in brand strength of the business surrounding the event,
wherein generating the information identifying whether there was a change comprises comparing brand strength for a time before the event to brand strength for a time after the event.

20. The method of claim 19, wherein:
the time period is a first time period before the event;
generating the information on the brand strength of the business based at least in part on the second number of visits and the second number of responses comprises generating information on the brand strength of the business before the event;
the method further comprises:
repeating the analyzing, soliciting, and determining for a second time period following the event to determine a third number of visits by consumers to the business in the second time period and a fourth number of responses received from consumers in the second time period that identify the business as one consumers considered for fulfilling a commercial purpose;
generating second information on the brand strength of the business based at least in part on the third number of visits and the fourth number of responses; and
comparing the information on the brand strength and the second information on the brand strength to determine whether there is a change in the brand strength following the event.

21. The method of claim 20, further comprising:
repeating the analyzing, soliciting, and determining for a third time period following the second time period;
generating third information on the brand strength of the business based at least in part on information collected during the third time period; and
determining a degree of persistence of any change in the brand strength of the business following the event.

22. At least one non-transitory computer-readable storage medium having encoded thereon executable instructions that, when executed by at least one computer, cause the at least one computer to carry out a method of operating a system of mobile devices, each operated by consumers, to monitor activities of and engage with the consumers so as to analyze impressions by the consumers of a business in a market category, the method comprising:
receiving, from mobile devices operated by a plurality of consumers, a plurality of units of location data, each unit of location data of the plurality having been produced by a mobile device from which the unit of location data is received and indicating a location of the mobile device at a time;
analyzing the plurality of units of location data for the plurality of consumers to determine a first number of visits made in a time period by the plurality of consumers to businesses in the market category and to determine a second number of visits, of the first number of visits, made in the time period to the business by the plurality of consumers;

in response to determining that one or more units of location data received from one or more mobile devices operated by one or more consumers indicates that a consumer visited a location associated with one of the businesses in the market category in the time period, for each mobile device of the one or more mobile devices,
transmitting at least one message to the mobile device soliciting the consumer operating the mobile device to identify one or more other businesses, other than the one of the businesses visited by the consumer, that the consumer considered for fulfilling a commercial purpose for which the consumer visited the one of the businesses;
receiving, from the one or more mobile devices, a first number of responses to the soliciting that identify businesses considered for fulfilling the commercial purpose;
determining, of the first number of responses to the soliciting in the time period, a second number of responses that identify the business as a business considered for fulfilling a commercial purpose for which a visit was made to one of the businesses in the market category; and
generating information on a brand strength of the business, the information on the brand strength comprising information determined based at least in part on the second number of visits that were visits to the business and the second number of responses that identify the business as a business considered by a consumer, wherein:
in the receiving the plurality of units of location data, receiving a unit of location data from a mobile device indicating a location corresponding to one business in the market category is performed contemporaneous with a visit by a consumer operating the mobile device to the one business, and
in the analyzing, analyzing a unit of location data for a consumer of the plurality of consumer to determine a visit by the consumer to one business in the market category is performed contemporaneous with the visit by the consumer to the one business.

23. The at least one computer-readable storage medium of claim 22, wherein the method further comprises:
analyzing the plurality of units of location data for the plurality of consumers to determine, for each consumer of the plurality, at least one personally-relevant location for the consumer; and
determining a third number of consumers of the plurality of consumers for which a location of the business is within a threshold distance of a personally-relevant location for the consumers,
wherein generating information on the brand strength of the business comprises generating information on the brand strength based at least in part on the third number.

24. The at least one computer-readable storage medium of claim 22, wherein:
soliciting the consumer further comprises soliciting the consumer to identify one or more businesses in the market category, the names of which the consumer has previously seen or heard;
the method further comprises determining, of the first number of responses to the soliciting in the time period, a third number of responses that identify that the consumer has previously seen or heard the name of the business; and generating information on the brand strength of the business comprises generating information based at least in part on the third number of responses.

25. The at least one computer-readable storage medium of claim 22, wherein the method further comprises:
analyzing the plurality of units of location data for the plurality of consumers to determine a third number of consumers who, in the time period, visited the business more often than the consumers visited other businesses in the market category,
wherein generating information on the brand strength of the business comprises generating information based at least in part on the third number of consumers.

26. The at least one computer-readable storage medium of claim 22, wherein the method further comprises:
identifying an event that may have an impact on brand strength of the business; and
generating information identifying whether there was a change in brand strength of the business surrounding the event,
wherein generating the information identifying whether there was a change comprises comparing brand strength for a time before the event to brand strength for a time after the event.

27. An apparatus comprising:
at least one processor; and
at least one storage medium having encoded thereon executable instructions that, when executed by the at least one processor, cause the at least one processor to carry out a method of operating a system of mobile devices, each operated by consumers, to monitor activities of and engage with the consumers so as to analyze impressions by the consumers of a business in a market category, the method comprising:
receiving, from mobile devices operated by a plurality of consumers, a plurality of units of location data, each unit of location data of the plurality having been produced by a mobile device from which the unit of location data is received and indicating a location of the mobile device at a time;
analyzing the plurality of units of location data for the plurality of consumers to determine a first number of visits made in a time period by the plurality of consumers to businesses in the market category and to determine a second number of visits, of the first number of visits, made in the time period to the business by the plurality of consumers;
in response to determining that one or more units of location data received from one or more mobile devices operated by one or more consumers indicates that a consumer visited a location associated with one of the businesses in the market category in the time period, for each mobile device of the one or more mobile devices,
transmitting at least one message to the mobile device soliciting the consumer operating the mobile device to identify one or more other businesses, other than the one of the businesses visited by the consumer, that the consumer considered for fulfilling a commercial purpose for which the consumer visited the one of the businesses;
receiving, from the one or more mobile devices, a first number of responses to the soliciting that identify businesses considered for fulfilling the commercial purpose;
determining, of the first number of responses to the soliciting in the time period, a second number of responses that identify the business as a business considered for fulfilling a commercial purpose for which visit was made to one of the businesses in the market category; and generating information on a brand strength of the business, the information on the brand strength comprising information determined based at least in part on the second number of visits that were visits to the business and the second number of responses that identify the business as a business considered by a consumer, wherein:
   in the receiving the plurality of units of location data, receiving a unit of location data from a mobile device indicating a location corresponding to one business in the market category is performed contemporaneous with a visit by a consumer operating the mobile device to the one business, and in the analyzing, analyzing a unit of location data for a consumer of the plurality of consumer to determine a visit by the consumer to one business in the market category is performed contemporaneous with the visit by the consumer to the one business.

28. The method of claim 1, wherein in the transmitting, transmitting at least one message to the mobile device operated by a consumer in response to determining a unit of location data received from the mobile device indicates a visit by the consumer to one of the businesses in the market category is performed contemporaneous with the visit by the consumer to the one of the businesses.

29. The method of claim 1, wherein:
   the method is performed by at least one computing device disposed remote from each of the mobile devices of the system of mobile devices; and the at least one computing device comprises at least one processor and at least one storage medium having encoded therein executable instructions that, when executed by the at least one processor, cause the at least one processor to perform the method.

30. The method of claim 29, wherein transmitting the at least one message soliciting the consumer to identify the one or more other businesses comprises transmitting at least one message identifying a plurality of businesses in the market category and instructing the mobile device to present the plurality of businesses to the consumer in a multiple choice interface.

* * * * *